(12) United States Patent
Gozalo et al.

(10) Patent No.: US 10,385,647 B2
(45) Date of Patent: Aug. 20, 2019

(54) SWELLABLE RUBBER COMPOSITIONS

(71) Applicant: WEIR SLURRY GROUP, INC., Madison, WI (US)

(72) Inventors: Francisco A. Gozalo, Sandy, UT (US); Sanford W. Clark, Salt Lake, UT (US)

(73) Assignee: Weir Slurry Group, Inc., Madison, WI (US)

( * ) Notice: Subject to any disclaimer, the term of this patent is extended or adjusted under 35 U.S.C. 154(b) by 255 days.

(21) Appl. No.: 15/210,814

(22) Filed: Jul. 14, 2016

(65) Prior Publication Data

US 2017/0015824 A1    Jan. 19, 2017

Related U.S. Application Data

(60) Provisional application No. 62/192,461, filed on Jul. 14, 2015.

(51) Int. Cl.
*E21B 33/12* (2006.01)
*C09K 8/44* (2006.01)
*C08L 33/18* (2006.01)
*C09K 8/493* (2006.01)

(52) U.S. Cl.
CPC .............. *E21B 33/12* (2013.01); *C08L 33/18* (2013.01); *C09K 8/44* (2013.01); *C09K 8/493* (2013.01); *E21B 33/1208* (2013.01)

(58) Field of Classification Search
CPC ........... C08L 33/26; C08L 33/06; E21B 33/12
USPC ....................................................... 524/521
See application file for complete search history.

(56) References Cited

U.S. PATENT DOCUMENTS

| 6,358,580 B1 * | 3/2002 | Mang | ..................... C08L 21/00 428/304.4 |
| 2013/0092401 A1 | 4/2013 | Freyer | |
| 2013/0269787 A1 * | 10/2013 | Choi | ..................... B01J 20/264 137/2 |

FOREIGN PATENT DOCUMENTS

| CN | 101407601 A | 4/2009 |
| WO | 2013077957 A1 | 5/2013 |

OTHER PUBLICATIONS

International Search Report and Written Opinion of the International Searching Authority, International Application No. PCT/US2016/042354, dated Oct. 12, 2016, 20 pages.

* cited by examiner

*Primary Examiner* — Hui H Chin
(74) *Attorney, Agent, or Firm* — Baker & McKenzie LLP

(57) ABSTRACT

This disclosure relates to swellable compositions, such as those, for example, comprising super absorbent polymers.

24 Claims, 22 Drawing Sheets

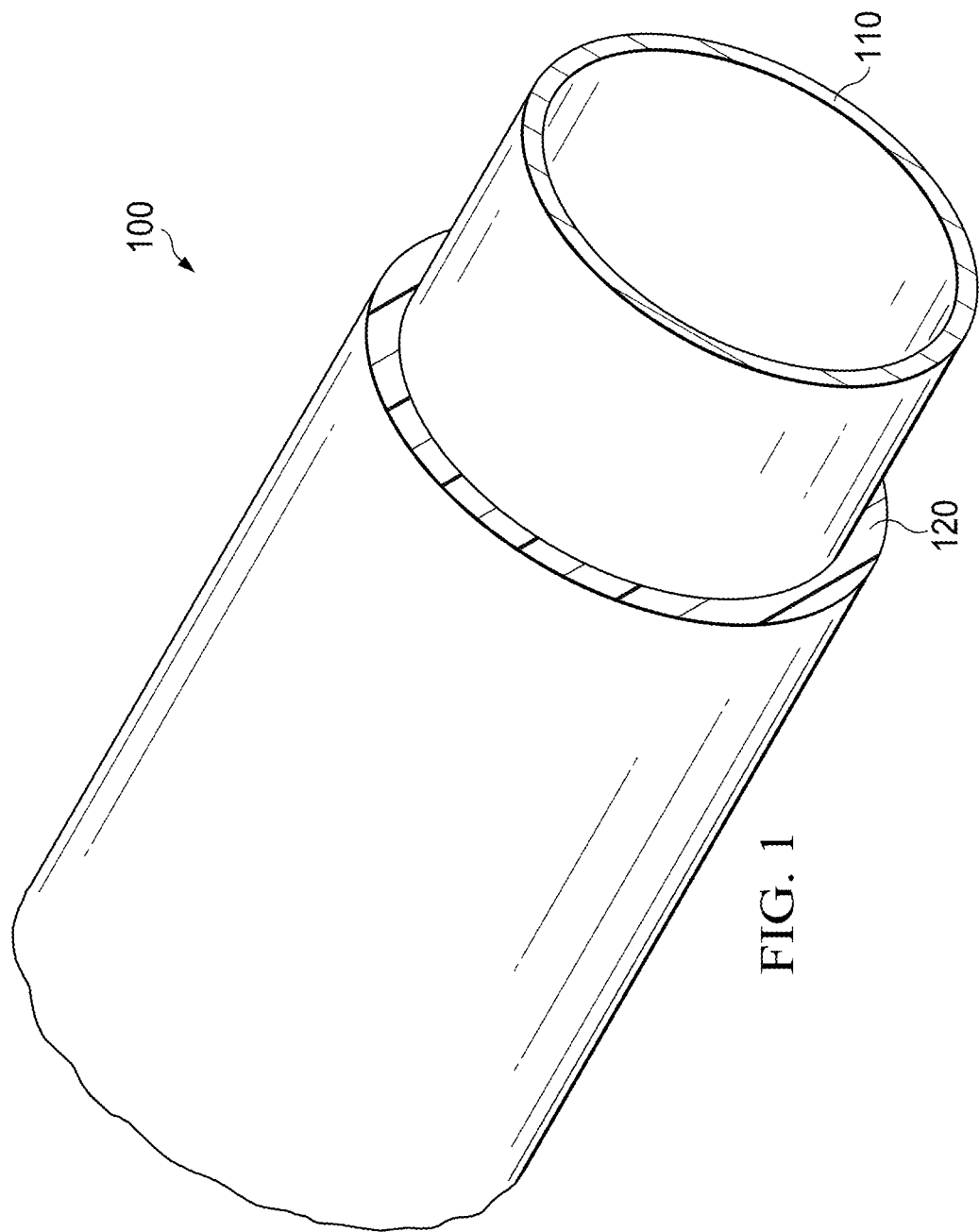

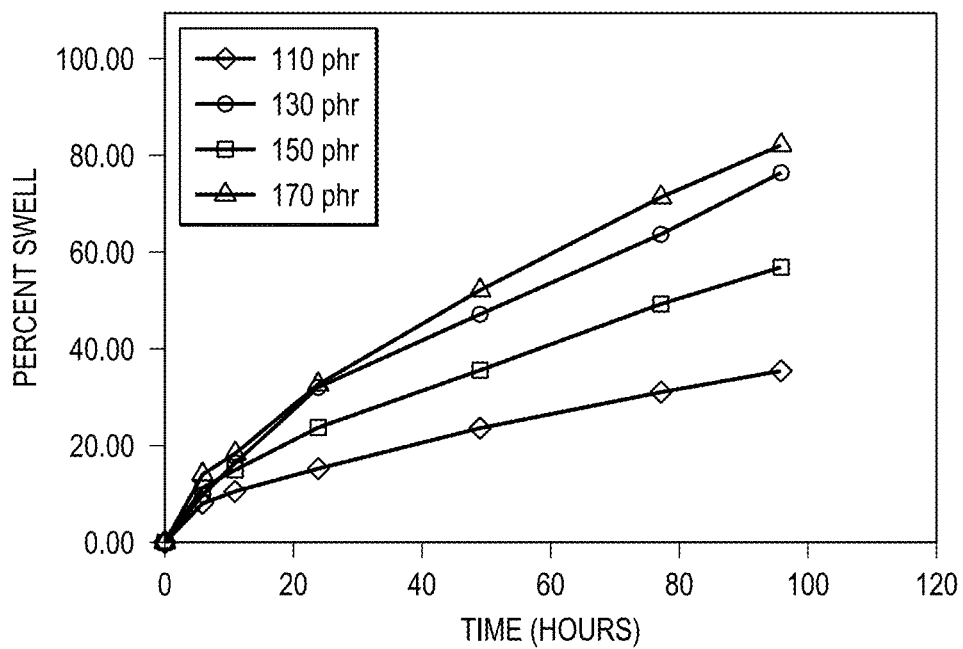
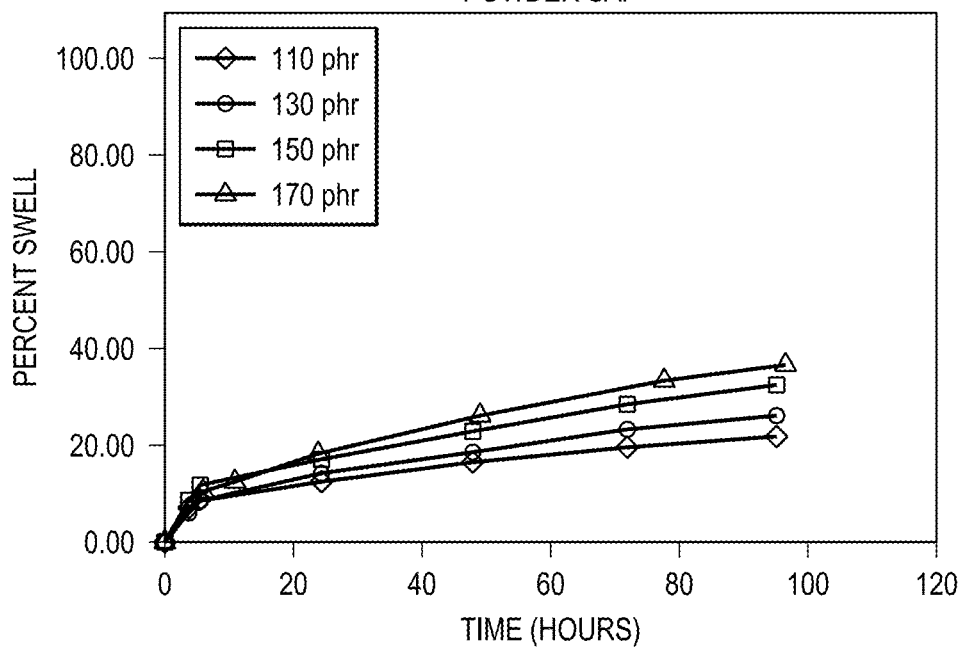

SWELLABLE RUBBER COMPOSITIONS

CROSS-REFERENCE TO RELATED APPLICATIONS

This application claims priority to U.S. Provisional Patent Application No. 62/192,461 filed on Jul. 14, 2015. The contents of the above application is hereby incorporated in it's entirety by reference.

FIELD OF THE DISCLOSURE

The present disclosure relates to swellable rubber compositions and, more particularly, to swellable rubber compositions for use with oil and gas field equipment including, for example, swellable packers. The present disclosure also relates to systems and methods for sealing a region between the wellbore wall and the packer-conduit assembly.

BACKGROUND OF THE DISCLOSURE

Conventionally, well conduits were cemented into place in the wellbore. However, the use of cement is sometimes not desirable because it may reduce or interfere with the production of the well. With the introduction of non-cemented wells, open hole packers came into use. Initially, the packer designs were mechanical in nature, and, eventually, swellable packers were introduced.

Swellable packers were initially designed to swell when exposed to oil-based fluids. More recently, swellable packers that swell in the presence of water-based fluids (e.g., brine) are also in use. However, these swellable packers have drawbacks because the rubber composition is not always acceptable for use in wells and/or the rubber does not sufficiently swell when it contacts saline formation water. Moreover, it is oftentimes necessary to swell the packer as soon as possible during well operations. If the swell rate of the packer is too slow, the well operations will be delayed, which can be extremely costly to the well operator. Accordingly, there is a need for swellable packers that have sufficient swell rates and hold at high pressures in downhole conditions (for example, saline environment, high temperatures).

Granular super absorbent polymers (SAP) have been used in the art to produce swellable packers because granular SAP achieves high volume swell at high temperature. The granular SAP particles are less expensive and swell faster than non-granular SAP particles. It is oftentimes believed that larger SAP particles are better because the larger particles lead to faster swell rates and larger swell area as compared to smaller/non-granular SAP particles. However, surprisingly it was found that high levels of leaching associated with large SAP particles not only reduce the swell potential of these compounds, but the leaching creates large perforations in the rubber. These perforations produce weak points which will lead to failure when the rubber is stressed. An analogy for this would be perforated paper which when stressed will split at the perforation line.

In addition, elastomer compositions may be more difficult to process where higher amounts of granular SAPs are mixed into the composition. For example, the higher level of granular SAP may result in an unacceptable level of mixing, and the granular SAP may not be properly incorporated into the composition. In short, there is a desire to have higher loads of SAPs in the swellable packer, but not at the expense of deterioration of the other physical and/or chemical properties of the packer or the processing of elastomeric composition used for forming the swellable packer.

The present disclosure is directed to producing a swellable elastomeric composition with higher loads of SAPs wherein the composition has acceptable physical and/or chemical properties during processing, after forming and/or curing of the swellable packer, as well as when it is placed into use.

It has been unexpectedly found that by using powder SAPs, higher loads of powder SAPs may be incorporated into the elastomeric composition (as compared to loading with granular SAPs), and that the swellable composition has acceptable physical and/or chemical properties during processing, after forming and/or curing of the swellable packers, as well as when it is placed into use in the wellbore.

It has also been unexpectedly found, as disclosed herein, that higher loads of powder SAPs in the elastomeric composition result in packers with excellent swell rates in brines, low leaching and acceptable physical and/or chemical properties when subjected to the high temperature and/or high pressure conditions that occur in a wellbore.

The present disclosure is directed to elastomeric compositions and swellable packers that achieve a predictable and suitable swell rate (swelling as a function of time) such that the packer may be subjected to higher pressure in a timelier manner.

The present disclosure is also directed to swellable packers that have acceptable physical and/or chemical properties when subjected to brine type conditions, higher temperature conditions, and/or higher pressure conditions, such as those, for example, that may occur in a wellbore.

The present disclosure is directed to swellable compositions, and the packers produced using such swellable compositions, that swell at a suitable predictable rate and amount and are able to withstand high pressures and high temperatures without substantial physical failures, such as tearing and/or perforation.

Accordingly, it is desirable to have a swellable composition that is more acceptable for use with oil and gas field equipment, including, for example, a swellable packer.

SUMMARY OF THE DISCLOSURE

Exemplary embodiments described herein may provide for a swellable rubber composition comprising: an elastomer; a water-soluble resin; a curing agent and/or agents; a filler; and a powder super absorbent polymer (SAP).

Exemplary embodiments described herein may provide for a swellable rubber composition comprising: an elastomer; a butadiene rubber; a sulfur curing agent; a silica; and a powder super absorbent polymer.

Exemplary embodiments described herein may provide a swellable rubber composition comprising: a nitrile elastomer; a rubber; a sulfur curing agent; a silica; and a powder super absorbent polymer.

Exemplary embodiments described herein may provide a swellable rubber composition comprising: at least one nitrile rubber elastomer; at least one styrene butadiene rubber; carbon black; dioctyl phthalate; fumed silica; zinc oxide; an antiozonant; an antidegradant; a tackifier; sulfur; tetramethylthiuram disulfide; an inhibitor; at least one powder super absorbent polymer; and stearic acid.

In exemplary embodiments, at least one nitrile rubber elastomer is a hydrogenated nitrile elastomer having a percent hydrogenation from about 70 percent to about 91 percent.

In exemplary embodiments, an elastomer has a Mooney viscosity ML 1+4 (100 degrees Celsius) of about 47 to about 72.

In an exemplary embodiment, at least one nitrile rubber elastomer may be a hydrogenated nitrile elastomer having a percent unsaturation of about 9 percent to about 30 percent.

In exemplary embodiments, a powder super absorbent polymer may be present in about 125 to about 175 Phr.

In exemplary embodiments, a powder super absorbent polymer may be present in about 170 to about 210 Phr.

In exemplary embodiments, a powder super absorbent polymer may be present in about 190 to about 210 Phr or in about 185 to about 215 Phr.

In exemplary embodiments, a powder super absorbent polymer may be present in at least about 150 Phr, or about 175 Phr, or about 190 Phr, or about 200 Phr, or about 225 Phr or about 250 Phr.

In exemplary embodiments, at least one powder super absorbent polymer and at least one granular super absorbent polymer may be present in a swellable rubber composition; and the at least one powder super absorbent polymer may comprise at least about 50%, or about 60%, or about 70%, or about 80%, or about 90%, or about 95% by weight of a total super absorbent polymer incorporated into the swellable rubber.

In exemplary embodiments, a total amount of super absorbent polymer is selected such that, after curing, a cured swellable rubber packer may be capable of expanding in water and/or brine without significantly compromising the physical properties of a rubber composition and/or without significantly leaching and/or without significantly perforating.

In exemplary embodiments, a powder super absorbent polymer may have an average particle size of about 10 to about 120 μm or about 20 to about 100 μm, (e.g., about 20, or about 25, or about 30, or about 35, or about 40, or about 45, or about 50, or about 55, or about 60, or about 65, or about 70, or about 75, or about 80, or about 85, or about 90, or about 95, or about 100, or about 105, or about 110, or about 115, or about 120 μm).

In exemplary embodiments, a powder super absorbent polymer may have an average particle size of less than or equal to about 20, or about 30, or about 40, or about 50, or about 60, or about 70, or about 80, or about 90, or about 100, or about 110, or about 120 μm.

In exemplary embodiments, a powder super absorbent polymer may consist essentially of particle sizes of less than or equal to about 20, or about 30, or about 40, or about 50, or about 60, or about 70, or about 80, or about 90, or about 100, or about 110, or about 120 or about 130 μm.

In exemplary embodiments, about 70%, 7 or about 5%, or about 80%, or about 85%, or about 90%, or about 95% a powder super absorbent polymer may have particle sizes of less than or equal to about 20, or about 30, or about 40, or about 50, or about 60, or about 70, or about 80, or about 90, or about 100, or about 110, or about 120 or about 130 μm.

In exemplary embodiments, a powder super absorbent polymer may comprise about 120 to about 220, about 165 to about 225, about 170 to about 210 or about 190 to about 200 (e.g., about 120, or about 125, or about 130, or about 135, or about 140, or about 145, or about 150, or about 155, or about 160, or about 165, or about 170, or about 175, or about 180, or about 185, or about 190, or about 195, or about 200, or about 205, or about 210, or about 215 or about 220) Phr.

In exemplary embodiments, a powder super absorbent polymer may comprise one or more of the following: poly-electrolytes, polyacyrlates (e.g., sodium polyacrylate), polyacryamide-co-polyacrylates (e.g., polyacryamide-co-potassium acrylate), polyacrylamides (e.g., potassium polyacrylamide), acrylic acids, hydrophilic clays, bentonite (e.g., sodium bentonite, potassium bentonite, calcium bentonite, or wyoming bentonite), wood, cork, and/or cellulose fibers.

In exemplary embodiments, a granular super absorbent polymer may comprise one or more of the following: poly-electrolytes, polyacyrlates (e.g., sodium polyacrylate), polyacryamide-co-polyacrylates (e.g., polyacryamide-co-potassium acrylate), polyacrylamides (e.g., potassium polyacrylamide), acrylic acids, hydrophilic clays, bentonite (e.g., sodium bentonite, potassium bentonite, calcium bentonite, or wyoming bentonite), wood, cork, and/or cellulose fibers.

In exemplary embodiments, a powder super absorbent polymer may be potassium polyacrylate polyacrylamide copolymer that has a mean particle size of about 35 μm, a median particle size of about 35 μm with a standard deviation of about 10 μm, and substantially no particles over about 63 μm in the powder.

In exemplary embodiments, a powder super absorbent polymer may be a potassium polyacrylate polyacrylamide copolymer, wherein no, or substantially no particles are over about 63 μm in the powder.

In exemplary embodiments, a powder super absorbent polymer may be potassium polyacrylate polyacrylamide copolymer wherein no, or substantially no, particles are over about 75 μm in the powder.

In exemplary embodiments, a powder super absorbent polymer may be potassium polyacrylate polyacrylamide copolymer, wherein no, or substantially no particles are over about 50 μm, or about 55 μm, or about 60 μm, or about 65 μm, or about 70 μm, or about 75 μm, or about 80 μm, or about 85 μm, or about 90 μm, or about 95 μm, or about 100 μm, or about 110 μm, or about 115 μm, or about 125 μm in the powder.

In exemplary embodiments, a powder super absorbent polymer may have no, or substantially no particles are over about 63 μm in the powder.

In exemplary embodiments, a powder super absorbent polymer may have no, or substantially no, particles are over about 75 μm in the powder.

In exemplary embodiments, a powder super absorbent polymer may have no, or substantially no, particles are over about 50 μm, 55 μm, 60 μm, 65 μm, 70 μm, 75 μm, 80 μm, 85 μm, 90 μm, 95 μm, 100 μm, 110 μm, 115 μm or 125 μm in the powder.

Swelling may be expressed in some embodiments of the disclosure with reference to an uncured swellable rubber composition in the absence of an aqueous media, or a cured swellable rubber composition in the absence of an aqueous media. Swelling may be reference to an uncured swellable rubber composition and/or a cured swellable rubber composition.

In exemplary embodiments, a swellable rubber composition, after curing, may be configured to swell by at least about 10%, or at least about 20%, or at least about 30%, or at least about 40%, or at least about 50%, or at least about 60%, or at least about 70%, or at least about 80%, or at least about 90%, or at least about 100%, or at least about 110%, or at least about 120%, or at least about 130%, or at least about 140%, or at least about 150%, or at least about 160%, or at least about 170%, or at least about 180%, or at least about 190%, or at least about 200%, or at least about 210%, or at least about 220%, or at least about 230%, or at least about 240% or at least about 250% by volume in an about 5% weight/volume brine solution without substantially compromising the physical properties of the cured rubber composition and/or without significantly leaching and/or without significantly perforating.

In exemplary embodiments, a swellable rubber composition, after curing, may be configured to swell by at least about 10%, or at least about 20%, or at least about 30%, or at least about 40%, or at least about 50%, or at least about 60%, or at least about 70%, or at least about 80%, or at least about 90%, or at least about 100%, or at least about 110%, or at least about 120%, or at least about 130%, or at least about 140%, or at least about 150%, or at least about 160%, or at least about 170%, or at least about 180%, or at least about 190%, or at least about 200%, or at least about 210%, or at least about 220%, or at least about 230%, or at least about 240% or at least about 250% by volume in an about 16% weight/volume brine solution without substantially compromising the physical properties of the rubber composition and/or without significantly leaching and/or without significantly perforating.

In exemplary embodiments, a swellable composition, after curing, may swell by at least about 50%, or at least about 60%, or at least about 65%, or at least about 70%, or at least about 75% or at least about 80% by volume in about 96 hours in about 5% brine solution at about 200 degrees Fahrenheit.

In exemplary embodiments, a swellable composition, after curing, may swell by at least at least about 50%, or at least about 60%, or at least about 65%, or at least about 70%, or at least about 75% or at least about 80% by volume in about 96 hours in about 16% brine solution at about 200 degrees Fahrenheit.

In exemplary embodiments, a swellable rubber composition, after curing, may be configured to swell while being subjected to a temperature of about 200 degrees Fahrenheit.

In exemplary embodiments, a swellable rubber composition, after curing, may be configured to swell while being subjected to a temperature of about 275 degrees Fahrenheit.

In exemplary embodiments, a swellable rubber composition, after curing, may be configured to swell while being subjected to a pressure of at least about 3000, 4000, 5000 or 6000 psi.

In exemplary embodiments, a swellable rubber composition, after curing, may be configured to substantially swell within about 2, or about 3, or about 4 or about 5 days.

In exemplary embodiments, a swellable rubber composition, after curing, may have a Shore A hardness of at least about 20, or about 25, or about 30.

In exemplary embodiments, a swellable rubber composition, after curing and substantially swelling, may have a Shore A hardness of at least about 20, or about 25, or about 30.

Exemplary embodiments described herein may provide for a swellable packer that may comprise: a conduit, and a swellable rubber composition according to one or more of the swellable compositions disclosed herein wrapped around at least a portion of the conduit and cured.

Exemplary embodiments described herein may provide for a swellable packer manufactured by causing a swellable rubber composition of one or more of the embodiments disclosed herein to cure after the swellable rubber composition has been wrapped around at least a portion of the conduit.

Exemplary embodiments described herein may provide for a method of sealing a region between wellbore wall and the swellable packer-conduit assembly, wherein the swellable packer-conduit assembly comprises a conduit and a swellable packer at least partially surrounding the outer surface of the conduit, comprising: locating a swellable packer-conduit assembly in a region of the wellbore in a manner so as to seal said space upon swelling of the swellable body, the swellable body being susceptible to being in contact with water, water based fluid and/or formation water present in the wellbore, according to one or more of the embodiments disclosed herein.

Exemplary embodiments described herein may provide for a swellable rubber composition comprising: about 10 parts per hundred (Phr) of an elastomer; about 90 Phr of a butadiene rubber; about 150 Phr of a powder SAP, and about 45 Phr of fumed silica.

Exemplary embodiments described herein may provide for a swellable rubber composition comprising: about 10 parts per hundred (Phr) of an elastomer; about 90 Phr of a butadiene rubber; about 192 Phr of a powder SAP, and about 45 Phr of fumed silica.

In exemplary embodiments, the elastomer may comprise butadiene acrylonitrile copolymer, nitrile rubber, hydrogenated nitrile rubber, NBR, hydrogenated NBR, highly saturated nitrile, HNR, HNBR, carboxylated NBR (XNBR), CR, EPDM, ACM, NR, SBR, BR, natural rubber, synthetic polyisoprene, butyl rubbers (IIR) CSM, Silicone, fluoro rubbers, perfluoro rubbers, tetrafluoro ethylene propylene rubber), and combinations thereof.

In exemplary embodiments, the salt may comprise metal containing salts, such as metal chlorides (e.g., sodium chloride, potassium chloride, or calcium chloride), metal phosphates (e.g., $Ca_3(PO_4)_2$), metal carbonates (e.g., $CaCO_3$ or $BaCO_3$), metal oxides (e.g., MgO), metal sulfides (e.g., ZnS), metal hydroxides (e.g., $Fe(OH)_2$), metal sulfates (e.g., $BaSO_4$), metal acetates, metal bicarbonates, metal formates, metal hydrosulphides, metal imides, metal nitrates, metal nitrides; dissociating salts; non-metal salts (e.g., $NH_4Cl$), and combinations thereof.

In exemplary embodiments, a super absorbent polymer, clays, and/or natural swelling materials may comprise polyelectrolytes, polyacyrlates (e.g., sodium polyacrylate), polyacryamide-co-polyacrylates (e.g., polyacryamide-co-potassium acrylate), polyacrylamides (e.g., potassium polyacrylamide), acrylic acids, hydrophilic clays, bentonite (e.g., sodium bentonite, potassium bentonite, calcium bentonite, or Wyoming bentonite), wood, cork, cellulose fibers, and combinations thereof.

In exemplary embodiments, a swellable rubber composition may further comprise a general purpose plasticizer for rubber products, such as phthalate esters (e.g., dioctyl phthalate), trimellitates, sebacates, adipates, terephthalates, benzoates, dibenzoates, organophosphates, gluterates, or azelates.

In exemplary embodiments, a swellable rubber composition may further comprise carbon black, for example, in about 5 to about 15 Phr.

In exemplary embodiments, a swellable rubber composition may further comprise dioctyl phthalate (DOP), for example, in about 3 to about 9 Phr.

In exemplary embodiments, a swellable rubber composition may further comprise zinc oxide, for example, in about 3 to about 9 Phr.

In exemplary embodiments, a swellable rubber composition may further comprise an antiozonant, for example, in about 0.5 to about 2 Phr.

In exemplary embodiments, a swellable rubber composition may further comprise antidegradant, for example, in about 0.2 to 2.5 Phr.

In exemplary embodiments, a swellable rubber composition may further comprise a tackifier, for example, in about 1 to about 5 Phr.

In exemplary embodiments, a swellable rubber composition may further comprise an inhibitor, for example, in about 0.1 to about 0.6 Phr.

In exemplary embodiments, a swellable rubber composition may further comprise stearic acid, for example, in about 0.5 to about 3 Phr.

Exemplary embodiments described herein may provide for a swellable rubber composition as described herein wherein the swellable cured rubber composition may be configured to swell by at least about 10%, or at least about 20%, or at least about 30%, or at least about 40%, or at least about 50%, or at least about 60%, or at least about 70%, or at least about 80%, or at least about 90%, or at least about 100%, or at least about 110%, or at least about 120%, or at least about 130%, or at least about 140%, or at least about 150%, or at least about 160%, or at least about 170%, or at least about 180%, or at least about 190%, or at least about 200%, or at least about 210%, or at least about 220%, or at least about 230%, or at least about 240%, or at least about 250%, in each case, by volume.

Exemplary embodiments described herein may provide for a swellable rubber composition as described herein wherein the swellable cured rubber composition may be configured to swell by at least about 10%, or at least about 20%, or at least about 30%, or at least about 40%, or at least about 50%, or at least about 60%, or at least about 70%, or at least about 80%, or at least about 90%, or at least about 100%, or at least about 110%, or at least about 120%, or at least about 130%, or at least about 140%, or at least about 150%, or at least about 160%, or at least about 170%, or at least about 180%, or at least about 190%, or at least about 200%, or at least about 210%, or at least about 220%, or at least about 230%, or at least about 240%, or at least about 250%, in each case, by volume in about 5% brine solution.

Exemplary embodiments described herein may provide for a swellable rubber composition as described herein wherein the swellable cured rubber composition may be configured to swell by at least about 10%, or at least about 20%, or at least about 30%, or at least about 40%, or at least about 50%, or at least about 60%, or at least about 70%, or at least about 80%, or at least about 90%, or at least about 100%, or at least about 110%, or at least about 120%, or at least about 130%, or at least about 140%, or at least about 150%, or at least about 160%, or at least about 170%, or at least about 180%, or at least about 190%, or at least about 200%, or at least about 210%, or at least about 220%, or at least about 230%, or at least about 240%, or at least about 250%, in each case, by volume in about 10% brine solution.

Exemplary embodiments described herein may provide for a swellable rubber composition as described herein wherein the swellable cured rubber composition may be configured to swell by at least about 10%, or at least about 20%, or at least about 30%, or at least about 40%, or at least about 50%, or at least about 60%, or at least about 70%, or at least about 80%, or at least about 90%, or at least about 100%, or at least about 110%, or at least about 120%, or at least about 130%, or at least about 140%, or at least about 150%, or at least about 160%, or at least about 170%, or at least about 180%, or at least about 190%, or at least about 200%, or at least about 210%, or at least about 220%, or at least about 230%, or at least about 240%, or at least about 250%, in each case, by volume in about 16% brine solution.

Exemplary embodiments described herein may provide for a swellable rubber composition as described herein wherein the swellable cured rubber composition may be configured to swell by at least about 10%, or at least about 20%, or at least about 30%, or at least about 40%, or at least about 50%, or at least about 60%, or at least about 70%, or at least about 80%, or at least about 90%, or at least about 100%, or at least about 110%, or at least about 120%, or at least about 130%, or at least about 140%, or at least about 150%, or at least about 160%, or at least about 170%, or at least about 180%, or at least about 190%, or at least about 200%, or at least about 210%, or at least about 220%, or at least about 230%, or at least about 240%, or at least about 250%, in each case, by volume by volume in about 20% brine solution.

In some embodiments, the present disclosure relates to a swellable rubber composition, wherein at least one nitrile rubber is present at a concentration from about 10 wt. % to about 45 wt. %, by weight of the swellable rubber composition. According to some embodiments, at least one nitrile rubber may comprise acrylonitrile and butadiene, wherein the acrylonitrile may be present in the at least one nitrile rubber at a concentration of about 20 wt. % or less, by weight of the at least one nitrile. At least one polybutadiene rubber is present at a concentration from about 0.5 wt. % to about 15 wt. %, by weight of a swellable rubber composition, according to some embodiments of the disclosure. According to some embodiments at least one polybutadiene rubber comprises vinyl groups, wherein the vinyl groups are present in at least one polybutadiene rubber at a concentration of about 5 wt. % to about 30 wt. %, by weight of the at least one polybutadiene rubber.

According to some embodiments, at least one silica is present at a concentration from about 1 wt. % to about 25 wt. %, by weight of a swellable rubber composition. At least one peroxide may be present at a concentration from about 0.1 wt. % to about 1.5 wt. % by weight of the swellable rubber composition, according to some embodiments of the disclosure. In some embodiments, a swellable rubber composition is capable of swelling upon contacting a water based fluid, wherein the swellable rubber composition has already been cured. In some embodiments, a water based fluid comprises water, water solutions, downhole water-based solutions, aqueous-based solutions, at least one brine, and combinations thereof. A swellable rubber composition is capable of swelling while being subjected to a temperature of at least about 275° F. A swellable rubber composition is capable of swelling while being subjected to a pressure, the pressure comprising at least about 3000 psi, at least about 4000 psi, at least about 5000 psi, at least about 6000 psi, at least about 7000 psi, or at least about 8000 psi.

The present disclosure relates, according to some embodiments, to a swellable rubber composition comprising: at least one hydrogenated nitrile butadiene rubber; at least one antiozonant; at least one tackifier; at least one vulcanization inhibitor; at least one phthalate; at least one vulcanization accelerant; stearic acid; a carbon black; and zinc oxide. In some embodiments, a swellable rubber composition may comprise: at least nitrile rubber; at least one polybutadiene rubber; at least one silica; at least one sulfur curing agent; at least one carboxymethyl cellulose; at least one calcium phosphate; and at least one powder super absorbent polymer. In some embodiments, a swellable rubber composition may comprise at least one hydrogenated nitrile butadiene rubber; at least one antiozonant; at least one tackifier; at least one vulcanization inhibitor; at least one phthalate; at least one vulcanization accelerant; stearic acid; a carbon black; zinc oxide; or combinations thereof.

A swellable rubber composition may comprise at least one hydrogenated nitrile butadiene rubber; at least one antiozonant; at least one tackifier; at least one vulcanization inhibitor; at least one phthalate; at least one vulcanization accelerant; stearic acid; a carbon black; and zinc oxide. A density of crosslinking after curing may be greater than an identically formulated swellable rubber composition, except omitting the at least one carboxymethyl cellulose and the at least one calcium phosphate, in some embodiments. In some embodiments, at least one nitrile rubber is present at a concentration from about 10 wt. % to about 45 wt. %, by weight of a swellable rubber composition. According to some embodiments, at least one nitrile comprises acrylonitrile and butadiene, wherein the acrylonitrile is present in the at least one nitrile at a concentration of about 20 wt. % or less, by weight of the at least one nitrile. At least one polybutadiene rubber is present at a concentration from about 0.5 wt. % to about 15 wt. %, by weight of a swellable rubber composition, according to some embodiments of the disclosure. In some embodiments, at least one polybutadiene rubber comprises vinyl groups, wherein the vinyl groups are present in the at least one polybutadiene rubber at a concentration from about 5 wt. % to about 30 wt. %, by weight of the at least one polybutadiene rubber. At least one silica is present at a concentration from about 1 wt. % to about 25 wt. %, by weight of a swellable rubber composition, according to some embodiments of the disclosure. In some embodiments, at least one peroxide is present at a concentration from about 0.1 wt. % to about 1.5 wt. % by weight of a swellable rubber composition.

According to some embodiments, a swellable rubber composition is capable of swelling upon contacting a water based fluid, wherein the swellable rubber composition has already been cured. A water based fluid may comprise water, water solutions, downhole water-based solutions, aqueous-based solutions, at least one brine, or combinations thereof, according to some embodiments of the disclosure. In some embodiments, a swellable rubber composition is capable of swelling while being subjected to a temperature of about 275° F. In some embodiments, a swellable rubber composition is capable of swelling while being subjected to a pressure, the pressure comprising at least about 3000 psi, at least about 4000 psi, at least about 5000 psi, at least about 6000 psi, at least about 7000 psi, and at least about 8000 psi.

The present disclosure relates, in some embodiments, to a method of sealing annular region between a wellbore wall and a swellable packer-conduit assembly, the method comprising: contacting the swellable packer conduit assembly to a water based fluid, wherein the swellable packer conduit comprises a swellable rubber composition, the swellable rubber composition comprising: at least one nitrile rubber; at least one polybutadiene rubber; at least one sulfur curing agent; at least one silica; at least one peroxide curing agent; and at least one powder super absorbent polymer. In some embodiments, a swellable packer swells upon contact with the water based fluid. A swellable packer may swell by about 20% by volume to about 250% by volume. A water based fluid comprises water solutions, downhole water-based solutions, aqueous-based solutions, at least one brine, or combinations thereof. In some embodiments, at least one brine comprises an about 5% brine solution, an about 10% brine solution, an about 15% brine solution, an about 20% brine solution, an about 25% brine solution, an about 30% brine solution, an about 35% brine solution, an about 40% brine solution, an about 45% brine solution, an about 50% brine solution, an about 55% brine solution, an about 60% brine solution, an about 65% brine solution, or an about 70% brine solution. In some embodiments, a swellable packer swells by about 20% to about 250% by volume, wherein the swelling occurs within a period of time, the period of time comprising about 1 day, about 2 days, about 3 days, about 4 days, or about 5 days. According to some embodiments, a swellable packer swells by about 20% to about 250% by volume, wherein the swellable packer is subjected to a pressure, the pressure comprising at least about 3000 psi, at least about 4000 psi, at least about 5000 psi, at least about 6000 psi, at least about 7000 psi, and at least about 8000 psi.

The present disclosure relates, according to some embodiments, to a method of curing a swellable rubber composition, the method comprising: combining to the swellable rubber composition a curing composition to form a mixture; and exposing the mixture to conditions comprising a temperature, the temperature comprising at least about 200° F., at least about 225° F., at least about 250° F., at least about 275° F., at least about 300° F., at least about 325° F., at least about 350° F., at least about 375° F., at least about 400° F., at least about 425° F., at least about 450° F., at least about 475° F., or at least about 500° F., wherein the swellable rubber composition comprises: at least one nitrile rubber; at least one polybutadiene rubber; at least one sulfur curing agent; at least one silica; at least one peroxide curing agent; and at least one powder super absorbent polymer, and wherein the curing composition comprises: at least one sulfur curing agent; and at least one peroxide agent. In some embodiments, a swellable packer swells upon contact with the water based fluid. A swellable packer swells by about 20% to about 250% by volume. In some embodiments, a swellable packer swells by about 20% to about 250% by volume, wherein the swelling occurs within a period of time, the period of time comprising about 1 day, about 2 days, about 3 days, about 4 days, or about 5 days.

Other aspects, features, and advantages will become apparent from the following detailed description when taken in conjunction with the accompanying drawings, which are a part of this disclosure and which illustrate, by way of example, principles of inventions disclosed.

DETAILED DESCRIPTION OF THE DRAWINGS

Some embodiments of the disclosure may be understood by referring, in part, to the present disclosure and the accompanying drawings, wherein:

FIG. 1 illustrates a sectional view of a swellable packer assembly comprising a rubber coating surrounding a conduit and capable of swelling in the presence of water and/or water formations according to a specific example embodiment of the disclosure;

FIGS. 2A-C illustrate graphical representations of the percent swell versus time in hours for swellable compositions tested in a solution with 5% brine at 200 degrees Fahrenheit, each swellable composition having SAPs of different particle sizes according to specific example embodiments of the disclosure.

FIGS. 3A-C illustrate graphical representations of the percent swell versus time in hours for swellable compositions tested in a solution with 16% brine at 200 degrees Fahrenheit, each swellable composition having SAPs of different particle sizes according to specific example embodiments of the disclosure;

FIGS. 4A-C illustrate graphical representations of the percent swell versus time in hours for swellable compositions tested in a solution with 5% brine at 275 degrees Fahrenheit, each swellable composition having SAPs of different particle sizes according to specific example embodiments of the disclosure;

FIGS. 5A-C illustrate graphical representations of the percent swell versus time in hours for swellable compositions tested in a solution with 16% brine at 275 degrees Fahrenheit, each swellable composition having SAPs of different particle sizes according to specific example embodiments of the disclosure;

FIGS. 6A-C illustrate graphical representations of percent swell versus SAP loading in Parts Per Hundred Rubber (Phr) for swellable compositions after four days in a solution with 5% brine at 200 degrees Fahrenheit, each swellable composition having SAPs of different particle sizes, where the SAP loading to achieve a 75% swell by the fourth day has been predicted according to specific example embodiments of the disclosure;

FIG. 7A illustrates a graphical representation of the percent leaching versus SAP loading in Phr for swellable compositions tested in a solution with, each swellable composition having SAPs of different particle sizes, wherein the composition used in FIG. 7A is Composition A disclosed herein with different levels of SAP, according to a specific example embodiment of the disclosure;

FIGS. 7B-E depict photographical test results relating to leaching according to specific example embodiments of the disclosure;

Figure 11A:
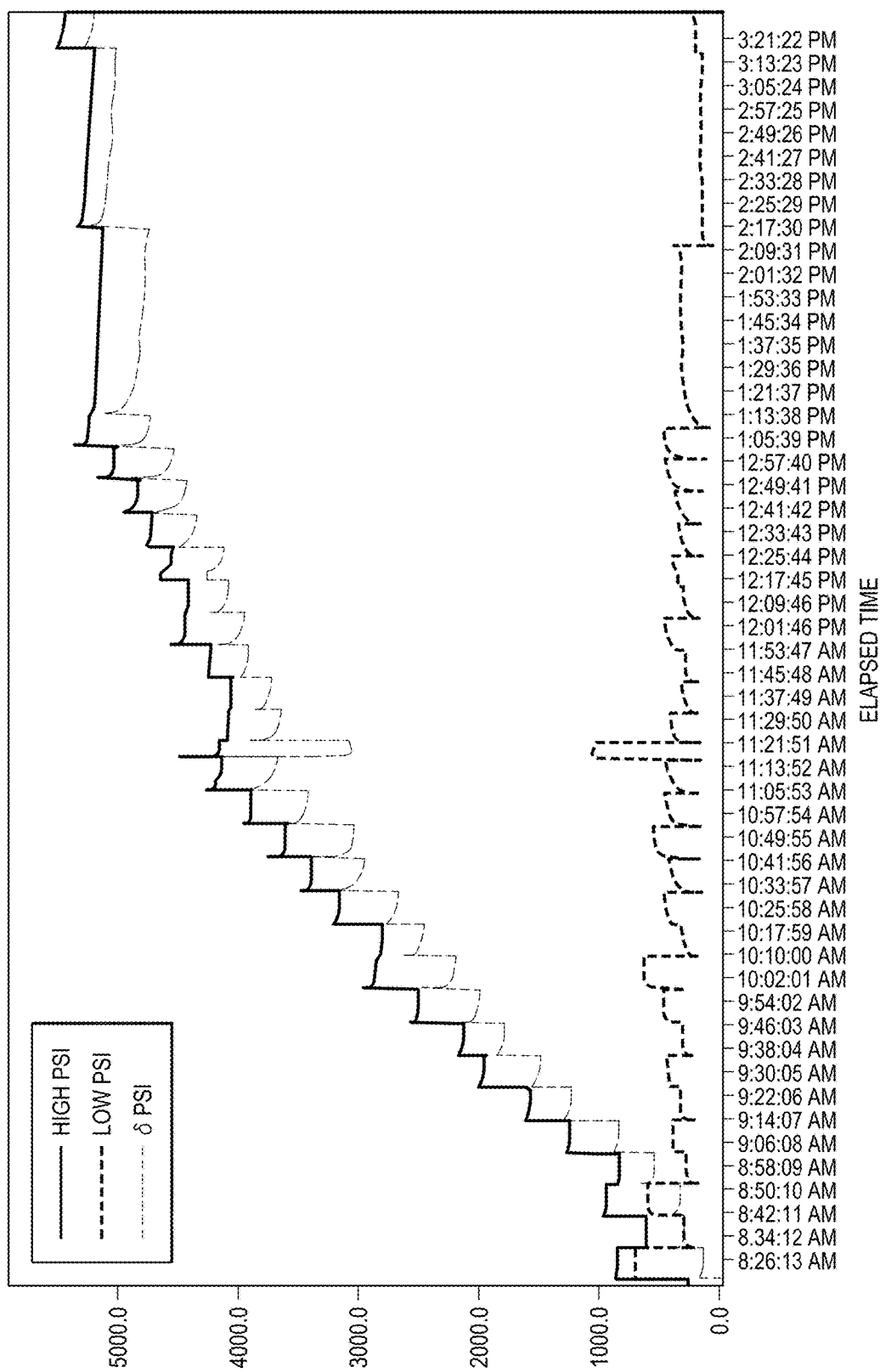
Figure 11B:
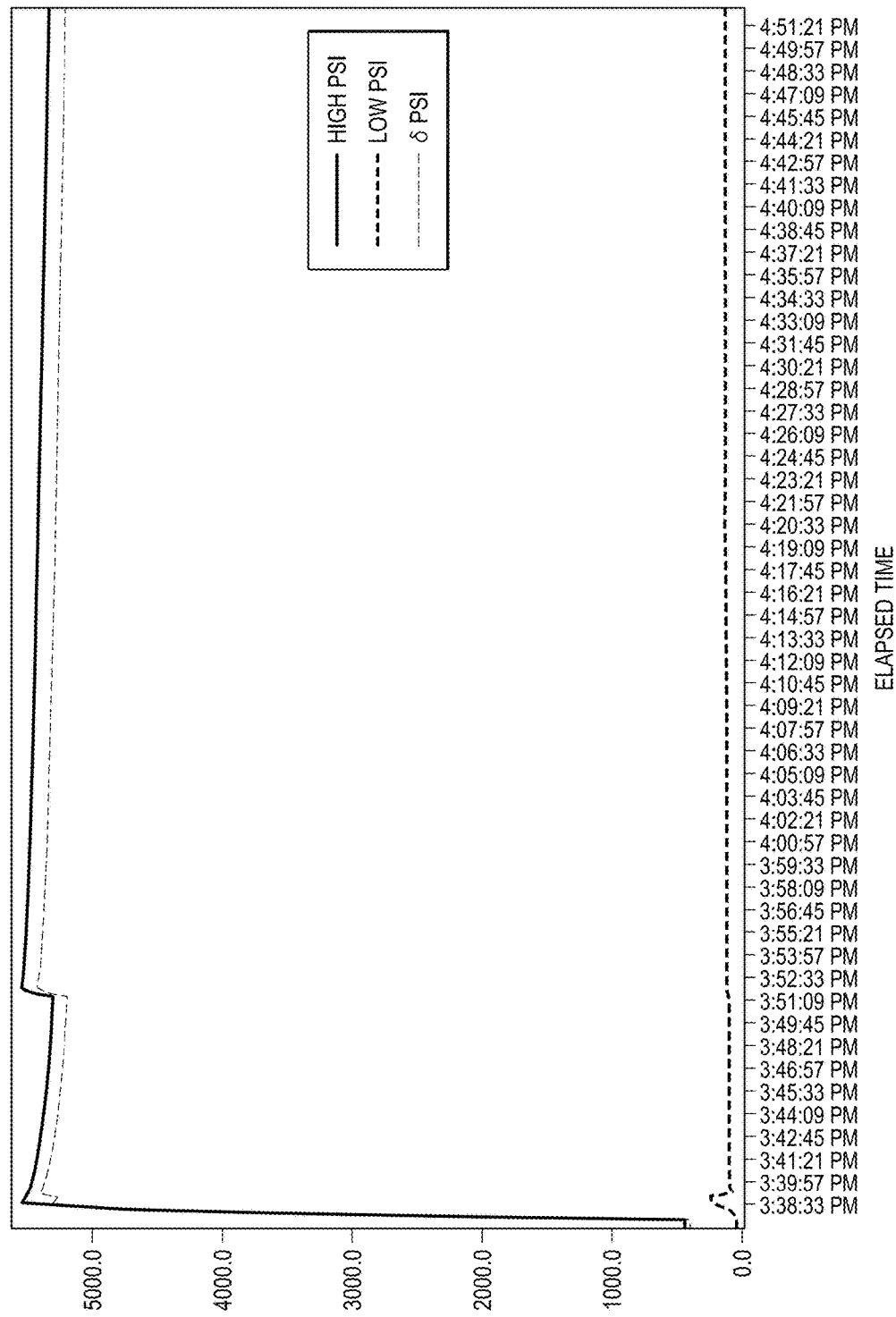
Figure 12:
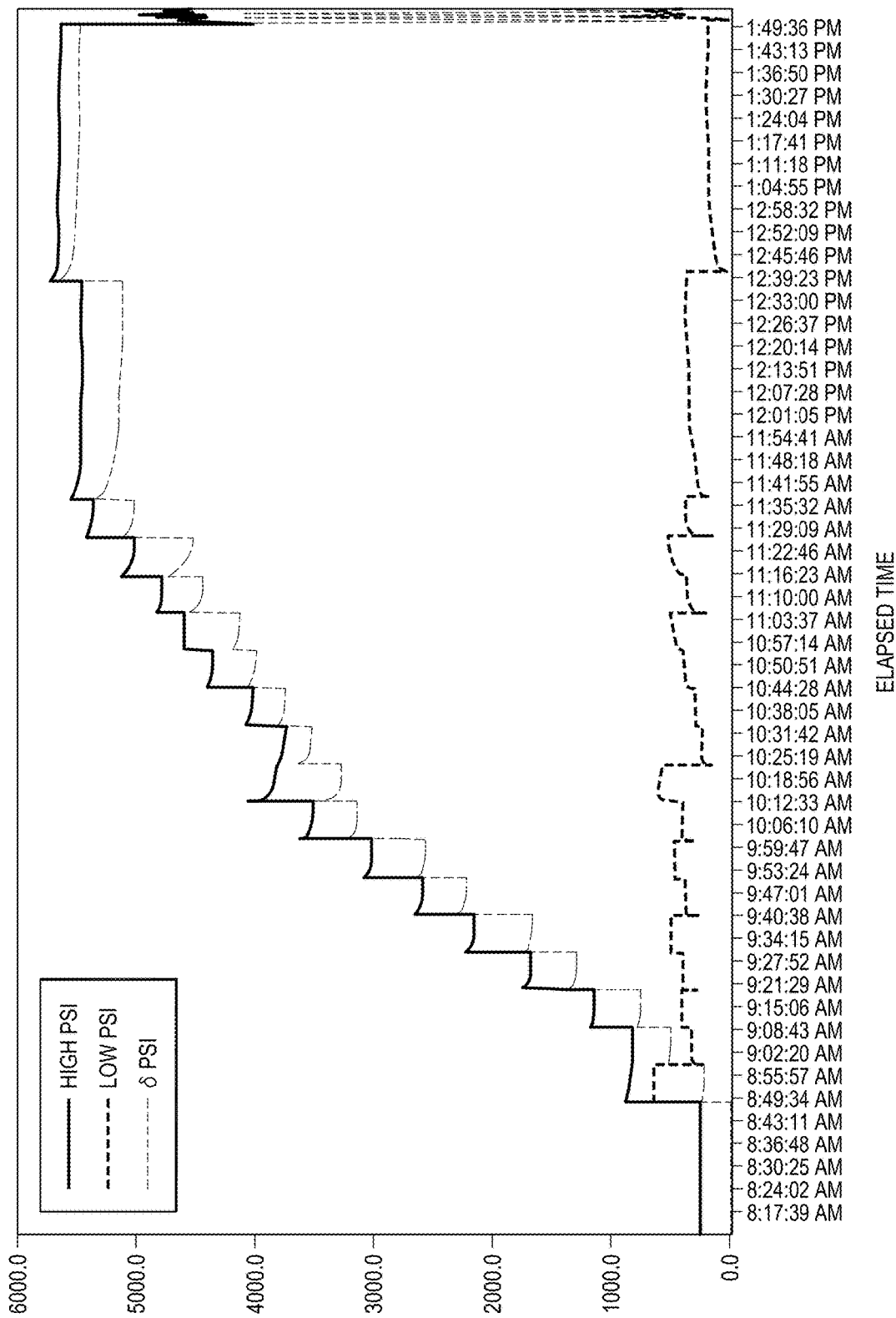

FIGS. 11A-B depict graphical representations of test results from the packer described in Example 1 that was tested in a solution of 16% brine at a temperature of 275 degrees Fahrenheit according to specific example embodiments of the disclosure;

FIG. 12 depicts a graphical representation of test results from the packer described in Example 1 that was tested in a solution of 5% brine at a temperature of 275 degrees Fahrenheit according to a specific example embodiment of the disclosure.

Figure 13:
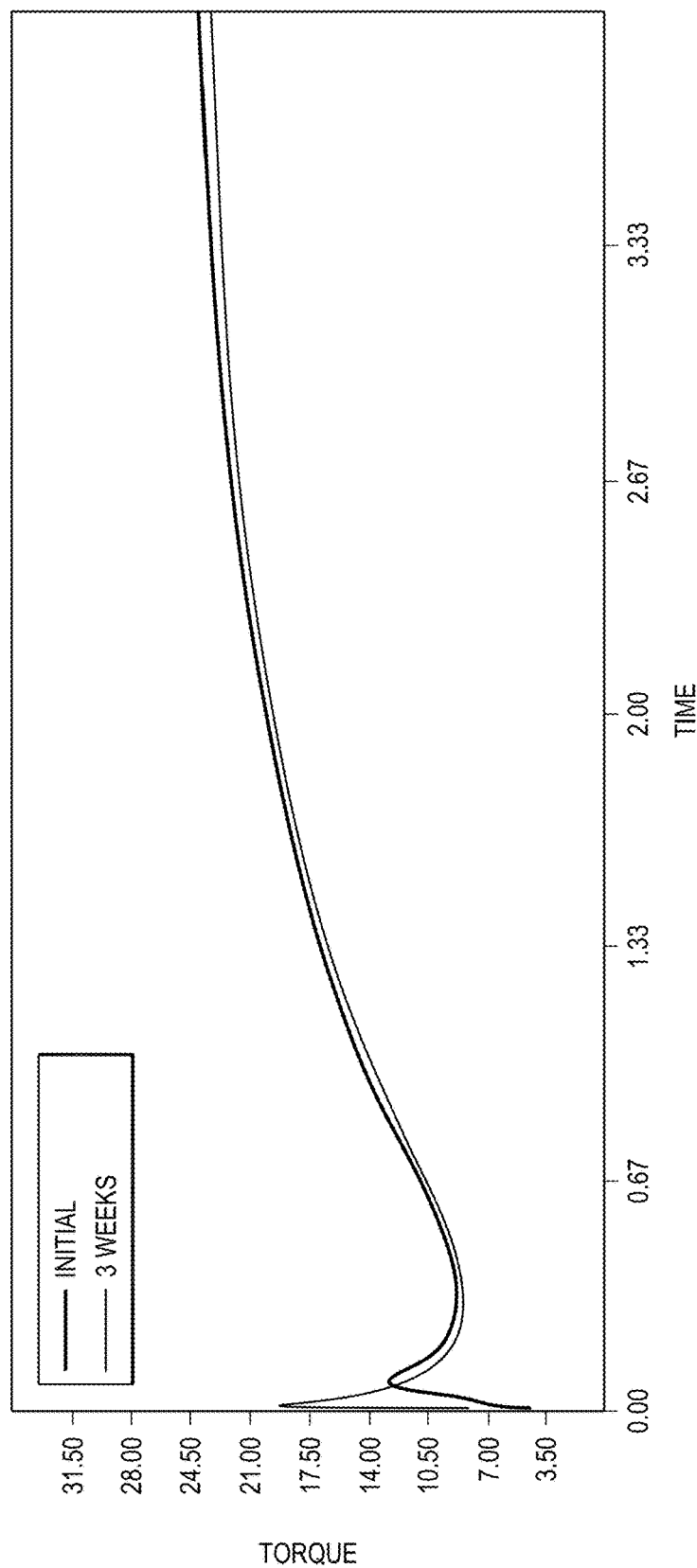
Figure 14:
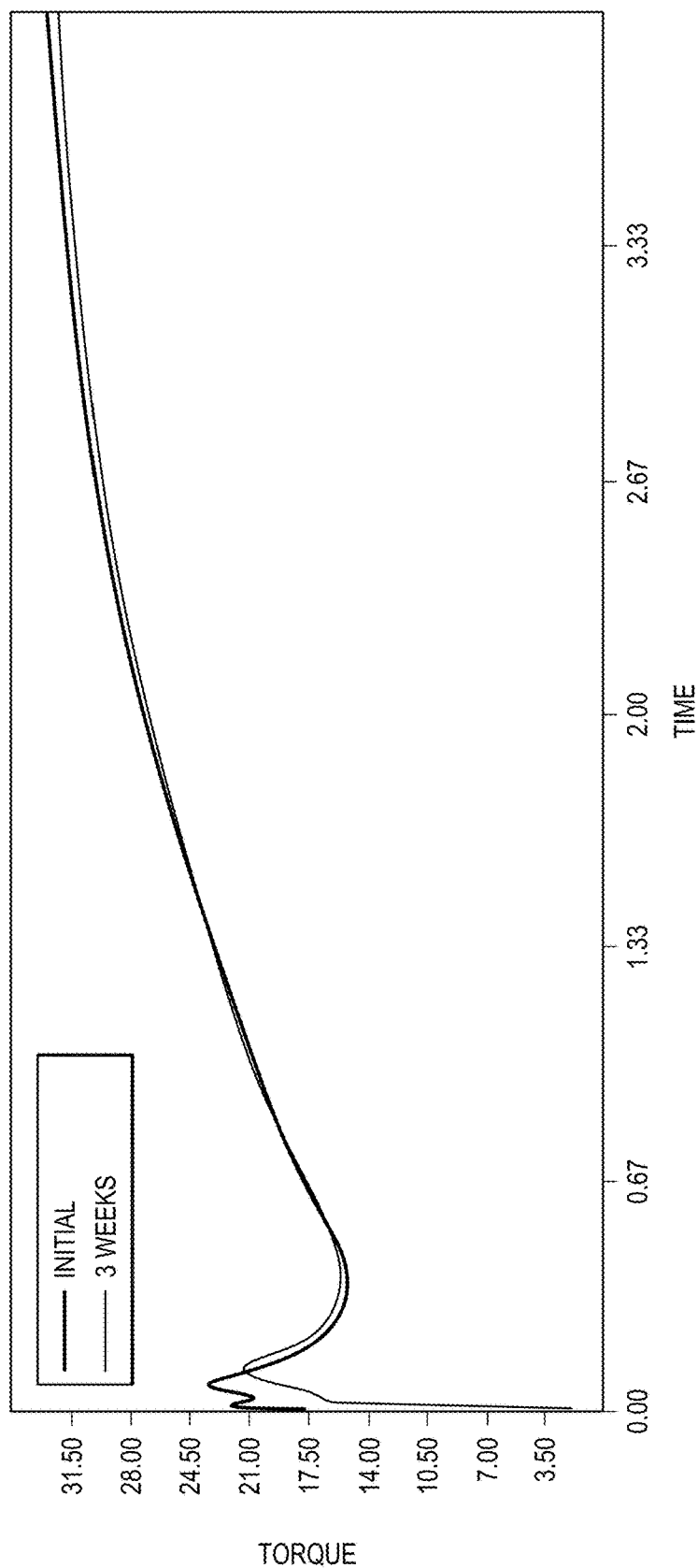
Figure 15:
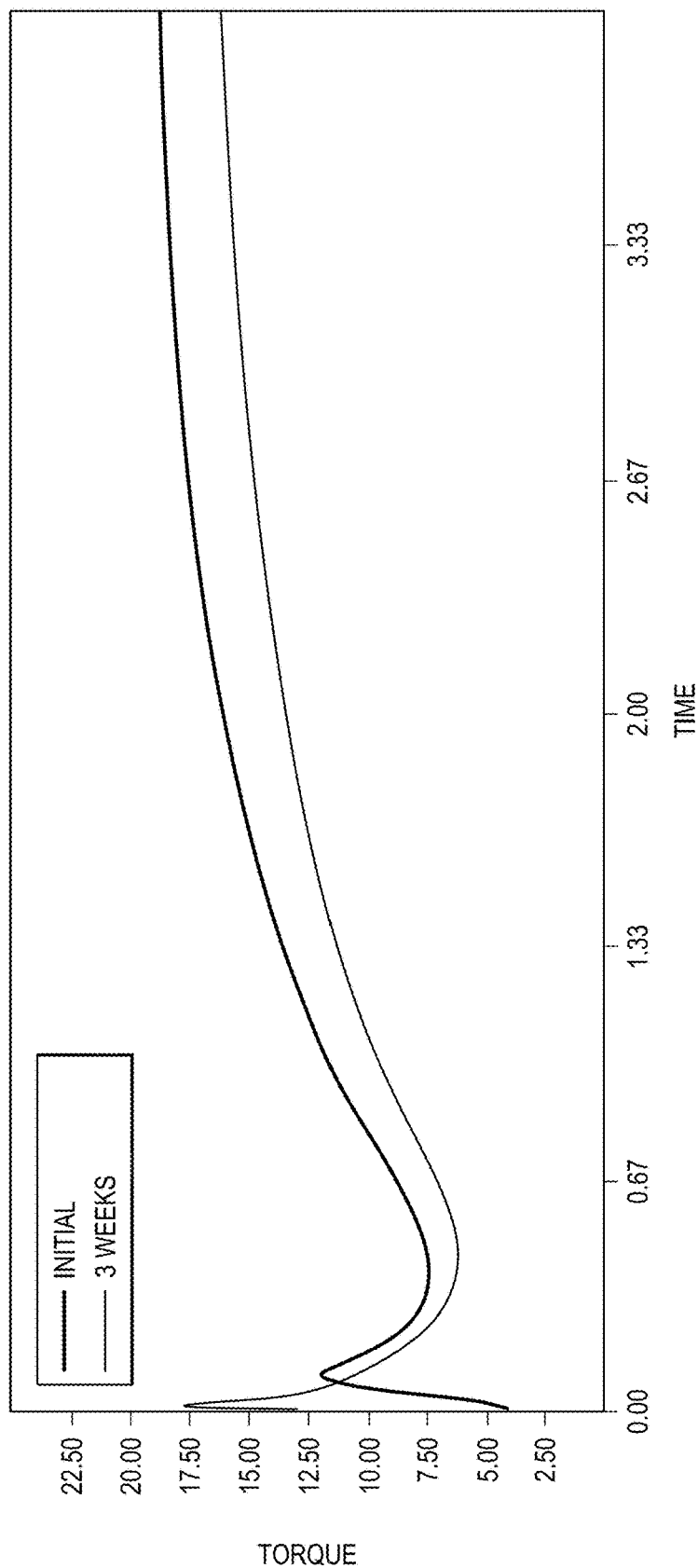
Figure 16:
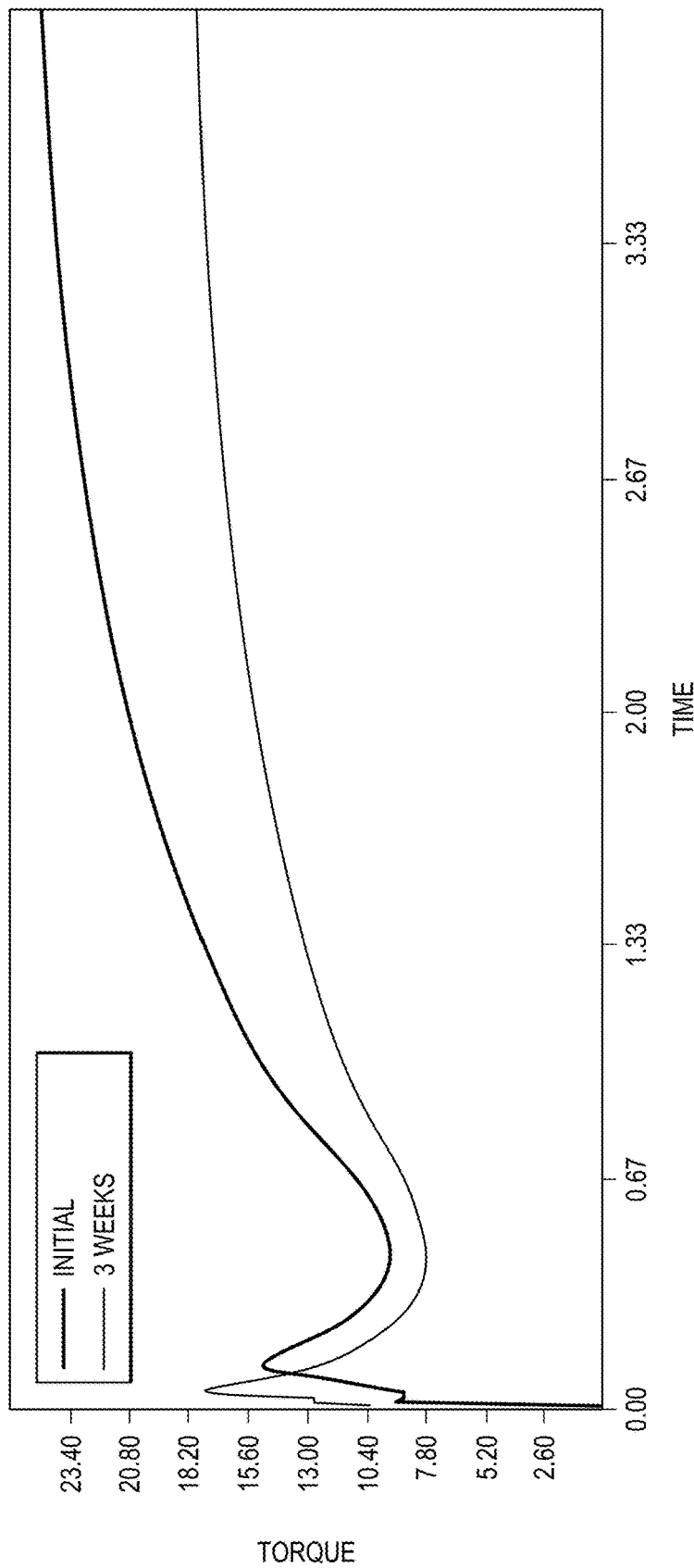
Figure 17:
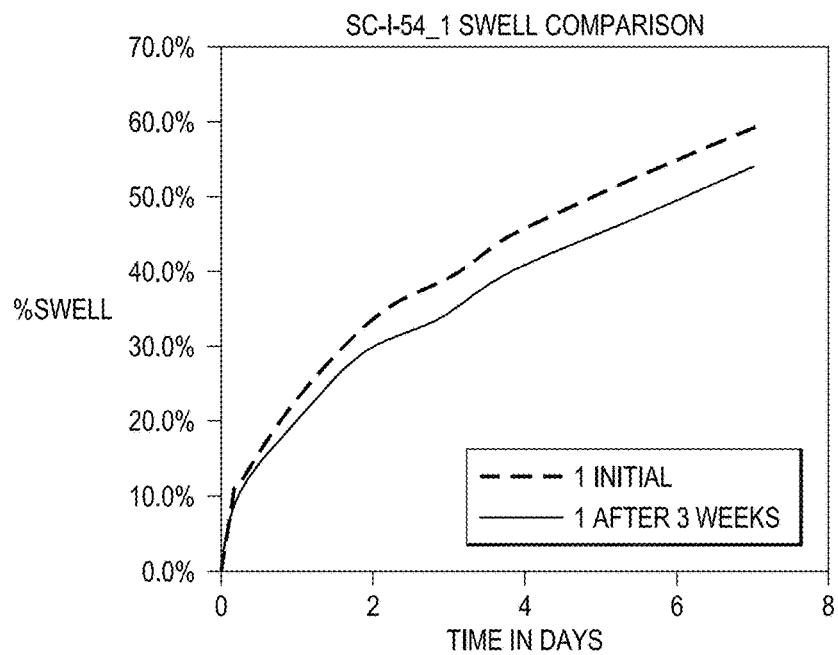
Figure 18:
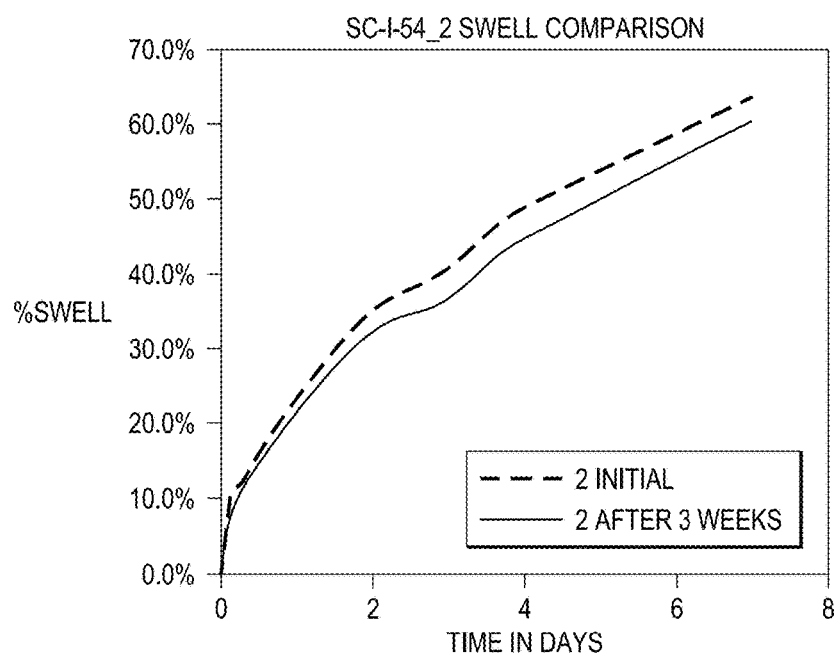
Figure 19:
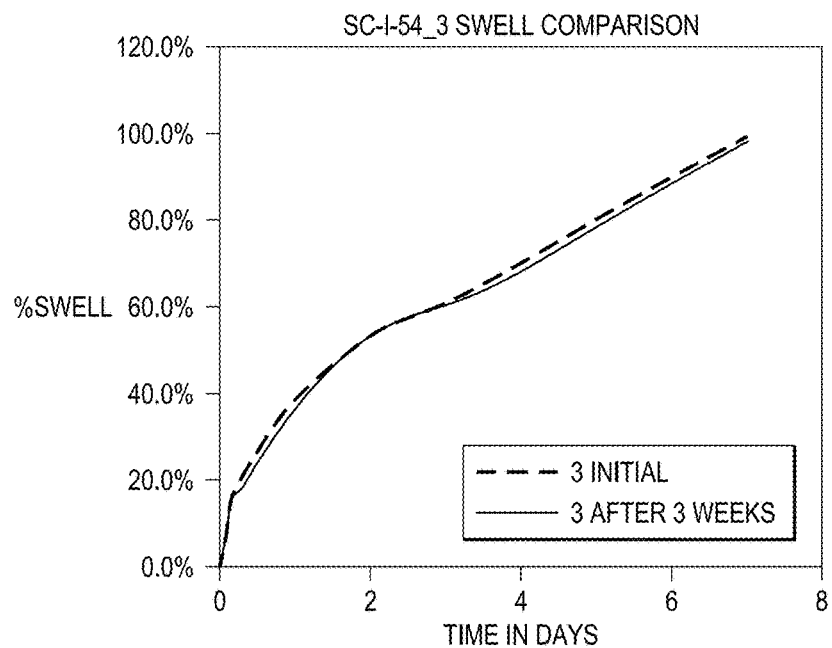
Figure 20:
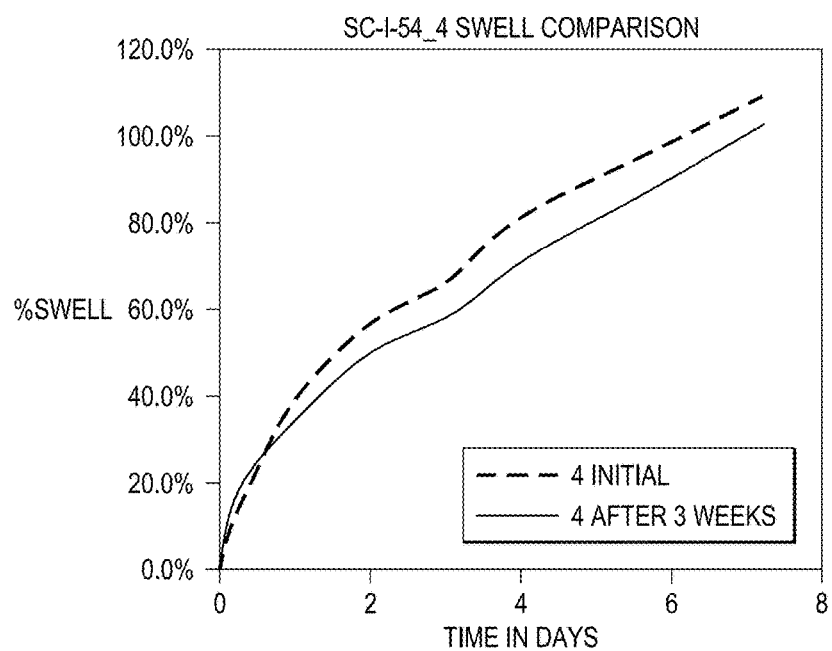

FIG. 13 illustrate a viscosity comparison of swellable rubber compositions as measured by a rheometer;

FIG. 14 illustrate a viscosity comparison of swellable rubber compositions as measured by a rheometer;

FIG. 15 illustrate a viscosity comparison of swellable rubber compositions as measured by a rheometer;

FIG. 16 illustrate a viscosity comparison of swellable rubber compositions as measured by a rheometer;

FIG. 17 illustrate an aging comparison of swellable rubber compositions through analyzing swelling before and after a duration of about three weeks;

FIG. 18 illustrate an aging comparison of swellable rubber compositions through analyzing swelling before and after a duration of about three weeks;

FIG. 19 illustrate an aging comparison of swellable rubber compositions through analyzing swelling before and after a duration of about three weeks; and FIG. 20 illustrate an aging comparison of swellable rubber compositions through analyzing swelling before and after a duration of about three weeks.

DETAILED DESCRIPTION

The present disclosure is directed to an unexpected discovery that swellable rubber compositions with higher levels of powder super absorbent particles (SAPs) may provide both a desired swell rate and excellent physical properties for downhole conditions as compared to an analogous formulation containing granular SAP.

In exemplary embodiments, granular SAP(s) means SAPs where a substantial portion of the particles may at least be about 150 µm. As used herein, a substantial portion may mean at least about 50%, or at least about 60%, or at least about 70% or at least about 80% of the particles, or more. Alternatively, granular SAP may mean SAPs were the mean particle size is at least about 150 µm.

In exemplary embodiments, medium size granular SAP means SAPs with a particle size distribution from about 150 µm to about 400 µm wherein at least about 50%, or at least about 60%, or at least about 70% or at least about 80% of the individual particles or more fall within this range.

In exemplary embodiments, large size granular SAP may be SAPs with a particle size distribution from about 400 µm to about 1000 µm wherein about 50%, or about 60%, or about 70% or about 80% of the individual particles or more fall within this range.

In exemplary embodiments, powder SAP may mean SAPs where a substantial portion of the particles are less than or equal to about 50 µm, or about 75 µm, or about 100 µm, or about 125 µm, or about 150 µm. As used herein a substantial portion may mean at least about 50%, or about 60%, or about 70%, or about 80% or about 90% of the particles, or more. Alternatively, powder SAP(s) means SAPs were the mean particle size is less than or equal to about 50 µm, or about 75 µm, or about 100 µm, or about 125 µm, or about 150 µm. In exemplary embodiments, the powder SAP may contain less than or equal to about 5%, or about 10%, or about 15%, or about 20%, or about 25%, or about 30%, or about 35%, or about 40%, or about 45% or about 50% granular SAP particles.

In exemplary embodiments, water comprises water, water solutions, downhole water-based solutions, aqueous-based solutions, and/or brines. Some embodiments of the present disclosure swell in the presence of water, water solutions, downhole water-based solutions, aqueous-based solutions, brines, and/or oil- or hydrocarbon-based fluid. As used herein, the term "brine" is meant to refer to a water-based fluid containing alkaline or alkaline earth chlorides salt, such as sodium chloride, calcium chloride, sulphates and carbonates. Swelling characteristics may be variable in relation to a variability in salt concentration and/or temperature, among other things. That is, for examples, as the salt concentration increases, the amount of swelling may decrease. Numerical percentages for brines disclosed herein are percentages by volume unless otherwise stated.

FIG. 1 illustrates an exemplary embodiment of a sectional view of a swellable packer assembly comprising a rubber coating, which is capable of swelling in the presence of water and/or water formations, such as brines, and oil- or hydrocarbon-based fluid. As shown, a swellable packer assembly 100 comprises a conduit 110 with a swellable rubber 120 wrapped around the conduit 110. In exemplary embodiments, a conduit 110 may be made of a suitable metal. In exemplary embodiments, a rubber 120 may be vulcanized to a conduit 110 such that the combination has a substantially unitary construction. In exemplary embodiments, a swellable packer assembly 100 may be designed to reduce and/or minimize extrusion of a rubber during use. In exemplary embodiments, end rings (not shown) may be provided to protect the ends of a rubber 120, or, alternatively, the end portions of the rubber 120 may be tapered (not shown) to more easily move through a well to a desired depth. A swellable packer 100 may be produced using a number of suitable techniques, the techniques comprising pressure molding, injection molding, extruding, calendar wrapping, strip winding, and combinations thereof.

In exemplary embodiments, a swellable rubber composition and/or cured packer may comprise an elastomer, such as a thermoset elastomer capable of withstanding high temperatures for a prolonged period of time and that swells in the presence of water or a water-based fluid. In exemplary embodiments, a swellable rubber composition and/or cured packer may comprise an elastomer, such as a thermoset elastomer capable of withstanding high temperatures for a prolonged period of time and that swells in the presence of water or a water-based fluid and/or in the presence of an oil- or hydrocarbon-based fluid.

As used herein, for example, an elastomer may comprise: butadiene acrylonitrile copolymer, nitrile rubber, liquid polybutadiene (Liquid PBD), NBR, hydrogenated nitrile rubber, hydrogenated NBR, highly saturated nitrile, HNR, HNBR, carboxylated NBR (XNBR), chloroprene rubber (CR), ethylene propylene diene terpolymer (EPDM), acrylic rubber (ACM), natural rubber (NR), styrene-butadiene rubber (SBRS, polybutadiene/butadiene rubber (BR), low acrylonitrile nitrile (a low ACN nitrile), synthetic polyisoprene, butyl rubbers (IIR), chlorosulphonated polyethylene (CSM), silicone, fluoro rubbers, perfluoro rubbers, tetrafluoro ethylene propylene rubber (FEPM), and combinations thereof.

According to some embodiments, a swellable rubber composition and/or cured packer may comprise at least one polybutadiene, wherein the at least one polybutadiene rubber comprises vinyl groups. In some embodiments, vinyl groups may be present at a concentration from about 5 wt. % to about 30 wt. %, by weight of at least one polybutadiene rubber. According to some embodiments, vinyl groups may be present at about 5 wt. %, or about 10 wt. %, or about 15 wt. %, or about 20 wt. %, or about 25 wt. %, or about 30 wt. %, by weight of at least one polybutadiene rubber.

For example, at least one nitrile rubber elastomer may be a hydrogenated nitrile elastomer having a percent hydrogenation from about 70% to bout 91%. According to some embodiments, a hydrogenated nitrile elastomer may have a Mooney viscosity ML 1+4 (100 degrees Celsius) of about 47 to about 72. In some embodiments, a hydrogenated nitrile elastomer may have a Mooney viscosity ML 1+4 (100 degrees Celsius) of about 30, or about 35, or about 40, or about 45, or about 50, or about 55, or about 60, or about 65, or about 70, or about 75, or about 80. In other embodiments, a hydrogenated nitrile elastomer may have a percent unsaturation of about 9 percent to about 30 percent. According to some embodiments, a hydrogenated nitrile elastomer may have a percent unsaturation of about 5%, or about 10%, or about 15%, or about 20%, or about 25%, or about 30%, or about 35%, or about 40%. Examples of the hydrogenated nitrile elastomer that are commercially available from Zetpol® include 0020, 1020L, 2020L, and 2030L.

According to some embodiments, a swellable rubber composition and/or cured packer may comprise a hydrogenated nitrile butadiene rubber (e.g., HNBR Zetpol 2030L, Therban 3496) content of about 0.5 wt. %, of about 1 wt. %, or of about 2 wt. %, or of about 3 wt. %, or of about 4 wt. %, or of about 5 wt. %, or of about 6 wt. %, or of about 7 wt. %, or of about 8 wt. %, or of about 9 wt. %, or of about 10 wt. %, or of about 15 wt. %, by weight of product.

According to some embodiments, a swellable rubber composition and/or cured packer may comprise a styrene-butadiene rubber (e.g., 1502 SBR) content of about 5 wt. %, of about 10 wt. %, or of about 15 wt. %, or of about 20 wt. %, or of about 25 wt. %, or of about 30 wt. %, or of about 35 wt. %, or of about 40 wt. %, or of about 45 wt. %, by weight of product.

According to some embodiments, a swellable rubber composition and/or cured packer may comprise a polybutadiene (e.g., liquid PBD—PolyBD R20LM, Nitroflex Liquid Nitrile, Liquid EPDM) content of about 0.5 wt. %, of about 1 wt. %, or of about 2 wt. %, or of about 3 wt. %, or of about 4 wt. %, or of about 5 wt. %, or of about 6 wt. %, or of about 7 wt. %, or of about 8 wt. %, or of about 9 wt. %, or of about 10 wt. %, or of about 15 wt. % by weight of product.

According to some embodiments, a swellable rubber composition and/or cured packer may comprise a low ACN nitrile (e.g., Perbunan 1846 F) content of about 5 wt. %, of about 10 wt. %, or of about 15 wt. %, or of about 20 wt. %, or of about 25 wt. %, or of about 30 wt. %, or of about 35 wt. %, or of about 40 wt. %, or of about 45 wt. %, by weight of product.

In exemplary embodiments, a swellable rubber composition and/or cured packer may also comprise a cement, a Portland cement, and one or more reactive filler materials, such as cement, cementations material, metal oxide, and mixtures thereof, which react and swell upon contact with water. In some embodiments, a swellable rubber composition may stiffen upon contact with water. In exemplary embodiments, a cement may result in improvements in the physical properties of the rubber, such as increased volume and increased modulus. For example, a filler may be a reactive filler, a reinforcing reactive filler, a sealing system, a cement clinker, a silicate, a aluminate, a ferrite and/or combinations thereof.

In some embodiments, a swellable rubber composition and/or cured packer may also comprise a tackifier. In exemplary embodiments, a tackifier may comprise resins (i.e., hydrocarbon resins, phenolic-formaldehyde resin, coumarone-indene resin, and Struktol Koresin). According to some embodiments, a tackifier may result in an increase of tack (e.g., stickiness of the surface).

In some embodiments, a swellable rubber composition and/or cured packer may also comprise an antiozonant. In exemplary embodiments, an antiozonant may comprise phenylenediamines (e.g., N-(1,3-Dimethylbutyl)-N'-phenyl-phenylenediamine), diureas (e.g., ethylene diurea), and paraffin waxes. According to some embodiments, an antiozonant may protect the swellable rubber composition and/or the cured packer from ozone.

In some embodiments, a swellable rubber composition and/or cured packer may also comprise a vulcanization inhibitor. In exemplary embodiments, a vulcanization inhibitor may comprise a phthalimide (e.g., cyclohexylthiophthalimide), diureas (e.g., ethylene diurea), and paraffin waxes. According to some embodiments, an antiozonant may protect the swellable rubber composition and/or the cured packer from ozone.

In some embodiments, a swellable rubber composition and/or cured packer may also comprise a vulcanization accelerant. In exemplary embodiments, a vulcanization accelerant may comprise aldehyde amines, guanidines, thiazoles, thiophosphates, sulfonamides, thioureas, thiuram, dithiocarbamates, xanthanes. In some embodiments, a vulcanization accelerant may comprise tetramethyl thiuram disulfide, tetramethyl thiuram monosulfide, dipentamethylene thiuram, and tetrabenzylthiuram disulfide. According to some embodiments, a tackifier may result in an increase of vulcanization speed and may permit vulcanization to progress at lower temperatures.

According to some embodiments, a swellable rubber composition and/or cured packer may comprise a tackifier (e.g., Struktol Koresin) content of about 0.1 wt. %, of about 0.2 wt. %, or of about 0.3 wt. %, or of about 0.4 wt. %, or of about 0.5 wt. %, or of about 0.6 wt. %, or of about 0.7 wt. %, or of about 0.8 wt. %, or of about 0.9 wt. %, or of about 1.0 wt. %, or of about 1.25 wt. %, or of about 1.5 wt. %, by weight of product.

According to some embodiments, a swellable rubber composition and/or cured packer may comprise a silica (e.g., Hisil 190G—Silica) content of about 1 wt. %, of about 2 wt. %, or of about 3 wt. %, or of about 4 wt. %, or of about 5 wt. %, or of about 7 wt. %, or of about 10 wt. %, or of about 12 wt. %, or of about 15 wt. %, or of about 17 wt. %, or of about 20 wt. %, or of about 25 wt. %, by weight of product.

According to some embodiments, a swellable rubber composition and/or cured packer may comprise a 2,2,4-Trimethyl-1,2-dihydroquinoline (e.g., Stangard TM Q) content of about 0.1 wt. %, of about 0.2 wt. %, or of about 0.3 wt. %, or of about 0.4 wt. %, or of about 0.5 wt. %, or of about 0.6 wt. %, or of about 0.7 wt. %, or of about 0.8 wt. %, or of about 0.9 wt. %, or of about 1.0 wt. %, or of about 1.25 wt. %, or of about 1.5 wt. %, by weight of product.

According to some embodiments, a swellable rubber composition and/or cured packer may comprise a N-(1,3-Dimethylbutyl)-N'-phenyl-phenylenediamine (e.g., Santoflex 6PPD) content of about 0.1 wt. %, of about 0.2 wt. %, or of about 0.3 wt. %, or of about 0.4 wt. %, or of about 0.5 wt. %, or of about 0.6 wt. %, or of about 0.7 wt. %, or of about 0.8 wt. %, or of about 0.9 wt. %, or of about 1.0 wt. %, or of about 1.25 wt. %, or of about 1.5 wt. %, by weight of product.

In exemplary embodiments, a swellable rubber composition and/or cured packer may comprise a water soluble resin, which may increase a swelling rate and a degree of swell of the elastomer. Exemplary water soluble resins that may be used comprise polyethylene oxide, carboxymethyl cellulose, polyvinyl pyrrolidone, hydroxyethyl cellulose, hydroxypropyl cellulose or combinations thereof.

In exemplary embodiments, a swellable rubber composition may include a curing agent and/or curing system. Non-limiting examples are sulfur-based curing agents or peroxide curing agents. In some embodiments, co-agents may also be included in a swellable rubber composition. A curing system may be selected to be suitable with polymers used in a swellable rubber composition.

According to some embodiments, a swellable rubber composition and/or cured packer may comprise a tetramethyl thiuram disulfide (e.g., TMTD, Vulkacit Thiuram, Tuex) content of about 0.1 wt. %, of about 0.2 wt. %, or of about 0.3 wt. %, or of about 0.4 wt. %, or of about 0.5 wt. %, or of about 0.6 wt. %, or of about 0.7 wt. %, or of about 0.8 wt. %, or of about 0.9 wt. %, or of about 1.0 wt. %, or of about 1.25 wt. %, or of about 1.5 wt. %, by weight of product.

According to some embodiments, a swellable rubber composition and/or cured packer may comprise a sulfur (e.g., Sulfur RM) content of about 0.1 wt. %, of about 0.2 wt. %, or of about 0.3 wt. %, or of about 0.4 wt. %, or of about 0.5 wt. %, or of about 0.6 wt. %, or of about 0.7 wt. %, or of about 0.8 wt. %, or of about 0.9 wt. %, or of about 1.0 wt. %, or of about 1.25 wt. %, or of about 1.5 wt. %, by weight of product.

According to some embodiments, a swellable rubber composition and/or cured packer may comprise a peroxide (e.g., Dicup 40KE Peroxide, hydrogen peroxide, 40% Dicumyl Peroxide) content of about 0.1 wt. %, of about 0.2 wt. %, or of about 0.3 wt. %, or of about 0.4 wt. %, or of about 0.5 wt. %, or of about 0.6 wt. %, or of about 0.7 wt. %, or of about 0.8 wt. %, or of about 0.9 wt. %, or of about 1.0 wt. %, or of about 1.25 wt. %, or of about 1.5 wt. %, by weight of product.

According to some embodiments, a swellable rubber composition and/or cured packer may comprise a cyclohexylthiophthalimide (e.g., Sulfur RM) content of about 0.01 wt. %, of about 0.02 wt. %, or of about 0.03 wt. %, or of about 0.04 wt. %, or of about 0.05 wt. %, or of about 0.06 wt. %, or of about 0.07 wt. %, or of about 0.08 wt. %, or of about 0.09 wt. %, or of about 0.1 wt. %, or of about 0.125 wt. %, or of about 0.15 wt. %, by weight of product.

The present disclosure is directed, at least in part, to a use of at least one powder grade of SAP that may be incorporated into swellable compositions at higher concentrations. In some embodiments, at least one powder grade SAP may be incorporated into a swellable composition without detriment to the processability and/or the quality of an elastomer rubber composition used for producing the swellable composition and/or swellable packers, both before and after curing occurs. Certain embodiments are directed to a use of powder SAPs; however, in other embodiments, granular and powder SAPs may be used in combination. The present disclosure contemplates that granular and powder grades may be combined in swellable compositions disclosed herein and in swellable packers disclosed herein. It has been unexpectedly found that increased loading of powder SAPs may be achieved (as compared to loading with granular SAPs) without degrading, or substantially degrading, the desired physical properties of the elastomer rubber composition, the cured packers and/or the cured packer after swelling. Some exemplary embodiments disclosed herein are directed to certain swellable rubber compositions, and other embodiments are directed to using powder grade SAPs in swellable packers that may have other types of rubber based elastomeric compositions.

A swellable non-elastomeric material may contribute to a high volume swell at high temperatures and/or high pressures, which characterizes the swellable rubber compositions, according to certain embodiments. This swellable non-elastomeric material includes SAPs, as well as other swellable organic or inorganic materials. In some embodiments, an SAP may comprise partially neutralized polyacrylic acid sodium salts, crosslinked isoprene-maleic acid salts, starch-polyacrylic acid salts, crosslinked carboxylmethyl celluloses (CMC), polyvinyl alcohol-acrylic acid salts, and combinations thereof. Swellable organic acid salts comprise sodium acetate, sodium formate, sodium acrylate, and combinations thereof. Swellable inorganic materials comprise carbonates of sodium, potassium, lithium, calcium, magnesium, and combinations thereof. A sodium carbonate may be used in a form of soda ash instead of pure sodium carbonate. A swellable non-elastomeric material may be a single swellable non-elastomeric material or a mixture of two or more swellable non-elastomeric material. Other non-limiting examples of swellable non-elastomeric material comprise polyacrylic acid, polymethacrylic acid, polyacrylamide, polyethyleneoxide, polyethylene glycol, polypropylene oxide, poly (acrylic acid-co-acrylamide), polymers made from zwitterionic monomers, which include N, N-dimethyl-N-acryloyloxyethyl-N-(3-sulfopropyl)-ammonium betaine, N, N-dimethyl-N-acrylamidopropyl-N-(2-carboxymethyl)-ammonium betaine, N, N-dimethyl-N-acrylamidopropyl-N-(3-sulfopropyl)-ammonium betaine, 2-(methylthio)ethyl methacryloyl-S-(sulfopropyl)-sulfonium betaine, 2-[(2-acryloylethyl)dimethylammonio]ethyl 2-methyl phosphate, [(2-acryloylethyl)dimethylammonio]methyl phosphonic acid, 2-(acryloyloxyethyl)-2'-(trimethylammonium)ethyl phosphate, 2-methacryloyloxy ethyl phosphorylcholine, 2-[(3-acrylamidopropyl)dimethylammonio] ethyl 2'-isopropyl phosphate, 1-vinyl-3-(3-sulfopropyl) imidazolium hydroxide, (2-acryloxyethyl)carboxymethyl methylsulfonium chloride, 1-(3-sulfopropyl)-2-vinylpyridinium betaine, N-(4-sulfobutyl)-N-methyl-N,N-diallylamine ammonium betaine, N,N-diallyl-N-methyl-N-(2-sulfoethyl)ammonium betaine or the like. According to some embodiments, a swellable non-elastomeric material may comprise poly-electrolytes, polyacyrlates (e.g., sodium polyacrylate), polyacryamide-co-polyacrylates (e.g., poly-acryamide-co-potassium acrylate), polyacrylamides (e.g., potassium polyacrylamide), acrylic acids, hydrophilic clays, bentonite (e.g., sodium bentonite, potassium bentonite, calcium bentonite, or Wyoming bentonite), wood, cork, and/or cellulose fibers.

According to some embodiments, a swellable rubber composition and/or cured packer may comprise a sodium polyacrylate cross linked with acrylamide (e.g., Aquasorb 3006-63) content of about 35 wt. %, of about 40 wt. %, or of about 45 wt. %, or of about 50 wt. %, or of about 55 wt. %, or of about 60 wt. %, or of about 65 wt. %, or of about 70 wt. %, or of about 75 wt. %, or of about 80 wt. %, or of about 85 wt. %, or of about 90 wt. % by weight of product.

According to some embodiments, a swellable rubber composition and/or cured packer may comprise a stearic acid content of about 0.1 wt. %, of about 0.2 wt. %, or of about 0.3 wt. %, or of about 0.4 wt. %, or of about 0.5 wt. %, or of about 0.6 wt. %, or of about 0.7 wt. %, or of about 0.8 wt. %, or of about 0.9 wt. %, or of about 1.0 wt. %, or of about 1.25 wt. %, or of about 1.5 wt. %, by weight of product.

In exemplary embodiments, a swellable rubber may comprise silica (or other filler particles) to reinforce the rubber compound. In certain embodiments, silica may be fumed silica.

In exemplary embodiments, a swellable rubber may comprise a salt, such as particles or fine particles of salt, which are incorporated into the swellable rubber to, for example, may allow migration of water, water-based fluids, salt-containing water-based fluids, and/or water formations, such as brines, into the swellable rubber by osmosis so as to introduce swelling of the swellable rubber upon migration of the water, water-based fluids, salt-containing water-based fluids, and/or water formations into the swellable rubber. Examples of salt may comprise one or more of the following metal containing salts, such as metal chlorides (e.g., sodium chloride, potassium chloride, or calcium chloride), metal phosphates (e.g., $Ca_3(PO_4)_2$), metal carbonates (e.g., $CaCO_3$ or $BaCO_3$), metal oxides (e.g., MgO), metal sulfides (e.g., ZnS), metal hydroxides (e.g., $Fe(OH)_2$), metal sulfates (e.g., $BaSO_4$), metal acetates, metal bicarbonates, metal formates, metal hydrosulphides, metal imides, metal nitrates, metal nitrides, dissociating salts, and non-metal salts (e.g., $NH_4Cl$).

In exemplary embodiments, a swellable rubber may comprise a general purpose plasticizer for rubber products, such as phthalate esters (e.g., dioctyl phthalate), trimellitates, sebacates, adipates, terephthalates, benzoates, dibenzoates, organophosphates, gluterates or azelates.

According to some embodiments, a swellable rubber composition and/or cured packer may comprise a dioctyl phthalate (e.g., DOP) content of about 0.5 wt. %, of about 1 wt. %, or of about 2 wt. %, or of about 3 wt. %, or of about 4 wt. %, or of about 5 wt. %, or of about 6 wt. %, or of about 7 wt. %, or of about 8 wt. %, or of about 9 wt. %, or of about 10 wt. %, or of about 15 wt. %, by weight of product.

In exemplary embodiments, a swellable rubber may comprise a material to reinforce a rubber compound to improve physical properties and/or color the product, such as pigments or carbon black (N-550).

According to some embodiments, a swellable rubber composition and/or cured packer may comprise a carbon black (e.g., Carbon Black N234 ISAF HS) content of about 0.5 wt. %, of about 1 wt. %, or of about 2 wt. %, or of about 3 wt. %, or of about 4 wt. %, or of about 5 wt. %, or of about 6 wt. %, or of about 7 wt. %, or of about 8 wt. %, or of about 9 wt. %, or of about 10 wt. %, or of about 15 wt. %, by weight of product.

In exemplary embodiments, a swellable rubber may comprise a material that may react with a filler particles and acts as an activator in a cure system, such as zinc oxide. Together with the zinc oxide, a rubber may further comprise stearic acid, which may react to produce a zinc stearate—an intermediate in the vulcanization mechanism.

In exemplary embodiments, a swellable rubber may comprise a water-soluble, waxy solid (e.g., polyethylene glycol), which may be used as a process aid and/or lubricant during a rubber mixing process.

In exemplary embodiments, a swellable rubber may comprise about 100 parts per hundred rubber (Phr) (i.e., the compositions comprise about 100 parts of an elastomer or combinations of elastomers) of an elastomer, about 40 Phr of polyethylene oxide, about 20 Phr of ionic peroxide cure and/or peroxide curing with a co-agent, about 126 Phr of a salt, and about 65 Phr of an SAP, clay, and/or other swelling material. In exemplary embodiments, a swellable rubber may further comprise any combination of one or more of: about 35 Phr of a cement or Portland cement, about 30 Phr of silica, about 10 Phr of dioctyl phthalate, about 8 Phr of N-550 (carbon black), about 5 Phr of zinc oxide, about 1 Phr of stearic acid, and/or about 10 Phr of PEG6000 (polyethylene glycol).

According to some embodiments, a swellable rubber composition and/or cured packer may comprise a zinc oxide content of about 0.5 wt. %, of about 1 wt. %, or of about 2 wt. %, or of about 3 wt. %, or of about 4 wt. %, or of about 5 wt. %, or of about 6 wt. %, or of about 7 wt. %, or of about 8 wt. %, or of about 9 wt. %, or of about 10 wt. %, or of about 15 wt. %, by weight of product.

In exemplary embodiments, a swellable rubber composition as described herein may be configured to swell by at least about 50%, or about 60%, or about 70%, or about 80%, or about 90%, or about 100%, or about 110%, or about 120%, or about 130%, or about 140%, or about 150%, or about 160%, or about 170%, or about 180%, or about 190%, or about 200%, or about 210%, or about 220%, or about 230%, or about 240%, or about 250% in brine solution, for example, an about 3 to about 30% brine solution, such as about 5%, or about 10%, or about 15%, or about 20%, or about 25%, or about 30% brine. A brine solution may comprise water with dissolved alkali metal salts (e.g., NaCl or KCl) and/or alkaline-earth metal salts (e.g., $CaCl_2$, $CaCO_3$, or $MgCl_2$). In exemplary embodiments, a swellable rubber composition as described herein may be configured to swell by at least the same or similar amounts in oil- or hydrocarbon-based fluids.

In exemplary embodiments, a swellable rubber may comprise the following composition, as shown in Table 1 (Composition A):

TABLE 1

Composition of Swellable Composition A

| Material Description | Parts Per Hundred (Phr) |
|---|---|
| Nitrile Rubber (e.g., NIPOL DN3350) | 5-15 (e.g., 10) |
| Styrene Butadiene Rubber (e.g., SBR 1502, Astlett) | 75-105 (e.g., 90) |
| Fumed Silica (e.g., HISIL 190G) | 40-50 (e.g., 45) |
| Carbon Black (e.g., N234) | 5-15 (e.g., 8) |
| Dioctyl Phthalate (DOP) | 3-9 (e.g., 6) |
| Zinc Oxide | 3-7 (e.g., 5) |
| Antiozonant (e.g., 6PPD) | 0.5-2 (e.g., 1) |
| Antidegradant (e.g., TMQ) | 0.5-2.5 (e.g., 1.5) |
| Tackifier (e.g., KORESIN BASF) | 1-5 (e.g., 3) |
| Potassium polyacrylate polyacrylamide copolymer (e.g., SAP) powder (mean particle size 35 μm, median particle size 35 μm, standard deviation of 10 μm, and substantially no particles over 75 μm) | 125-175 (e.g., 150) |
| Sulfur | 0.5-1.5 (e.g., 1) |
| Tetramethylthiuram disulfide (TMTD) | 1-3 (e.g., 2) |
| Inhibitor (e.g., PVI, Akrochem CTP or retarder CTP) | 0.3-0.7 (e.g., 0.5) |
| Stearic Acid | 0.5-3 (e.g., 1) |

In exemplary embodiments, the swellable rubber may comprise the following composition, as shown in Table 2 (Composition B):

TABLE 2

Composition of Swellable Composition B

| Material Description | Parts Per Hundred (Phr) |
|---|---|
| hydrogenated saturated nitrile rubber (e.g., Zetpol 2030L) | 5-15 (e.g., 10) |
| Styrene Butadiene Rubber (e.g., SBR 1502, Astlett) | 75-105 (e.g., 90) |
| Fumed Silica (e.g., HISIL 190G) | 40-50 (e.g., 45) |
| Carbon Black (e.g., N234) | 5-15 (e.g., 8) |
| Dioctyl Phthalate (DOP) | 3-9 (e.g., 6) |
| Zinc Oxide | 3 to 7 (e.g., 5) |
| Antiozonant (e.g., 6PPD) | 0.5-2 (e.g., 1) |
| Antidegradant (e.g., TMQ) | 0.5-2.5 (e.g., 1.5) |
| Tackifier (e.g., KORESIN BASF) | 1-5 (e.g., 3) |
| Potassium polyacrylate polyacrylamide copolymer (e.g., SAP) powder (mean particle size 35 μm, median particle size 35 μm, standard deviation of 10 μm, and substantially no particles over 75 μm) | 180-220 (e.g., 205) |
| Sulfur | 0.5-1.5 (e.g., 1) |
| Tetramethylthiuram disulfide (TMTD) | 1-3 (e.g., 2) |
| Inhibitor (e.g., PVI, Akrochem CTP or retarder CTP) | 0.3-0.7 (e.g., 0.5) |
| Stearic Acid | 0.5-3 (e.g., 1) |

In exemplary embodiments, the swellable rubber may comprise the following composition, as shown in Table 3 (Composition C):

TABLE 3

Composition of Swellable Composition C

| Material Description | Parts Per Hundred (Phr) |
|---|---|
| acrylonitrile butadiene rubber (NBR) (e.g., Nipol DN3350, Zeon) | 5-15 (e.g., 10) |
| Styrene Butadiene Rubber (e.g., SBR 1502, Astlett) | 75-105 (e.g., 90) |
| Fumed Silica (e.g., HISIL 190G, PPG) | 40-50 (e.g., 45) |
| Carbon Black (e.g., N234) | 5-15 (e.g., 8) |
| Dioctyl Phthalate (DOP) | 3-9 (e.g., 6) |
| Zinc Oxide | 3 to 7 (e.g., 5) |
| Antiozonant (e.g., 6PPD, Eastman) | 0.5-2 (e.g., 1) |
| Antidegradant (e.g., TMQ) | 0.5-2.5 (e.g., 1.5) |
| Tackifier (e.g., KORESIN BASF) | 1-5 (e.g., 3) |
| Potassium polyacrylate polyacrylamide copolymer (e.g., SAP, Evonik) powder and substantially no particles t over 75 μm | 200-210 (e.g., 205) |
| Sulfur | 0.5-1.5 (e.g., 1) |
| Tetramethylthiuram disulfide (TMTD) | 1-3 (e.g., 2) |
| Inhibitor (e.g., PVI, Akrochem CTP or retarder CTP) | 0.25-0.75 (e.g., 0.5) |
| Stearic Acid | 0.5-3 (e.g., 1) |

In exemplary embodiments, the swellable rubber may comprise the following composition, as shown in Table 4 (Composition D):

TABLE 4

Composition of Swellable Composition D

| Material Description | Parts Per Hundred (Phr) |
|---|---|
| acrylonitrile butadiene rubber (NBR) (e.g., Nipol DN3350, Zeon) | 5-15 (e.g., 10) |
| Styrene Butadiene Rubber (e.g., SBR 1502, Astlett) | 75-105 (e.g., 90) |
| Fumed Silica (e.g., HISIL 190G, PPG) | 40-50 (e.g., 45) |
| Carbon Black (e.g., N234) | 5-15 (e.g., 8) |
| Dioctyl Phthalate (DOP) | 3-9 (e.g., 6) |
| Zinc Oxide | 3 to 7 (e.g., 5) |
| Antiozonant (e.g., 6PPD, Eastman) | 0.5-2 (e.g., 1) |
| Antidegradant (e.g., TMQ) | 0.5-2.5 (e.g., 1.5) |
| Tackifier (e.g., KORESIN BASF) | 1-5 (e.g., 3) |
| Potassium polyacrylate polyacrylamide copolymer (e.g., SAP, Evonik) powder and substantially no particles over 75 μm | 185-210 (e.g., 197) |
| Sulfur | 0.5-1.5 (e.g., 1) |
| Tetramethylthiuram disulfide (TMTD) | 1-3 (e.g., 2) |
| Inhibitor (e.g., PVI, Akrochem CTP or retarder CTP) | 0.25-0.75 (e.g., 0.5) |
| Stearic Acid | 0.5-3 (e.g., 1) |

In exemplary embodiments, the swellable rubber may comprise the following composition, as shown in Table 5 (Composition E):

TABLE 5

Composition of Swellable Composition E

| Material Description | Parts Per Hundred (Phr) |
|---|---|
| acrylonitrile butadiene rubber (NBR) (e.g., Nipol DN3350, Zeon) | 5-15 (e.g., 10) |
| Styrene Butadiene Rubber (e.g., SBR 1502, Astlett) | 75-105 (e.g., 90) |
| Fumed Silica (e.g., HISIL 190G) | 40-50 (e.g., 45) |
| Carbon Black (e.g., N234) | 5-15 (e.g., 8) |
| Dioctyl Phthalate (DOP) | 3-9 (e.g., 6) |

TABLE 5-continued

Composition of Swellable Composition E

| Material Description | Parts Per Hundred (Phr) |
|---|---|
| Zinc Oxide | 3 to 7 (e.g., 5) |
| Antiozonant (e.g., 6PPD) | 0.5-2 (e.g., 1) |
| Antidegradant (e.g., TMQ) | 0.5-2.5 (e.g., 1.5) |
| Tackifier (e.g., KORESIN BASF) | 1-5 (e.g., 3) |
| Potassium polyacrylate polyacrylamide copolymer (e.g., SAP, Evonik) powder and substantially no particles over 75 μm | 200-210 (e.g., 205) |
| Sulfur | 0.5-1.5 (e.g., 1) |
| Mercaptobenzothiazole disulfide (MBTS) | 1-3 (e.g., 2) |
| Methyl Methacrylate Butadiene Styrene (MBS) | 0.25-0.75 (e.g., 0.5) |
| Stearic Acid | 0.5-3 (e.g., 1) |

In exemplary embodiments, the swellable rubber may comprise the following composition, as shown in Table 6 (Composition F):

TABLE 6

Composition of Swellable Composition F

| Material Description | Parts Per Hundred (Phr) |
|---|---|
| acrylonitrile butadiene rubber (NBR) (e.g., Nipol DN3350, Zeon) | 5-15 (e.g., 10) |
| Polybutadiene Rubber (BR) (e.g., KBR 01, Kumho) | 75-105 (e.g., 90) |
| Fumed Silica (e.g., HISIL 190G, PPG) | 40-50 (e.g., 45) |
| Carbon Black (e.g., N234) | 5-15 (e.g., 8) |
| Dioctyl Phthalate (DOP) | 3-9 (e.g., 6) |
| Zinc Oxide | 3 to 7 (e.g., 5) |
| Antiozonant (e.g., 6PPD, Eastman) | 0.5-2 (e.g., 1) |
| Antidegradant (e.g., TMQ) | 0.5-2.5 (e.g., 1.5) |
| Tackifier (e.g., KORESIN BASF) | 1-5 (e.g., 3) |
| Potassium polyacrylate polyacrylamide copolymer (e.g., SAP, Evonik) powder and substantially no particles over 75 μm | 200-210 (e.g., 205) |
| Sulfur | 0.5-1.5 (e.g., 1) |
| Tetramethylthiuram disulfide (TMTD) | 1-3 (e.g., 2) |
| Inhibitor (e.g., PVI, Akrochem CTP or retarder CTP) | 0.25-0.75 (e.g., 0.5) |
| Stearic Acid | 0.5-3 (e.g., 1) |

In exemplary embodiments, the swellable rubber may comprise the following composition, as shown in Table 7 (Composition G):

TABLE 7

Composition of Swellable Composition G

| Material Description | Parts Per Hundred (Phr) |
|---|---|
| acrylonitrile butadiene rubber (NBR) (e.g., Nipol DN3350, Zeon) | 35-55 (e.g., 45) |
| Polybutadiene Rubber (BR) (e.g., KBR 01, Kumho) | 35-55 (e.g., 45) |
| hydrogenated saturated nitrile rubber (e.g., Zetpol 2030L) | 5-15 (e.g., 10) |
| Fumed Silica (e.g., HISIL 190G, PPG) | 40-50 (e.g., 45) |
| Carbon Black (e.g., N234) | 5-15 (e.g., 8) |
| Dioctyl Phthalate (DOP) | 3-9 (e.g., 6) |
| Zinc Oxide | 3 to 7 (e.g., 5) |
| Antiozonant (e.g., 6PPD, Eastman) | 0.5-2 (e.g., 1) |
| Antidegradant (e.g., TMQ) | 0.5-2.5 (e.g., 1.5) |
| Tackifier (e.g., KORESIN BASF) | 1-5 (e.g., 3) |
| Potassium polyacrylate polyacrylamide copolymer (e.g., SAP, Evonik) powder and substantially no particles over 75 μm | 200-210 (e.g., 205) |
| Sulfur | 0.5-1.5 (e.g., 1) |
| Tetramethylthiuram disulfide (TMTD) | 1-3 (e.g., 2) |
| Inhibitor (e.g., PVI, Akrochem CTP or retarder CTP) | 0.25-0.75 (e.g., 0.5) |
| Stearic Acid | 0.5-3 (e.g., 1) |

In exemplary embodiments, the swellable rubber may comprise the following composition, as shown in Table 8 (Composition H):

TABLE 8

Composition of Swellable Composition H

| Material Description | Parts Per Hundred (Phr) |
|---|---|
| acrylonitrile butadiene rubber (NBR) (e.g., Nipol DN4050, Zeon) | 85-115 (e.g., 100) |
| Silica (e.g., Ultrasil VN3, Evonik) | 20-40 (e.g., 30) |
| Carbon Black (e.g., N550) | 5-15 (e.g., 8) |
| Polyethylene Glycol (e.g., PEG 6000) | 5-15 (e.g., 10) |
| Polyethylene Oxide (e.g., PEO-3) | 35-45 (e.g., 40) |
| Dioctyl Phthalate (DOP) | 7-13 (e.g., 10) |
| Zinc Oxide | 3 to 7 (e.g., 5) |
| Antiozonant (e.g., 6PPD, Eastman) | 0.5-2 (e.g., 1) |
| Antidegradant (e.g., TMQ) | 0.5-2.5 (e.g., 1.5) |
| Tackifier (e.g., KORESIN BASF) | 1-5 (e.g., 3) |
| Potassium polyacrylate polyacrylamide copolymer (e.g., SAP) powder and substantially no particles over 75 μm | 75-125 (e.g., 100) |
| Sulfur | 1.5-2.5 (e.g., 2) |
| 4,4'-dithiodimorpholine (DTDM) | 0.5-1.5 (e.g., 1) |
| Mercaptobenzothiazole (MBT) | 0.25-0.75 (e.g., 0.5) |
| Stearic Acid | 0.5-3 (e.g., 1) |

In exemplary embodiments, the swellable rubber may comprise the following composition, as shown in Table 9 (Composition I):

TABLE 9

Composition of Swellable Composition I

| Material Description | Parts Per Hundred (Phr) |
|---|---|
| acrylonitrile butadiene rubber (NBR) (e.g., Nipol DN3350, Zeon) | 7-13 (e.g., 10) |
| Ethylene Propylene Diene Terpolymer monomer rubber (EPDM) (e.g., Buna EPT 3950, Lanxess) | 80-100 (e.g., 90) |
| Fumed Silica (e.g., HISIL 190G, PPG) | 40-50 (e.g., 45) |
| Carbon Black (e.g., N234) | 5-15 (e.g., 10) |
| Polyethylene Glycol (e.g., PEG 6000) | 3-7 (e.g., 5) |
| Zinc Oxide | 3 to 7 (e.g., 5) |
| Vinyltris(2-methoxyethoxy)silane (e.g., JHV172, Chemspec) | 2-6 (e.g., 4) |
| Trioctyl Trimellitate (e.g., TOTM, Hallstar) | 4-8 (e.g., 6) |
| Tackifier (e.g., KORESIN BASF) | 1-5 (e.g., 3) |
| Potassium polyacrylate polyacrylamide copolymer (e.g., SAP, Evonik) powder and substantially no particles over 75 μm | 205-225 (e.g., 215) |
| Sulfur | 0.5-1.5 (e.g., 1) |
| Tetramethylthiuram disulfide (TMTD) | 1-3 (e.g., 2) |
| Vanox ZMTI (Vanderbilt) | 1.5-2.5 (e.g., 2) |
| Accelerator Zinc Dibenzyl Dithiocarbamate (ZBED) | 0.5-1.5 (e.g., 1) |
| Stearic Acid | 0.5-3 (e.g., 1) |

In exemplary embodiments, the swellable rubber may comprise the following composition, as shown in Table 10 (Composition J):

TABLE 10

Composition of Swellable Composition J

| Material Description | Parts Per Hundred (Phr) |
|---|---|
| Hydrogenated saturated nitrile rubber (e.g., Zetpol 2030L) | 5-15 (e.g., 10) |
| Natural rubber (e.g., SVR10) | 75-105 (e.g., 90) |
| Peptizer (e.g., Struktol A60) | 1-4 (e.g., 2.5) |
| Fumed Silica (e.g., HISIL 190G) | 40-50 (e.g., 45) |
| Carbon Black (e.g., N234) | 5-15 (e.g., 8) |
| Dioctyl Phthalate (DOP) | 3-9 (e.g., 6) |
| Zinc Oxide | 3 to 7 (e.g., 5) |
| Antiozonant (e.g., 6PPD) | 0.5-2 (e.g., 1) |
| Antidegradant (e.g., TMQ) | 0.5-2.5 (e.g., 1.5) |
| Tackifier (e.g., KORESIN BASF) | 1-5 (e.g., 3) |
| Potassium polyacrylate polyacrylamide copolymer (e.g., SAP) powder (mean particle size 35 µm, median particle size 35 µm, standard deviation of 10 µm, and substantially no particles over 63 µm) | 185-215 (e.g., 197) |
| Sulfur | 0.5-1.5 (e.g., 1) |
| Tetramethylthiuram disulfide (TMTD) | 1-3 (e.g., 2) |
| Inhibitor (e.g., PVI, Akrochem CTP or retarder CTP) | 0.3-0.7 (e.g., 0.5) |
| Stearic Acid | 0.5-3 (e.g., 1) |

In exemplary embodiments, the swellable rubber may comprise the following composition, as shown in Table 11 (Composition K):

TABLE 11

Composition of Swellable Composition K

| Material Description | Parts Per Hundred (Phr) |
|---|---|
| Hydrogenated saturated nitrile rubber (e.g., Zetpol 2030L) | 5-15 (e.g., 10) |
| Synthetic polyisoprene (e.g., Natsyn 2200) | 75-105 (e.g., 90) |
| Fumed Silica (e.g., HISIL 190G) | 40-50 (e.g., 45) |
| Carbon Black (e.g., N234) | 5-15 (e.g., 8) |
| Dioctyl Phthalate (DOP) | 3-9 (e.g., 6) |
| Zinc Oxide | 3 to 7 (e.g., 5) |
| Antiozonant (e.g., 6PPD) | 0.5-2 (e.g., 1) |
| Antidegradant (e.g., TMQ) | 0.5-2.5 (e.g., 1.5) |
| Tackifier (e.g., KORESIN BASF) | 1-5 (e.g., 3) |
| Potassium polyacrylate polyacrylamide copolymer (e.g., SAP) powder and substantially no particles over 75 µm) | 180-220 (e.g., 205) |
| Sulfur | 0.5-1.5 (e.g., 1) |
| Tetramethylthiuram disulfide (TMTD) | 1-3 (e.g., 2) |
| Inhibitor (e.g., PVI, Akrochem CTP or retarder CTP) | 0.3-0.7 (e.g., 0.5) |
| Stearic Acid | 0.5-3 (e.g., 1) |

In exemplary embodiments, the swellable rubber may comprise the following composition, as shown in Table 12 (Composition L):

TABLE 12

Composition of Swellable Composition L

| Material Description | Parts Per Hundred (Phr) |
|---|---|
| Hydrogenated saturated nitrile rubber (e.g., Zetpol 2030L) | 80-100 (e.g., 90) |
| Styrene Butadiene Rubber (e.g., SBR 1502, Astlett) | 5-20 (e.g., 10) |
| Fumed Silica (e.g., HISIL 190G) | 40-50 (e.g., 45) |
| Carbon Black (e.g., N234) | 5-15 (e.g., 8) |
| Dioctyl Phthalate (DOP) | 3-9 (e.g., 6) |
| Zinc Oxide | 3 to 7 (e.g., 5) |
| Antiozonant (e.g., 6PPD) | 0.5-2 (e.g., 1) |
| Antidegradant (e.g., TMQ) | 0.5-2.5 (e.g., 1.5) |
| Tackifier (e.g., KORESIN BASF) | 1-5 (e.g., 3) |
| Potassium polyacrylate polyacrylamide copolymer (e.g., SAP) powder and substantially no particles over 75 µm | 160-180 (e.g., 170) |
| Sulfur | 0.5-1.5 (e.g., 1) |
| Tetramethylthiuram disulfide (TMTD) | 1-3 (e.g., 2) |
| Inhibitor (e.g., PVI, Akrochem CTP or retarder CTP) | 0.3-0.7 (e.g., 0.5) |
| Stearic Acid | 0.5-3 (e.g., 1) |

It is understood that the listed apparatuses for each unit are for illustration purposes only, and this is not intended to limit the scope of the application. A specific combination of these or other apparatuses or units can be configured in such a system for the intended use based on the teachings in the application.

Persons skilled in the art may make various changes in the shape, size, number, separation characteristic, and/or arrangement of parts without departing from the scope of the instant disclosure. Persons skilled in the art may make various changes in the kind, number, and/or arrangement of R-groups, substituents, and/or heteroatoms without departing from the scope of the instant disclosure. Each disclosed method and method step may be performed in association with any other disclosed method or method step and in any order according to some embodiments. Where the verb "may" appears, it is intended to convey an optional and/or permissive condition, but its use is not intended to suggest any lack of operability unless otherwise indicated. Persons skilled in the art may make various changes in methods of preparing and using a composition, device, and/or system of the disclosure. Where desired, some embodiments of the disclosure may be practiced to the exclusion of other embodiments.

Also, where ranges have been provided, the disclosed endpoints may be treated as exact and/or approximations as desired or demanded by the particular embodiment. Where the endpoints are approximate, the degree of flexibility may vary in proportion to the order of magnitude of the range. For example, on one hand, a range endpoint of about 50 in the context of a range of about 5 to about 50 may include 50.5, but not 52.5 or 55 and, on the other hand, a range endpoint of about 50 in the context of a range of about 0.5 to about 50 may include 55, but not 60 or 75. In addition, it may be desirable, in some embodiments, to mix and match range endpoints. Also, in some embodiments, each figure disclosed (e.g., in one or more of the examples, tables, and/or drawings) may form the basis of a range (e.g., depicted value+/− about 10%, depicted value+/− about 50%, depicted value+/− about 100%) and/or a range endpoint. With respect to the former, a value of 50 depicted in an example, table, and/or drawing may form the basis of a range of, for example, about 45 to about 55, about 25 to about 100, and/or about 0 to about 100.

These equivalents and alternatives along with obvious changes and modifications are intended to be included within the scope of the present disclosure. Accordingly, the foregoing disclosure is intended to be illustrative, but not limiting, of the scope of the disclosure as illustrated by the appended claims.

The title, abstract, background, and headings are provided in compliance with regulations and/or for the convenience of the reader. They include no admissions as to the scope and content of prior art and no limitations applicable to all disclosed embodiments.

EXAMPLES

Example 1

Packers having one or more of the materials listed in Composition B within the identified ranges were prepared and tested. Tests were conducted in 5% brine and 16% brine. Both of the packers were prepared and tested under similar conditions.

The packer tested in 16% brine was prepared and tested as follows. The base pipe was five feet in length and had an outer diameter of 4.5 inches. The swellable rubber was applied to the base pipe using a wrapping technique. The outer diameter after adding the swellable rubber formulation was about 5.7 inches. Diameter of the packer was measured in one foot increments from the low pressure side to the high pressure side. The swellable rubber formulation was cured at 330 degrees Fahrenheit at a pressure of 70 psi for 2.5 hours. After curing, the hardness was measured at random locations, and the hardness was from about 86 to 92 Shore A. The packer was inspected, and no bonding issues were detected. The packer was placed in 16% brine solution at a temperature of 275 degrees Fahrenheit and at a pressure of about 300 psi for multiple days. The packer was then subjected to a differential pressure of at least 5000 psi before being removed and inspected. The above described data and measurements are reproduced below in Table 13.

TABLE 13

Data and Measurements of Example 1

| | | | | | |
|---|---|---|---|---|---|
| Base Pipe OD (in) | | | 4.5" | | |
| Packer OD (in) | | | 5.7" | | |
| Fluid Type | | | | | |
| Record the Rubber Type | | | Composition B (above) | | |
| Element Length (Feet) | | | 5 | | |
| Temperature (° F.) | | | 275 | | |
| Salinity (%) | | | 16% | | |
| Refresh Schedule (Hours) | | | 0 | | |
| Pressure Requirements (PSI) | | | 5000 | | |
| Expected Contact Time (Days) | | | 5 | | |
| Time to Apply Pressure (Days) | | | 17 | | |
| Manufacturing | | | Calendar Wrap | | |
| Temperature (° F.) | | | 330 | | |
| Pressure (PSI) | | | 70 | | |
| Time Duration (hrs.) | | | 2.5 | | |
| Nylon Wrap Pull (Pounds) | | | 100 | | |
| Dia. #0 (in): | 5.69 | Dia. #1 (in): | 5.7 | Dia. #2 (in): | 5.7 |
| Dia. #3 (in): | 5.7 | Dia. #4 (in): | 5.7 | Dia. #5 (in): | 5.69 |
| Hardness Test. #1: | 92 | Hardness Test. #2: | 90 | Hardness Test. #3: | 89 |
| Hardness Test. #4: | 88 | Hardness Test. #5: | 86 | Hardness Test. #6: | 90 |

The outer diameter after swelling was around 6 inches. Diameter of the packer was measured in one foot increments from the low pressure side to the high pressure side. The Shore A hardness varied from about 32 to 48. After being subjected to the test conditions for multiple days, the swelled packer was able to withstand a differential pressure of greater than 5000 psi. Measurements on the packer after the test are reproduced below in Table 14. Graphical representations of test results are depicted in FIGS. 11A-B. As shown in FIG. 11A, pressure was incrementally applied up to a pressure differential between the high pressure side and the low pressure side of over 5000 psi, and the pressure differential was maintained for over one hour. As shown in FIG. 11B, pressure of over 5000 psi was instantaneously applied up to a pressure differential between the high pressure side and the low pressure side of over 5000 psi, and the pressure differential was maintained for over one hour.

TABLE 14

Measurements on a Packer after a Test

| | | | | | |
|---|---|---|---|---|---|
| Dia. #0 (in): | N/A | Dia. #1 (in): | N/A | Dia. #2 (in): | N/A |
| Dia. #3 (in): | 6 | Dia. #4 (in): | 6 | Dia. #5 (in): | 6.03 |
| | 0:00 (Top) | 3:00 | 6:00 | 9:00 | |
| Hardness Test. #1: | 36 | 32 | 42 | 42 | |
| Hardness Test. #2: | 37 | 42 | 40 | 42 | |
| Hardness Test. #3: | 42 | 42 | 38 | 40 | |
| Hardness Test. #4: | 42 | 42 | 36 | 35 | |
| Hardness Test. #5: | 46 | 8 | 7 | 3 | |
| Hardness Test. #6: | 43 | 2 | 2 | 2 | |

The packer tested in 5% brine was prepared and tested as follows. The base pipe was five feet in length and had an outer diameter of 4.5 inches. The swellable rubber was applied to the base pipe using a wrapping technique. The outer diameter after adding of the swellable rubber formulation was about 5.7 inches. Diameter of the packer was measured in one foot increments from the low pressure side to the high pressure side. The swellable rubber formulation was cured at 330 degrees Fahrenheit at a pressure of 70 psi for 2.5 hours. After curing, the hardness was measured at random locations and the hardness was from about 90 to 95 Shore A. The packer was inspected, and no bonding issues were detected. The packer was placed in 5% brine solution at a temperature of 275 degrees Fahrenheit and a pressure of over 5000 psi for multiple days. The packer was then removed and inspected. The above described data is reproduced below in Table 15.

TABLE 15

Measurements and Data of a Swellable Rubber Formulation

| | | | | | |
|---|---|---|---|---|---|
| Base Pipe OD (in) | | | 4.5" | | |
| Packer OD (in) | | | 5.7" | | |
| Fluid Type | | | | | |
| Record the Rubber Type | | | Composition B (above) | | |
| Element Length (Feet) | | | 5 | | |
| Temperature (° F.) | | | 275 | | |
| Salinity (%) | | | 5% | | |
| Refresh Schedule (Hours) | | | 0 | | |
| Pressure Requirements (PSI) | | | 5000 | | |
| Expected Contact Time (Days) | | | 2 | | |
| Time to Apply Pressure (Days) | | | 8 | | |
| Manufacturing | | | Calendar Wrap | | |
| Temperature (° F.) | | | 330 | | |
| Pressure (PSI) | | | 70 | | |
| Time Duration (hrs.) | | | 2.5 | | |
| Nylon Wrap Pull (Pounds) | | | 100 | | |
| Dia. #0 (in): | 5.69 | Dia. #1 (in): | 5.69 | Dia. #2 (in): | 5.7 |
| Dia. #3 (in): | 5.7 | Dia. #4 (in): | 5.7 | Dia. #5 (in): | 5.7 |
| Hardness Test. #1: | 91 | Hardness Test. #2: | 91 | Hardness Test. #3: | 95 |
| Hardness Test. #4: | 2 | Hardness Test. #5: | 2 | Hardness Test. #6: | 90 |

The outer diameter after swelling was about 6 inches. Diameter of the packer was measured in one foot increments from the low pressure side to the high pressure side. The Shore A hardness varied from about 32 to 50. After being subjected to the test conditions for multiple days the swelled packer was able to withstand a differential pressure of greater than 5000 psi. Measurements on the packer after the test are reproduced below in Table 16. A graphical representation of test results are depicted in FIG. 12. As shown in FIG. 12, pressure was incrementally applied up to a pressure differential between the high pressure side and the low pressure side of over 5000 psi, and the pressure differential was maintained for over one hour.

TABLE 16

Measurements and Data of a Swellable Rubber Formulation

| Dia. #0 (in): | N/A | Dia. #1 (in): | 5.98 | Dia. #2 (in): | 5.98 |
|---|---|---|---|---|---|
| Dia. #3 (in): | 5.98 | Dia. #4 (in): | 5.97 | Dia. #5 (in): | 6.05 |

| | 0:00 (Top) | 3:00 | 6:00 | 9:00 |
|---|---|---|---|---|
| Hardness Test. #1: | 37 | 37 | 3 | 2 |
| Hardness Test. #2: | 35 | 0 | 5 | 3 |
| Hardness Test. #3: | 39 | 7 | 3 | 3 |
| Hardness Test. #4: | 35 | 2 | 8 | 4 |
| Hardness Test. #5: | 47 | 6 | 0 | 1 |
| Hardness Test. #6: | 43 | 2 | 2 | 8 | set forth in Table 5 below. The particle size distributions of the SAPs in Table 16 were measured from the actual lots used in this example.

TABLE 16

SAP Particle Size Comparisons
Particle size (μm)

| | Powder | Medium Granular | Large Granular |
|---|---|---|---|
| Mean | 35.33 | 298.67 | 666.23 |
| Median | 5 | 261 | 652 |
| Std dev | 10.61 | 97.72 | 161.09 |

The sample pucks were tested at 200 degrees Fahrenheit in a solution with 5% brine by volume and in a solution with 16% brine by volume. The sample pucks were also tested at 275 degrees Fahrenheit in a solution with 5% brine by volume and in a solution with 16% by volume brine. The test results from this test are set forth below in Table 17.

TABLE 17

Test Results for Example 2

| | 1 | 2 | 3 | 4 | 5 | 6 | 7 | 8 | 9 | 10 | 11 | 12 |
|---|---|---|---|---|---|---|---|---|---|---|---|---|
| Powder SAP | 110 phr | | | 130 phr | | | 150 phr | | | 170 phr | | |
| Medium Granular SAP | | 110 phr | | | 130 phr | | | 150 phr | | | 170 phr | |
| Large Granular SAP | | | 110 phr | | | 130 phr | | | 150 phr | | | 170 phr |
| Physical Properties | | | | | | | | | | | | |
| Tensile Strength | 781 | 502 | 391 | 686 | 421 | 401 | 542 | 390 | 336 | 655 | 378 | 294 |
| Elongation | 360 | 339 | 289 | 224 | 429 | 238 | 223 | 403 | 164 | 66 | 219 | 256 |
| Hardness (shore A) | 93 | 88 | 89 | 91 | 87 | 95 | 94 | 91 | 95 | 95 | 94 | 93 |
| Specific Gravity | 1.26 | 1.26 | 1.25 | 1.30 | 1.27 | 1.28 | 1.27 | 1.28 | 1.29 | 1.28 | 1.29 | 1.29 |
| SAP Leaching, 0%/200° F./7 days | | | | | | | | | | | | |
| Jar Mass ($M_j$) | 180.1 | 178.33 | 180.08 | 178.36 | 180.23 | 180.14 | 178.21 | 180.03 | 178.34 | 178.44 | 180.14 | 180.16 |
| Button Mass ($M_g$) | 15.26 | 15.21 | 14.93 | 15.52 | 15.43 | 15.96 | 15.81 | 15.45 | 15.34 | 16.04 | 15.69 | 15.47 |
| Total Mass After Drying ($M_{final}$) | 180.69 | 180.7 | 183.85 | 179.42 | 183.48 | 185.06 | 179.48 | 183.17 | 183.48 | 179.75 | 184.75 | 185.7 |
| SAP Mass ($M_{SAP}$) | 0.59 | 2.37 | 3.77 | 1.06 | 3.25 | 4.92 | 1.27 | 3.14 | 5.14 | 1.31 | 4.61 | 5.54 |
| Leaching % (L) | 3.87 | 15.58 | 25.25 | 6.83 | 21.06 | 30.83 | 8.03 | 20.32 | 33.51 | 8.17 | 29.38 | 35.81 |
| Puck Swelling | | | | | | | | | | | | |
| 200° F., 5% brine — Day 4 Swell (%) | 38.63 | 35.75 | 35.08 | 45.97 | 44.31 | 76.89 | 52.85 | 57.02 | 57.06 | 62.62 | 44.75 | 82.9 |
| 200° F., 16% brine — Day 4 Swell (%) | 22.08 | 25.17 | 30.68 | 26.53 | 32.66 | 36.02 | 32.59 | 37.11 | 36.36 | 37.49 | 29.43 | 43.47 |
| 275° F., 5% brine — Day 4 Swell (%) | 55.26 | 54.59 | 62.57 | 63.37 | 77 | 76.89 | 71.25 | 84.56 | 100.62 | 81.33 | 80.53 | 98.67 |
| 275° F., 16% brine — Day 4 Swell (%) | 30.2 | 39.9 | 35.62 | 36.27 | 41.9 | 39.73 | 32.59 | 48.16 | 55.04 | 54.21 | 40.39 | 70.52 |

Example 2

Figure 2A:
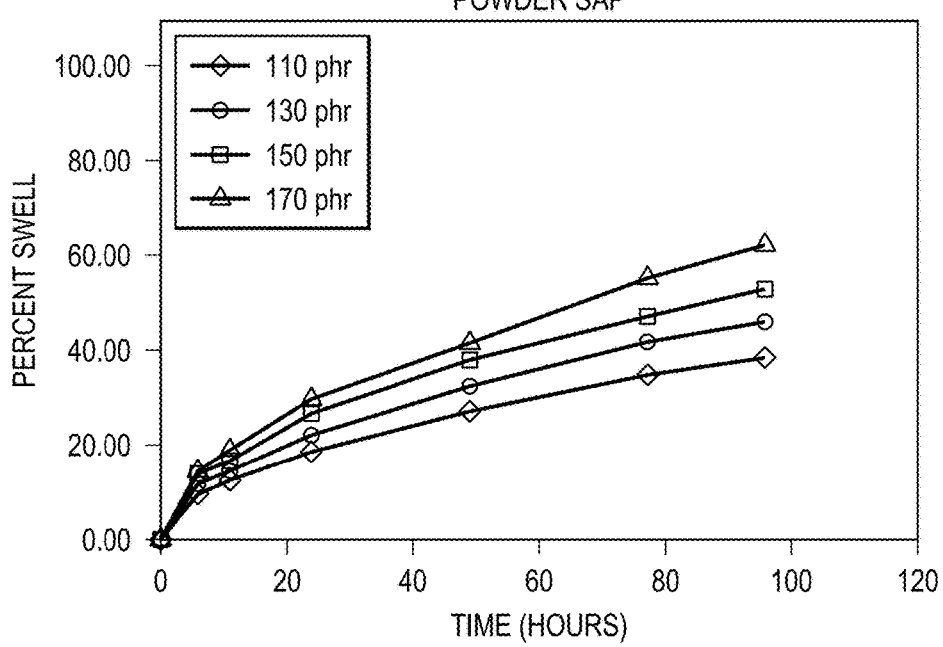
Figure 2B:
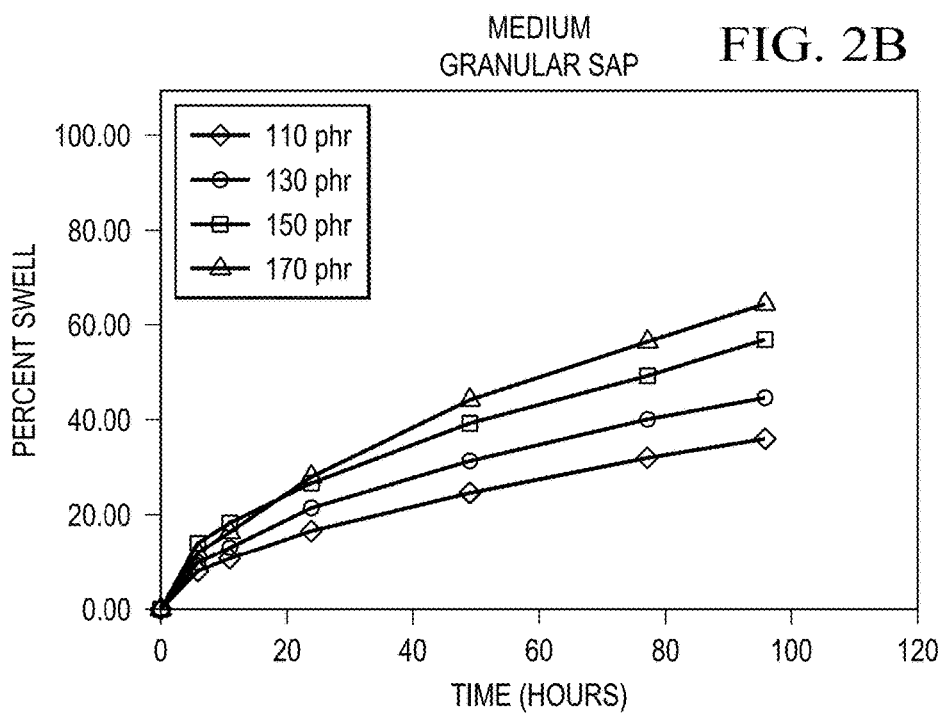
Figure 3B:
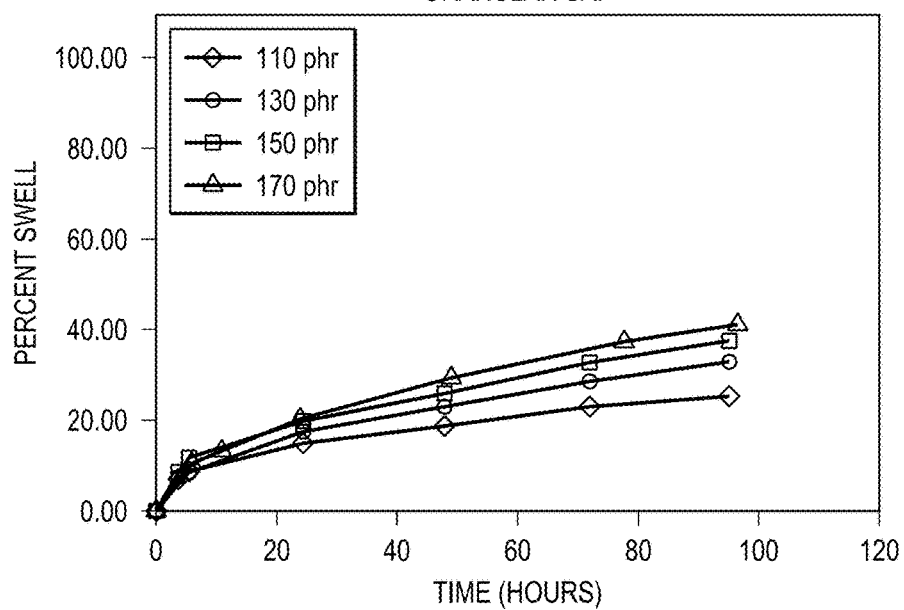
Figure 3C:
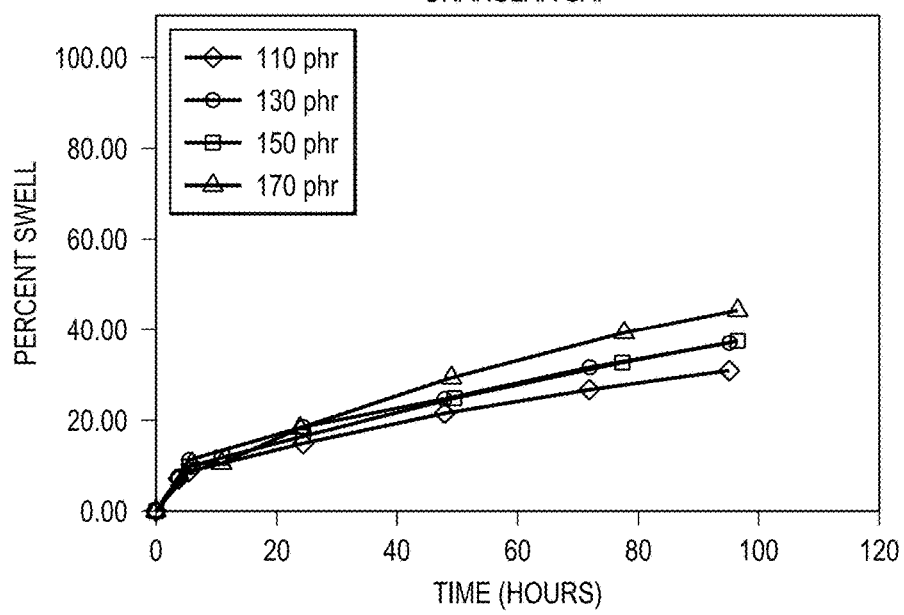
Figure 4A:
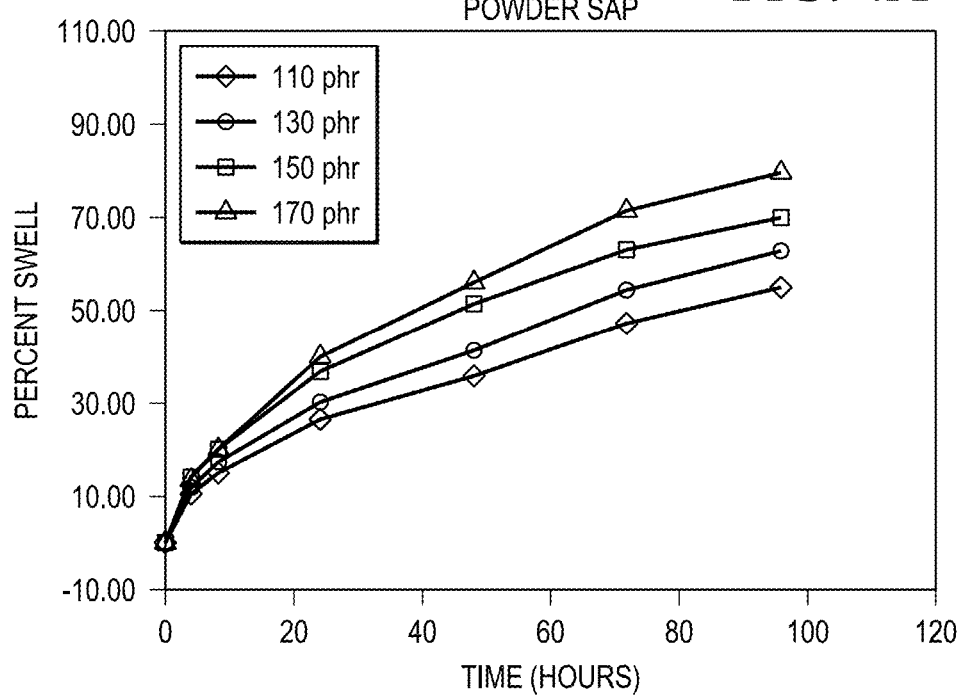
Figure 4B:
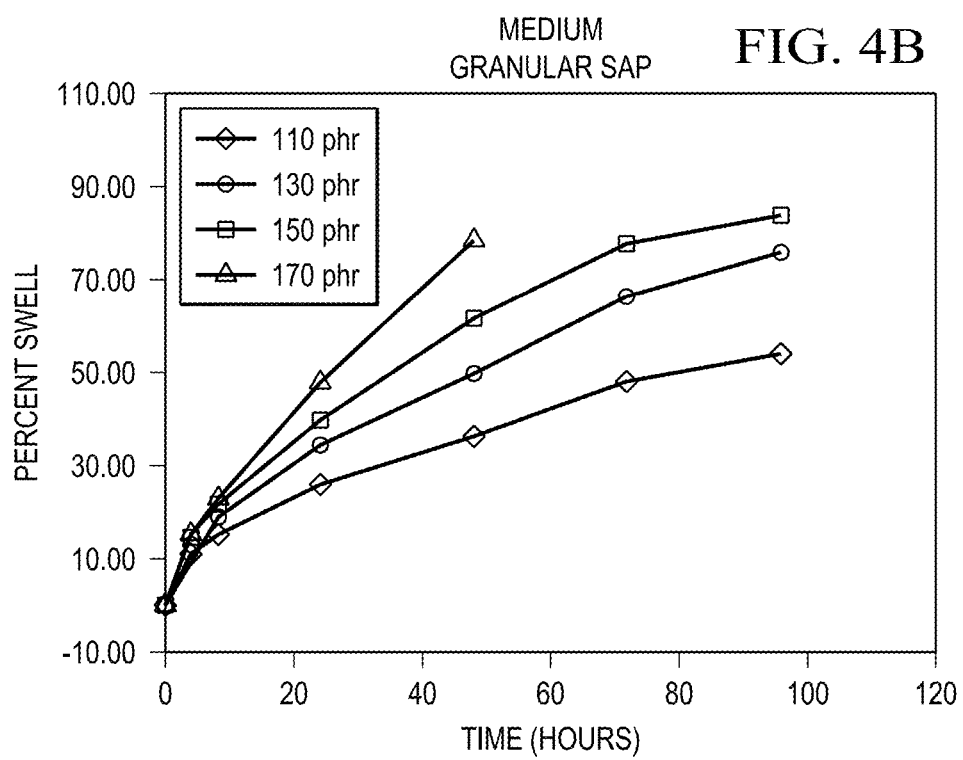
Figure 4C:
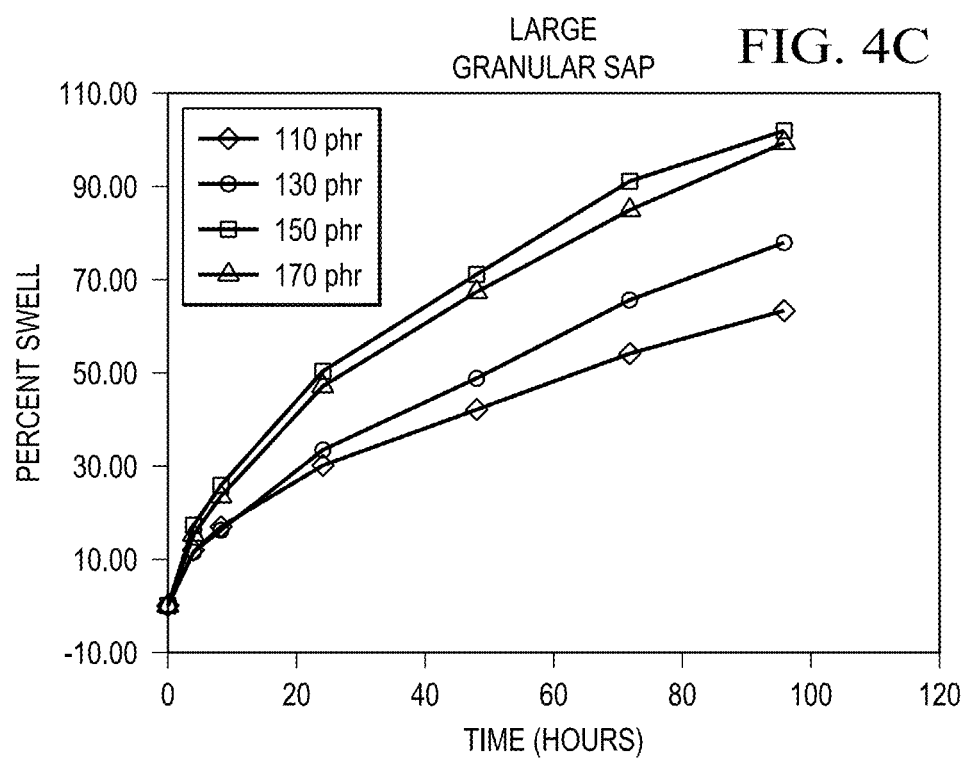
Figure 5A:
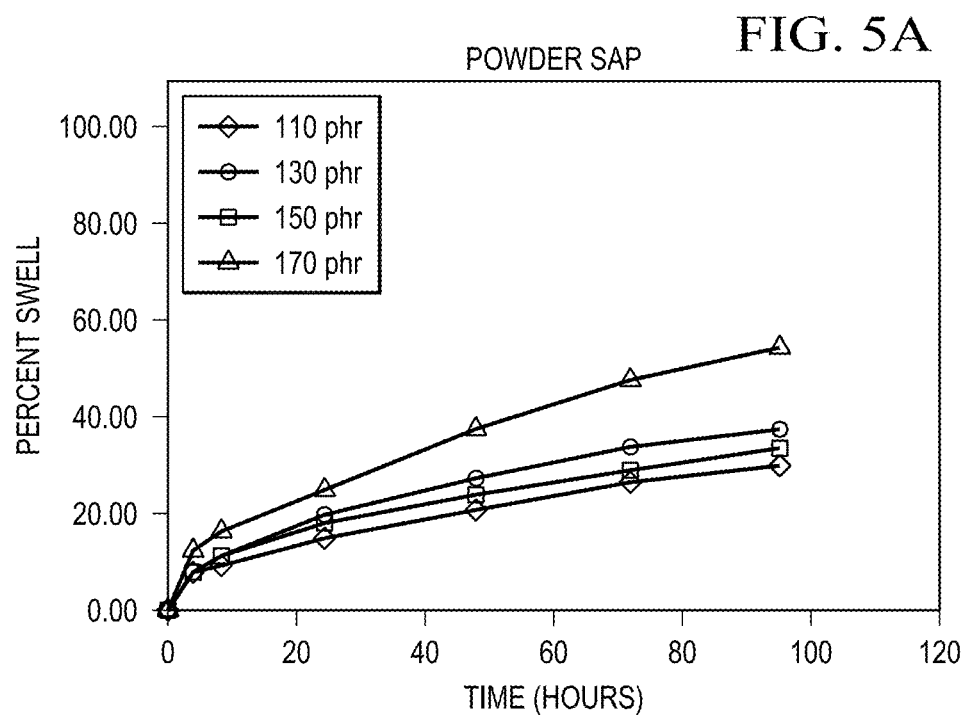
Figure 5B:
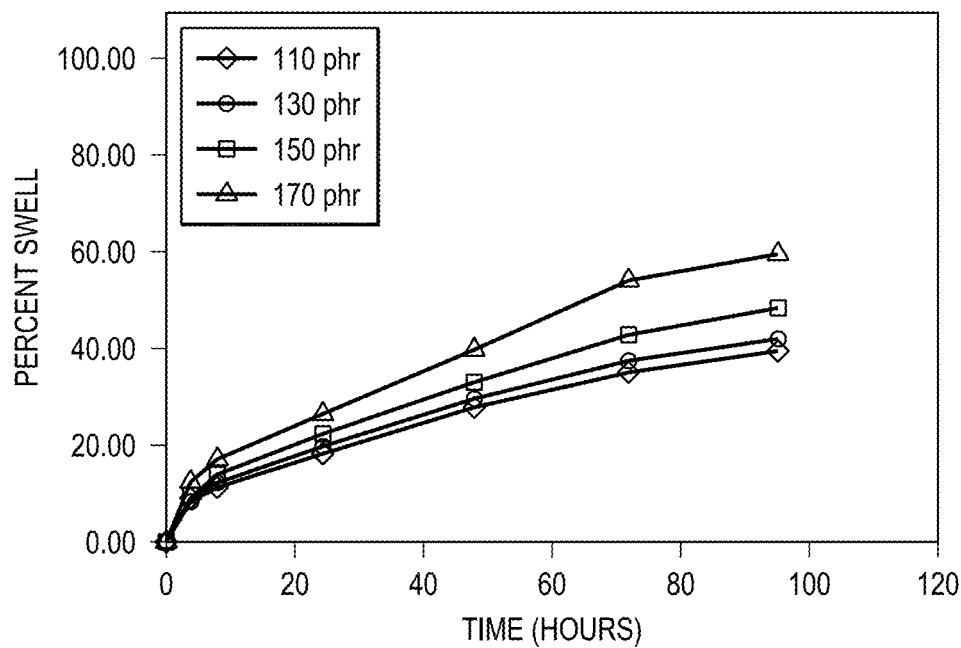
Figure 5C:
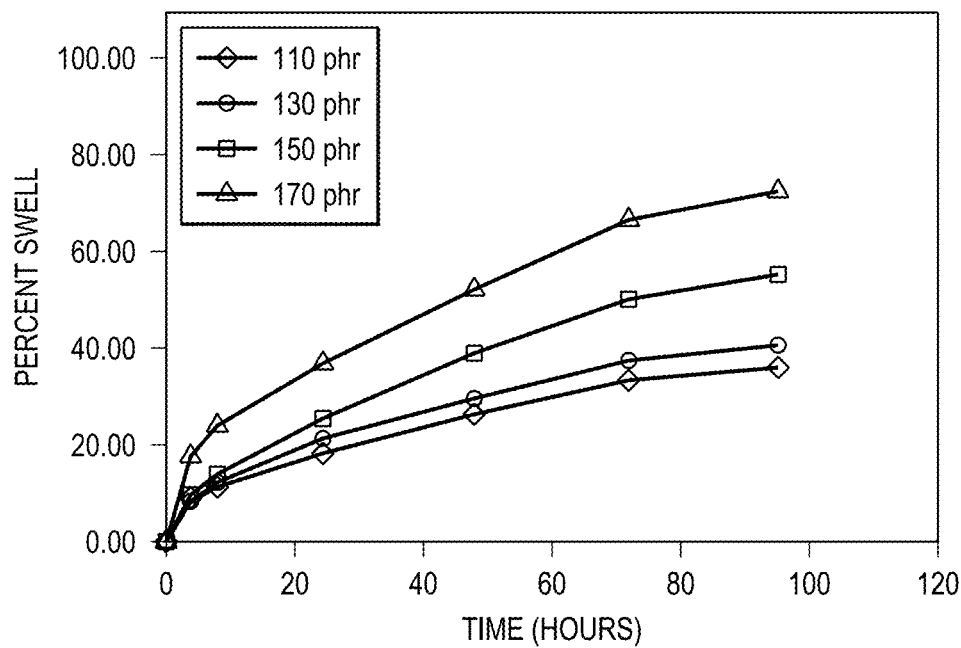

Samples of swellable packers were prepared using SAPs with three different particles sizes. Pucks of the swellable packers were produced based on the formulation set forth in Composition A. A first composition was prepared based on Composition A using powder SAP at 110 Phr, 130 Phr, 150 Phr and 170 Phr loads. A second composition was prepared based on Composition A using a medium size granular SAP at 110 Phr, 130 Phr, 150 Phr and 170 Phr loads. A third composition was prepared based on Composition A using a large size granular SAP at 110 Phr, 130 Phr, 150 Phr and 170 Phr loads. The types of SAPs used and the particles sizes are FIGS. 2A-C, 3A-C, 4A-C, and 5A-C depict graphical representations of some of the test results using composition A. FIGS. 2A-2C, 4A-4C, and 5A-5B show that, in simulated downhole conditions of 200 Fahrenheit 5% brine, 275 Fahrenheit 5% brine, and 275 Fahrenheit 16% brine, the compositions comprising medium and large granular SAPs swelled faster and had a higher percent swell (volume) as compared to the compositions comprising powder SAPs at respective varying loads. FIGS. 3A-3C demonstrate that, in simulated downhole conditions of 200 Fahrenheit 16% brine, compositions comprising medium and large granular SAP swell more similarly to compositions comprising powder SAPs at respective varying loads. The data shown in FIGS. 3A-3C is expected, as 200 Fahrenheit 16% brine conditions is considered to be a challenging environment for swelling, e.g., these conditions result in a slower swelling rate and smaller swelling volume compared to less saline conditions and higher temperatures. As shown in the results in FIGS. 2A-2C, 4A-4C, and 5A-5C, it is expected that, if the test at 200 Fahrenheit 16% brine was performed for more hours, the larger granular SAP at the higher loads would show a higher percent swell and a faster swell than the powder SAP. Accordingly, these tests results demonstrate that one of ordinary skill in the art would be encouraged to select medium or large granular SAP for packer elastomers to achieve the fastest swell rates and highest swell volumes as compared to powdered SAP.

Figure 7A:
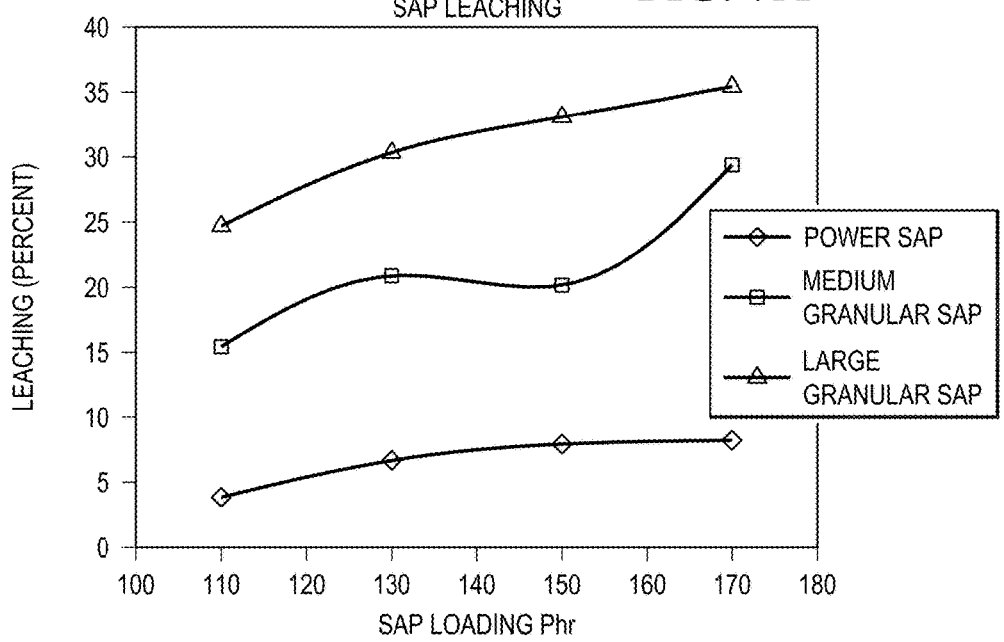

Further testing comparing powder SAP, medium granular SAP, and large granular SAP was conducted. As used herein, one method for measuring the leaching of SAP from Composition A is as follows. However, other methods may also be used. The rubber is molded into a button of about 15 g. The exact mass of the button is measured and recorded. The button is placed in a container of known mass with about 375 mL distilled water. The button must be completely immersed in the water. The container is sealed and placed in an oven at about 200 degrees Fahrenheit for about 7 days. At this time, the rubber button is removed. Leached SAP on the surface of the button is scraped into the jar. The jar is placed back in the oven for about 3 days to evaporate the water, leaving dried SAP. The mass of the jar+SAP is measured and the mass of the jar is subtracted from this value, providing the mass of SAP that has leached from the rubber button. The percent leaching is calculated by dividing the leached SAP mass from the initial mass of the rubber button. It was discovered that granular SAPs demonstrate a significantly higher percentage of leaching as compared to powder SAPs. For example, as shown in FIG. 7A, the composition comprising the larger granular SAP exhibited leaching of about 25% for the lowest SAP loading, and the percent leaching increased for the composition comprising the larger granular SAP as the SAP loading increased (i.e., up to greater than about 35% leaching at SAP loading of about 170 Phr). The composition comprising the medium granular SAP exhibited leaching of about 15% for the lowest SAP loading, and the percent leaching increased for the composition comprising the medium granular SAP as the SAP loading increased (i.e., up to about 30% leaching at SAP loading of about 170). Unexpectedly, the composition comprising the powder SAP exhibited leaching of less than about 5% for the lowest SAP loading. The percent leaching increased for the composition comprising the powder SAP as the SAP loading increased (i.e., up to less than about 10% leaching at SAP loading of about 170). However, the rate of leaching increase as the SAP loading increased for the composition comprising the powder SAP was surprisingly and observably less than the rate of leaching increase as the SAP loading increased for the granular SAPs. Notably, the powdered SAP samples leach by less than half the amount of both of the granular SAPs.

Figure 7B:
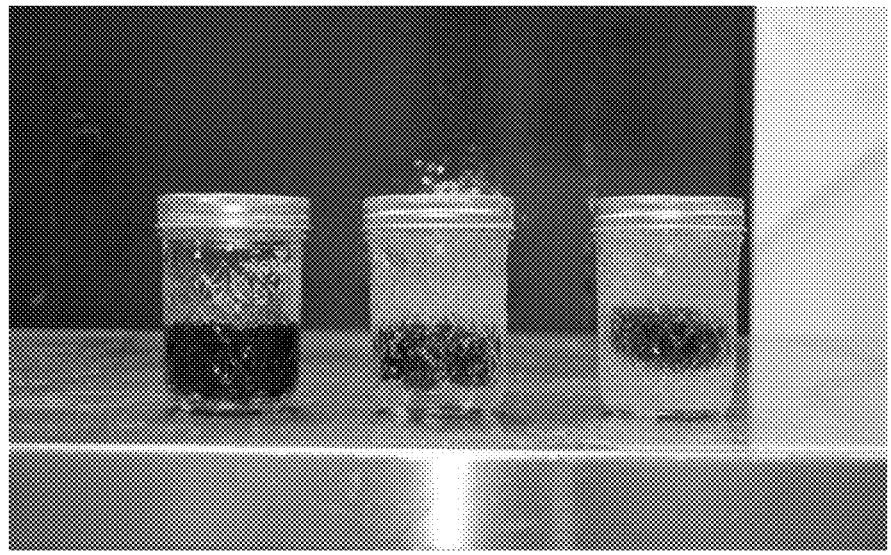

FIG. 7B depicts a photograph of a leach test on the three cured compositions. In this example, the test was conducted in distilled water at 200 about degrees Fahrenheit for about 7 days. The left jar contains a swellable composition having the powder SAP, and no visible evidence of leaching can be observed. The middle jar contains a swellable composition having the medium granular SAP, and considerable leaching can be observed. The right jar contains a swellable composition having the large granular SAP, and substantial leaching can be observed, so much so that the composition no longer contacts the bottom of the jar and is suspended in the solution.

Figure 7C:
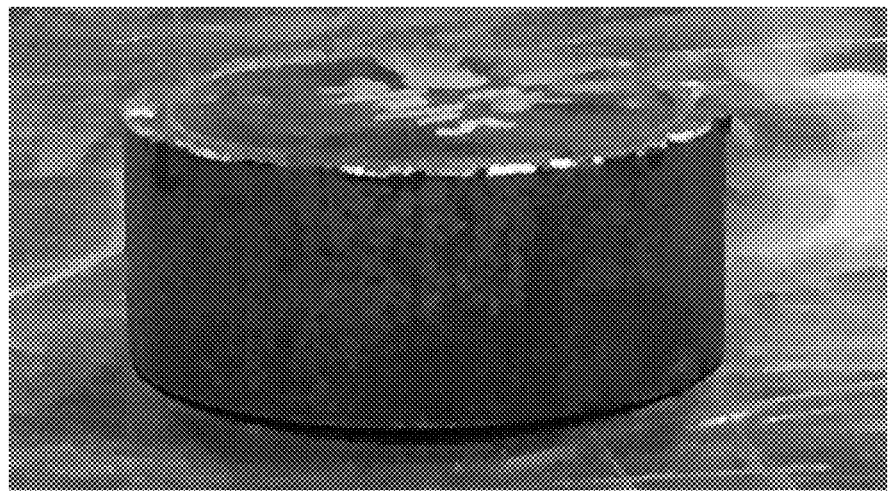
Figure 7D:
Figure 7E:
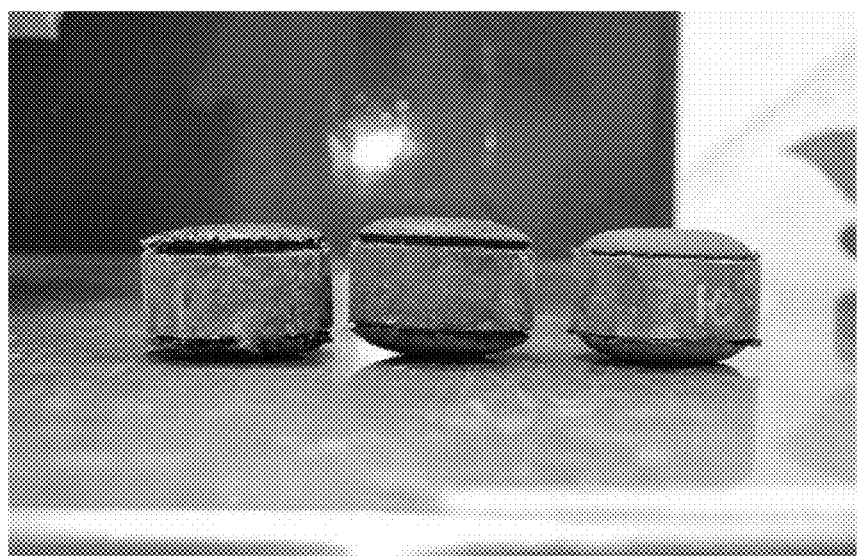

As another example, FIGS. 7C-E depict the effect of leaching on cured swellable compositions. FIG. 7C shows a puck prior to swell testing. Leaching can reduce the swell potential of a cured composition and create a higher likelihood of perforations in the composition (e.g., which can lead to failure of the composition, such as when the composition is stressed). The left puck sample in FIGS. 7D-E contains a swellable composition comprising the large granular SAP with a load of 150 Phr. As shown in FIG. 7D, the surface of the left puck sample comprising large granular SAP is highly pitted and rough due at least in part to leaching. Further, FIG. 7E shows that the left puck sample comprising large granular SAP has torn from the ring. The middle puck sample in FIGS. 7D-E with a load of 150 Phr contains a swellable composition comprising the medium granular SAP. As shown in FIG. 7D, the surface of the middle puck sample comprises some perforations in the composition, though not to the extent as seen in the left puck sample. Furthermore, as shown in FIG. 7E, tearing from the ring is less visible in the middle sample as compared to the left sample. The right puck sample in FIGS. 7D-E contains a swellable composition comprising the powder SAP with a load of 150 Phr. As shown in FIG. 7D, the right puck sample surface is substantially smooth no visible perforations. Similarly, FIG. 7E does not show any tearing of the composition from the ring in the right puck. Additionally, it was surprisingly noticed that the amount of swell of the right puck appeared to be similar to the left and middle pucks (large and medium granular SAPs). Accordingly, as disclosed herein (and surprisingly), the use of SAP powdered grades in exemplary embodiments results in swellable packers with acceptable amounts of swell as well as suitable physical properties such that these packers may be used in high temperature and/or high pressure well bores applications.

Figure 10:
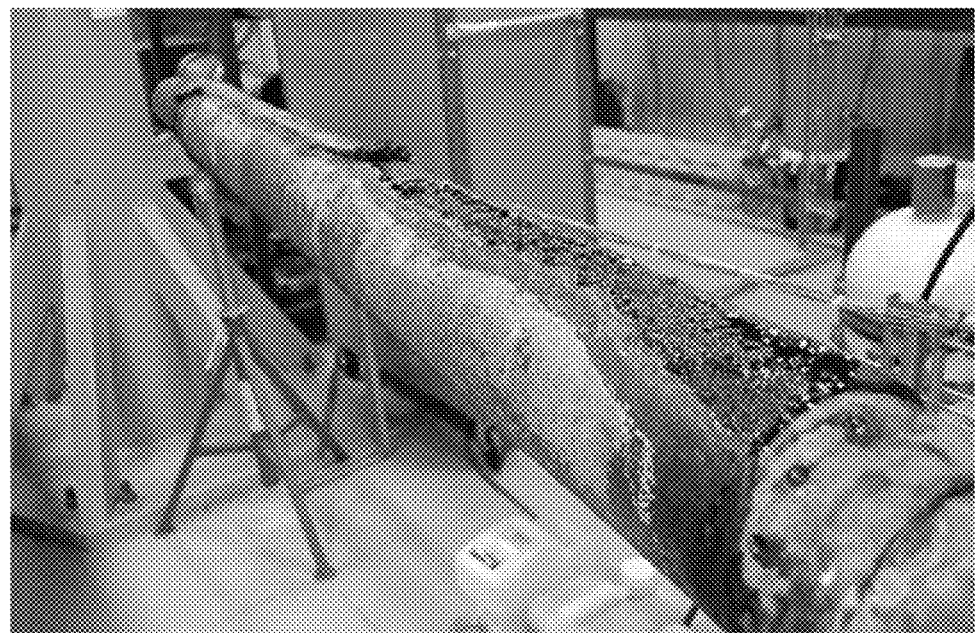
FIG. 10 illustrates a packer with physical failure or perforation where granular SAP (load 150 Phr, large granular) has been used in the rubber formulation according to a specific example embodiment of the disclosure.

It was discovered that high levels of leaching and/or less flexibility in the swellable composition with granular SAP particles. Leaching can reduce the swell potential of a swellable composition, and it can create tears and/or perforations in the rubber. These tears and/or perforations may produce weak points, which lead to failure when the rubber is stressed. FIG. 10 is a failed packer illustrating that the rubber has been ripped off down the length of the rubber when it was exposed to high pressure. The leaching data in FIGS. 7D-E and the failed packer in FIG. 10 demonstrate that the physical properties of swellable packers can generally deteriorate with high loads of granular SAPs.

Example 3

Figure 6A:
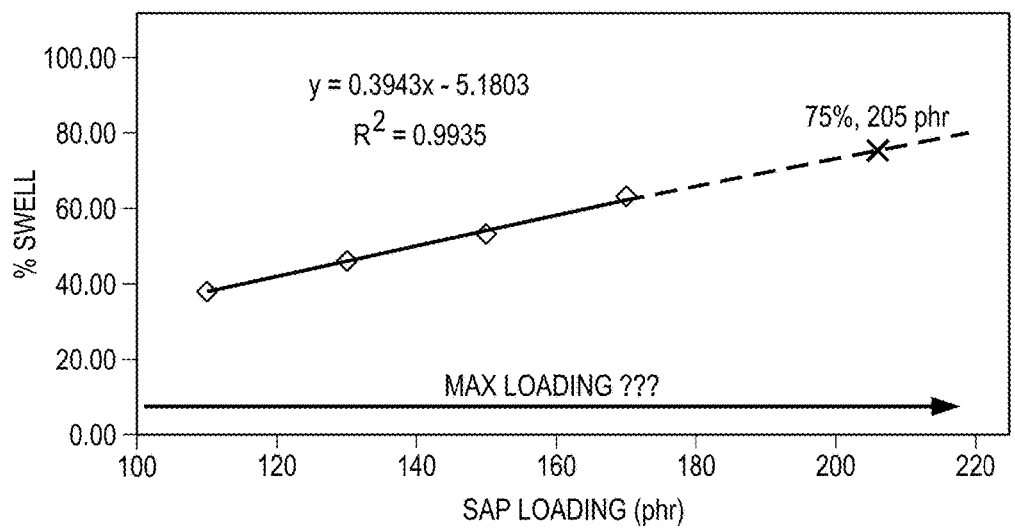
Figure 6B:
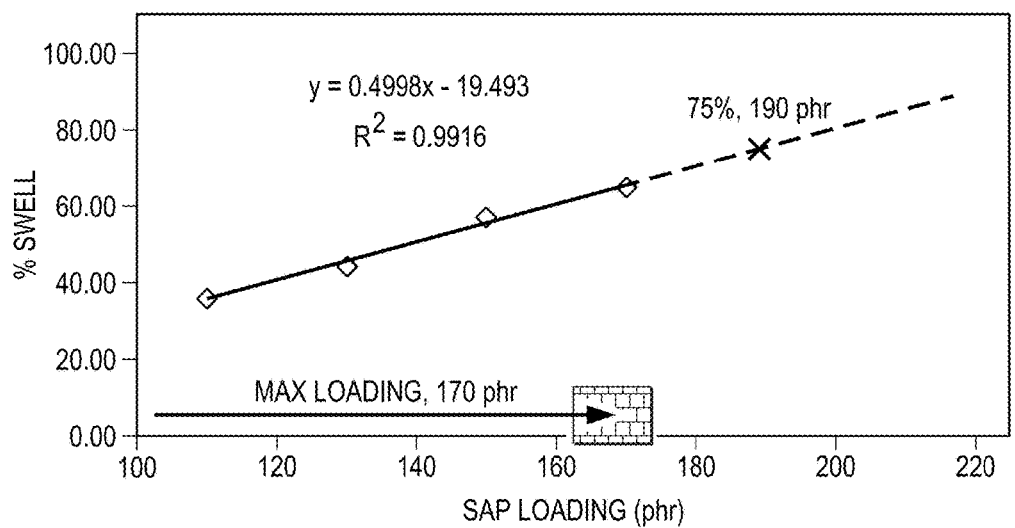
Figure 6C:
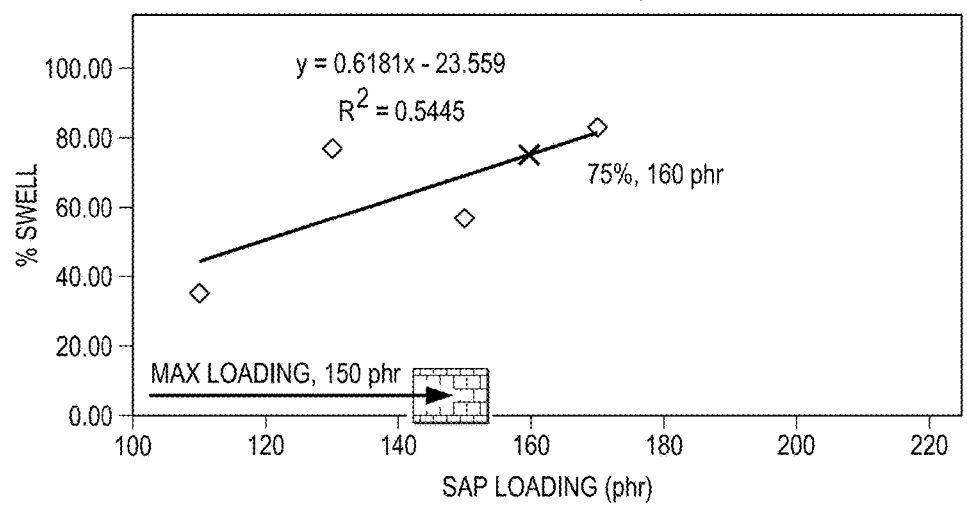

FIGS. 6A-C depict percent swell versus SAP loading for swellable packers exposed to a solution with 5% brine by volume at 200 degrees Fahrenheit for four days, which were created, in part, using data from Example 2 (Composition A). Based on the data, a linear, or substantially linear, relationship between percent swell and SAP loading is depicted for powder SAP, medium granular SAP, and large granular SAP. The predicted compounding level to achieve 75% swell for the three SAPs is illustrated in FIGS. 6A-C.

As depicted in FIG. 6A, the predicted SAP loading to achieve a 75% swell using the powder SAP is about 205 Phr. A maximum load level for the powder SAP has not been determined, but it is greater than the predicted load to achieve a 75% swell in four days in the aforementioned environment of about 205 Phr. Therefore, it is predicted that a 75% swell in four days in the aforementioned environment is attainable for a swellable composition using powder SAP.

FIG. 6B depicts the predicted SAP loading to achieve a 75% swell using the medium granular SAP as about 190 Phr. In this example, the maximum load for medium granular SAP in such swellable compositions was determined to be about 170 Phr (e.g., due at least in part to the amount of leaching that would occur at medium granular SAP at loads of greater than 170 Phr). Therefore, it is predicted that a 75% swell in four days in the aforementioned environment may not be attainable for a swellable composition using only medium granular SAP.

FIG. 6C depicts the predicted SAP loading to achieve a 75% swell using the large granular SAP as about 160 Phr. In this example, the maximum load for large granular SAP in such swellable compositions was determined to be about 150 Phr. Therefore, it is predicted that a 75% swell in four days in the aforementioned environment may not be attainable for a swellable composition using only large granular SAP.

Accordingly, it was surprisingly discovered that increasing the quantity of powder SAP beyond the max load of the medium or large granular SAP in a swelling composition resulted in the powder SAP composition having improved swelling rate and volume characteristics along with improved physical characteristics (no tearing or perforations). Moreover, the 205 Phr powder SAP composition was easily combined and had no manufacturing problems. Medium or large granular SAP could not be combined with the swelling composition to achieve the 75% swell in four days (e.g., the granular SAP falls out of the formula and becomes unmanageable).

Example 4

Figure 8:
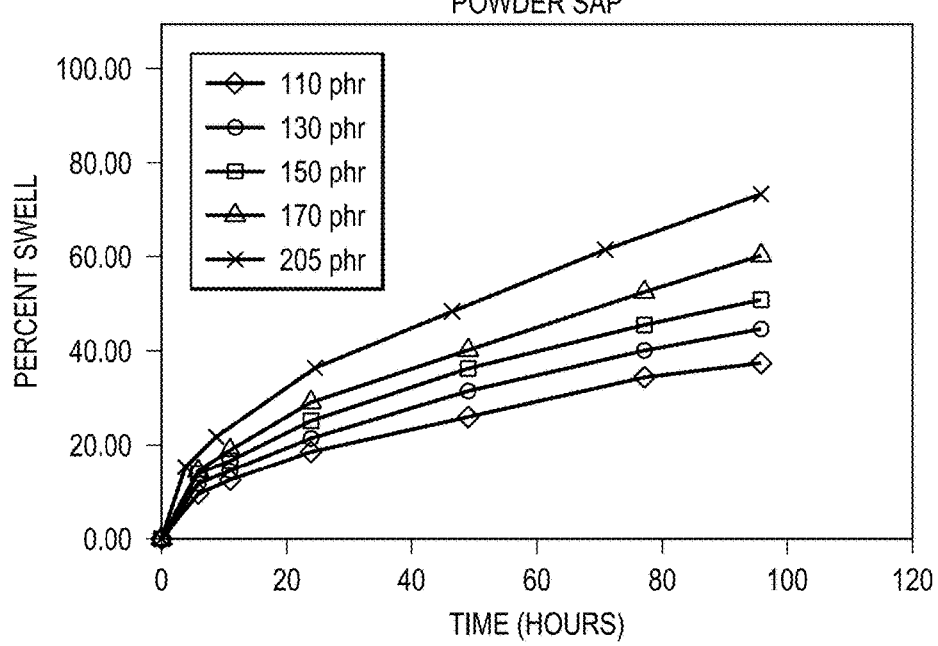
FIG. 8 illustrates a graphical representation of the percent swell versus time in hours for swellable compositions tested in a solution with 5% brine at 200 degrees Fahrenheit, each swellable composition having a powder SAP and having different SAP loading in Phr according to a specific example embodiment of the disclosure.
Figure 9:
FIG. 9 illustrates two pucks exposed to 16% brine at 275 degrees Fahrenheit after one week of testing. The left puck sample used 10% nitrile butadiene rubber (NBR rubber), and the right puck sample used 10% hydrogenated nitrile butadiene rubber (HNBR) according to a specific example embodiment of the disclosure.

Two puck samples of a swellable composition were prepared with 205 Phr of the powder SAP. The powder SAP was mixed using an internal mixer (e.g., which can assist in fly loss). One composition contained 10% of NBR rubber (Nipol DN3350). The other composition contained 10% of HNBR (Zetpol 2030L). The resulting compositions exhibited excellent green strength and acceptable milling and manipulation properties. Data relating to these two compositions is reproduced in Table 18 below. As predicted in Example 3, 205 Phr loading of the powder SAP achieves 75% swell within four days in a solution having 5% brine by volume at 200 degrees Fahrenheit. The composition having HNBR (Zetpol 2030) exhibited a greater swell rate after four days in three of the four environments. Use of HNPR (Zetpol 2030) may offer improved thermal stability at higher temperatures and may further minimize leaching. As depicted in FIG. 8, the swell rate of swellable compositions comprising powder SAP increased as the SAP loading increased. FIG. 9 depicts the two puck samples exposed to a solution having 16% brine by volume at 275 degrees Fahrenheit after one week of testing. The left puck sample used 10% NBR rubber (Nipol DN3350), and the right puck sample used 10% HNBR (Zetpol 2030L).

TABLE 18

205 Phr of Powder SAP Swell Data

| | | 205 phr, 10% DN3350 | 205 phr, 10% HNBR |
|---|---|---|---|
| 96 hour Swell % | 200° F., 5% brine | 75.8 | 77.8 |
| | 200° F., 16% brine | 46.5 | 47.2 |

TABLE 18-continued

205 Phr of Powder SAP Swell Data

| | 205 phr, 10% DN3350 | 205 phr, 10% HNBR |
|---|---|---|
| 275° F., 5% brine | 98.4 | 96.0 |
| 200° F., 16% brine | 65.4 | 66.9 |

As depicted in FIG. 8, the swell rate of swellable compositions comprising powder SAP increased as the SAP loading increased.

Further advantages of the claimed subject matter will become apparent from the following examples describing certain embodiments of the claimed subject-matter.

Example 1A

A method of sealing a region between a wall and a swellable packer-conduit assembly, wherein the swellable packer-conduit assembly comprises a conduit and a swellable packer at least partially surrounding the outer surface of the conduit, the method comprising: locating the swellable packer-conduit assembly in a region with a surrounding wall; permitting the swellable packer-conduit assembly to be exposed to water, water based fluid, and/or formation water while the swellable packer-conduit assembly is surrounded by the surrounding wall; permitting the swellable packer-conduit assembly to be exposed to heat while the swellable packer-conduit assembly is surrounded by the surrounding wall; waiting for a duration of time such that the swellable packer can swell to substantially seal the region between the surrounding wall and the swellable packer-conduit assembly. In some embodiments, a swellable packer may seal an annular region between a wellbore wall and a swellable packer-conduit assembly.

Example 2A

The method of Example 1A, wherein the swellable packer comprises a powder super absorbent polymer present in at least about 150 Phr, 175 Phr, 197 Phr, 200 Phr, 205 Phr or 225 Phr.

Example 3A

The method of Example 1A or 2A, wherein the heat comprises a temperature of about 200 degrees Fahrenheit.

Example 4A

The method of Example 1A or 2A, wherein the heat comprises a temperature of about 275 degrees Fahrenheit.

Example 5A

The method of one or more of Examples 1A-4A, wherein the water, water based fluid, and/or formation water is an about 5% weight/volume brine solution.

Example 6A

The method of one or more of Examples 1A-4A, wherein the water, water based fluid, and/or formation water is an about 16% weight/volume brine solution.

Example 7A

The method of one or more Examples 1A-6A, wherein the swellable packer swells by at least about 50%, 60%, 65%, 70%, 75%, 80%, or 90% by volume.

Example 8A

The method of one or more of Examples 1A-7A, wherein the duration of time is about 2, 3, 4, or 5 days.

Example 9A

The method of one or more of Examples 1A-8A, wherein the seal between the surrounding wall and the swelled swellable packer-conduit assembly can withstand being subjected to a pressure of at least about 3000, 4000, 5000, 6000, 70000, or 8000 psi.

Example 10A

The method of one or more Examples 1A-9A, wherein the swellable packer comprises a swellable rubber composition comprising:
   (i) a combination of an elastomer, a butadiene rubber, a sulfur curing agent, a silica, and a powder super absorbent polymer;
   (ii) a combination of a nitrile elastomer, a rubber, a sulfur curing agent, a silica, and a powder super absorbent polymer; or
   (iii) a combination of at least one nitrile rubber elastomer, at least one styrene butadiene rubber, carbon black, dioctyl phthalate, fumed silica, zinc oxide, an antiozonant, an antidegradant, a tackifier, sulfur, tetramethylthiuram disulfide, an inhibitor, at least one powder super absorbent polymer, and stearic acid.

Example 11A

The method of one or more of Examples 1A-10A, wherein the seal between the surrounding wall and the swelled swellable packer-conduit assembly can withstand being subjected to pressures of at least about 5000 psi and temperatures of at least about 200 degrees Fahrenheit and maintain the seal.

Example 12A

The method of one or more of Examples 1A-10A, wherein the seal between the surrounding wall and the swelled swellable packer-conduit assembly can withstand being subjected to pressures of at least about 5000 psi and temperatures of at least about 275 degrees Fahrenheit and maintain the seal.

Example 1B

A method of sealing a region between a wellbore wall and a swellable packer-conduit assembly, wherein the swellable packer-conduit assembly comprises a conduit and a swellable packer at least partially surrounding the outer surface of the conduit, the method comprising: locating the swellable packer-conduit assembly in a region of the wellbore; permitting the swellable packer-conduit assembly to be exposed to water, water based fluid, and/or formation water while the swellable packer-conduit assembly is in the wellbore; permitting the swellable packer-conduit assembly to be exposed to heat while the swellable packer-conduit assembly is in the wellbore; waiting for a duration of time such that the swellable packer can swell to substantially seal the region between the wellbore wall and the swellable packer-conduit assembly.

Example 2B

The method of Example 1B, wherein the swellable packer comprises a powder super absorbent polymer present in at least about 150 Phr, 175 Phr, 197 Phr, 200 Phr, 205 Phr or 225 Phr.

Example 3B

The method of Example 1B or 2B, wherein the heat comprises a temperature of about 200 degrees Fahrenheit.

Example 4B

The method of Example 1B or 2B, wherein the heat comprises a temperature of about 275 degrees Fahrenheit.

Example 5B

The method of one or more of Examples 1B-4B, wherein the water, water based fluid, and/or formation water is an about 5% weight/volume brine solution.

Example 6B

The method of one or more of Examples 1B-4B, wherein the water, water based fluid, and/or formation water is an about 16% weight/volume brine solution.

Example 7B

The method of one or more Examples 1B-6B, wherein the swellable packer swells by at least about 50%, 60%, 65%, 70%, 75%, 80%, or 90% by volume.

Example 8B

The method of one or more of Examples 1B-7B, wherein the duration of time is about 2, 3, 4, or 5 days.

Example 9B

The method of one or more of Examples 1B-8B, wherein the seal between the wellbore wall and the swelled swellable packer-conduit assembly can withstand being subjected to a pressure of at least about 3000, 4000, 5000, 6000, 7000, or 8000 psi.

Example 10B

The method of one or more of Examples 1B-9B, wherein the swellable packer comprises a swellable rubber composition comprising:
   (i) a combination of an elastomer, a butadiene rubber, a sulfur curing agent, a silica, and a powder super absorbent polymer;
   (ii) a combination of a nitrile elastomer, a rubber, a sulfur curing agent, a silica, and a powder super absorbent polymer; or
   (iii) a combination of at least one nitrile rubber elastomer, at least one styrene butadiene rubber, carbon black, dioctyl phthalate, fumed silica, zinc oxide, an antiozonant, an antidegradant, a tackifier, sulfur, tetramethylthiuram disulfide, an inhibitor, at least one powder super absorbent polymer, and stearic acid.

Example 11B

The method of one or more Examples 1B-10B, wherein the seal between the wellbore wall and the swelled swellable packer-conduit assembly can withstand being subjected to pressures of at least about 5000 psi and temperatures of at least about 200 degrees Fahrenheit and maintain the seal.

Example 12B

The method of one or more Examples 1B-10B, wherein the seal between the wellbore wall and the swelled swellable packer-conduit assembly can withstand being subjected to pressures of at least about 5000 psi and temperatures of at least about 275 degrees Fahrenheit and maintain the seal.

Example 1C

A swellable rubber composition comprising: an elastomer; a butadiene rubber; a sulfur curing agent; a silica; and a powder super absorbent polymer.

Example 2C

A swellable rubber composition comprising: a nitrile elastomer; a rubber; a sulfur curing agent; a silica; and a powder super absorbent polymer.

Example 3C

A swellable rubber composition comprising: at least one nitrile rubber elastomer; at least one styrene butadiene rubber; carbon black; dioctyl phthalate; fumed silica; zinc oxide; an antiozonant; an antidegradant; a tackifier; sulfur; tetramethylthiuram disulfide; an inhibitor; at least one powder super absorbent polymer; and stearic acid.

Example 4C

The swellable rubber composition of one or more of Examples 1C-3C, wherein the powder super absorbent polymer is present in about 125 to 175 Phr.

Example 5C

The swellable rubber composition of one or more of Examples 1C-4C, wherein the powder super absorbent polymer is present in about 170 to 210 Phr.

Example 6C

The swellable rubber composition of one or more of Examples 1C-5C, wherein the powder super absorbent polymer is present in at least about 150 Phr, 175 Phr, 200 Phr or 225 Phr.

Example 7C

The swellable rubber composition of one or more of Examples 1C-6C, wherein the powder super absorbent polymer and at least one granular super absorbent polymer is present in the swellable rubber; and wherein the powder super absorbent polymer comprises at least 50%, 60%, 70%, 80%, 90%, or 95% by weight of a total super absorbent polymer incorporated into the swellable rubber.

Example 8C

The swellable rubber composition of one or more of Examples 1C-7C, wherein the total super absorbent polymer is selected such that, after curing, a cured swellable rubber packer is capable of expanding in water and/or brine without compromising the physical properties of the rubber and/or without significantly leaching and/or without significantly perforating.

Example 9C

The swellable rubber composition of one or more of Examples 1C-8C, wherein the powder super absorbent polymer has an average particle size of about 10 to 120 µm or about 20 to 100 µm, (e.g., about 20, 25, 30, 35, 40, 45, 50, 55, 60, 65, 70, 75, 80, 85, 90, 95, 100, 105, 110, 115 or 120 µm).

Example 10C

The swellable rubber composition of one or more of Examples 1C-9C, wherein the powder super absorbent polymer has an average particle size of less than or equal to about 20, 30, 40, 50, 60, 70, 80, 90, 100, 110 or 120 µm.

Example 11C

The water swellable rubber composition of one or more of Examples 1C-10C, wherein the powder super absorbent polymer consists essentially of particle sizes of less than or equal to about 20, 30, 40, 50, 60, 70, 80, 90, 100, 110, 120 or 130 µm.

Example 12C

The swellable rubber composition of one or more of Examples 1C-11C, further comprising about 120 to 220 (e.g., 120, 125, 130, 135, 140, 145, 150, 155, 160, 165, 170, 175, 180, 185, 190, 195, 200, 205, 210, 215, 220) Phr of powder super absorbent polymer.

Example 13C

The swellable rubber composition of one or more of Examples 1C-12C, wherein the powder super absorbent polymer comprises one or more of the following: polyelectrolytes, polyacyrlates (e.g., sodium polyacrylate), polyacryamide-co-polyacrylates (e.g., polyacryamide-co-potassium acrylate), polyacrylamides (e.g., potassium polyacrylamide) and/or acrylic acids.

Example 14C

The swellable rubber composition of one or more of Examples 1C-13C, wherein the granular super absorbent polymer comprises one or more of the following: polyelectrolytes, polyacyrlates (e.g., sodium polyacrylate), polyacryamide-co-polyacrylates (e.g., polyacryamide-co-potassium acrylate), polyacrylamides (e.g., potassium polyacrylamide) and/or acrylic acids.

Example 15C

The swellable rubber composition of one or more of Examples 1C-13C, wherein the powder super absorbent polymer is a potassium polyacrylate polyacrylamide copolymer that has a mean particle size of about 35 µm, a median particles size of about 35 µm with a standard deviation of about 10 µm and substantial no particles over about 75 µm in the powder.

Example 16C

The swellable rubber composition of one or more of Examples 1C-15C, wherein the swellable rubber composition after curing is configured to swell by at least about 10%, 20%, 30%, 40%, 50%, 60%, 70%, 80%, 90%, 100%, 110%, 120%, 130%, 140%, 150%, 160%, 170%, 180%, 190%, 200%, 210%, 220%, 230%, 240% or 250% by volume in an about 5% weight/volume brine solution without substantially compromising the physical properties of the cured rubber and/or without significantly leaching and/or without significantly perforating.

Example 17C

The swellable rubber composition of one or more of Examples 1C-16C, wherein the swellable rubber composition after curing is configured to swell by at least about 10%, or at least about 20%, or at least about 30%, or at least about 40%, or at least about 50%, or at least about 60%, or at least about 70%, or at least about 80%, or at least about 90%, or at least about 100%, or at least about 110%, or at least about 120%, or at least about 130%, or at least about 140%, or at least about 150%, or at least about 160%, or at least about 170%, or at least about 180%, or at least about 190%, or at least about 200%, or at least about 210%, or at least about 220%, or at least about 230%, or at least about 240% or at least about 250% by volume in an about 16% weight/volume brine solution without substantially compromising the physical properties of the rubber and/or without significantly leaching and/or without significantly perforating.

Example 18C

The swellable rubber composition of one or more of Examples 1C-17C, wherein the swellable rubber composition after curing is configured to swell while being subjected to a temperature of about 200 degrees Fahrenheit.

Example 19C

The swellable rubber composition of one or more of Examples 1C-17C, wherein the water swellable rubber composition after curing is configured to swell while being subjected to a temperature of about 275 degrees Fahrenheit.

Example 20C

The swellable rubber composition of one or more of Examples 1C-19C, wherein the swellable rubber composition after curing is configured to swell while being subjected to a pressure of at least about 3000, 4000, 5000, 6000, 7000, or 8000 psi.

Example 21C

The swellable rubber composition of one or more of Examples 1C-20C, wherein the swellable rubber composition after curing is configured to substantially swell within 2, 3, 4 or 5 days.

Example 22C

The swellable rubber composition of one or more of Examples 1C-21C, wherein the swellable rubber composition after curing has a Shore A hardness of at least 20, 25 or 30.

Example 23C

The swellable rubber composition of one or more of Examples 1C-21C, wherein the swellable rubber composition after curing and substantially swelling has a Shore A hardness of at least 20, 25 or 30.

Example 24C

A swellable packer comprising: a conduit, and a swellable rubber composition according to one or more of Examples 1C-23C, wrapped around at least a portion of the conduit and cured.

Example 25C

A swellable packer manufactured by causing the swellable rubber composition of one or more of Examples 1C-23C to cure after the swellable rubber composition has been wrapped around at least a portion of the conduit.

Example 26C

A method of sealing a region between wellbore wall and the swellable packer-conduit assembly, wherein the swellable packer-conduit assembly comprises a conduit and a swellable packer at least partially surrounding the outer surface of the conduit, comprising: locating a swellable packer-conduit assembly in a region of the wellbore in a manner so as to seal said space upon swelling of the swellable body, the swellable body being susceptible to being in contact with water, water based fluid, and/or formation water present in the wellbore, according to one or more of Examples 1C-23C.

Example 5

Design Experiment to Test Low Acrylonitrile Polymers

Four swellable rubber compositions comprising an elastomer, a butadiene rubber, a sulfur curing agent, a filler, and a super absorbent polymer were analyzed for effects of varying polymer structures, filler systems, and a binary sulfur and peroxide cure system, wherein the effects comprise harness, swelling, and aging properties. In the four swellable rubber compositions, the distribution of cure chemicals (e.g., sulfur curing agent and peroxide) were the same, but various distributions of ACN nitrile polymers were prepared and compared to various SBR 1502 polymers. Table 18 illustrates the compositions of four various swellable rubber compositions.

TABLE 18

Polymer Distribution

|  | 1 | 2 | 3 | 4 |
|---|---|---|---|---|
| Styrene Butadiene Rubber (SBR) 1502 | 90 | 0 | 90 | 0 |
| Low Acrylonitrile (ACN) Nitrile | 0 | 90 | 0 | 90 |
| Hydrogenated Nitrile Butadiene Rubber (HNBR) | 10 | 10 | 10 | 10 |

Various filler systems were used for each of the four swellable rubber compositions, wherein the filler systems comprise carboxymethyl cellulose (CMC), tricalcium phosphate, and standard SAP, as illustrated in Table 19. Swellable rubber compositions 1 and 2 incorporate carboxymethylcellulose and tricalcium phosphate. In some embodiments, incorporation of carboxymethylcellulose and/or tricalcium phosphate may improve the absorption of divalent cations, trivalent cations, divalent anions, and trivalent anions. According to some embodiments, standard SAP may work best with monovalent ions.

TABLE 19

Swellable Filler Distribution

|  | 1 | 2 | 3 | 4 |
|---|---|---|---|---|
| Carboxymethyl Cellulose | 100 | 100 | 0 | 0 |
| Tricalcium Phosphate | 50 | 50 | 0 | 0 |
| Standard SAP | 50 | 50 | 200 | 200 |

Four swellable rubber compositions were mixed with a Moriyama mixer and then tested initially for physical and rheological properties. Swell pucks were then molded and swell testing at 200° F. in 5% brine was conducted. Low temperature and high salinity testing was also conducted. After three weeks of allowing the mixed material to sit, the physical and rheological properties were retested and new swell pucks were molded. A 200° F. in 5% brine swell test was conducted again to compare a change in physical and rheological properties.

Table 20 illustrates the change in the durometer of four swellable rubber compositions from the initial time point to about three weeks after the initial time point. Swellable rubber compositions 2 and 4 retain hardness properties after three weeks.

TABLE 20

Change in Durometer After 3 Weeks

All Testing Slabs Cured for 45 minutes at 300° F.

|  | 1 Initial | 1 After 3 Weeks | 2 Initial | 2 After 3 Weeks | 3 Initial | 3 After 3 Weeks | 4 Initial | 4 After 3 Weeks |
|---|---|---|---|---|---|---|---|---|
| Shore A | 91 | 88 | 93 | 94 | 88 | 84 | 90 | 90 |

Swellable rubber compositions 2 and/or 4, which contain low ACN nitrile, exhibit a higher initial cross link density in comparison to swellable rubber compositions 3 and/or 4, which contain the SBR. Swellable rubber compositions 1 and 2 that contain the CMC and tricalcium phosphate exhibit highly increased cross link density, which may be due to the filler interaction during curing. Swellable rubber composition 4 exhibits a reduced viscosity after the time period, which may indicate that the material should still flow easily during processing. FIGS. 13, 14, 15, and 16 are graphs that illustrate the compound comparisons.

Swellable rubber compositions 1-4 do not exhibit a reduction in swelling properties after the aging period for the materials as shown in Table 21. Swellable rubber compositions 3 and/or 4 with just the SAP exhibit significantly higher swell rates in comparison to swellable rubber compositions 1 and/or 2 with a combination of swellable fillers. The aging comparison for swellable rubber compositions 1-4 is illustrated in FIGS. 17, 18, 19, and 20.

TABLE 21

Change in Rheological Data After 3 Weeks
Rheometer MDR, 4 minutes at 350° F., 1° Arc

|  | 1 Initial | 1 After 3 Weeks | 2 Initial | 2 After 3 Weeks | 3 Initial | 3 After 3 Weeks | 4 Initial | 4 After 3 Weeks |
|---|---|---|---|---|---|---|---|---|
| ML, lb-in | 8.79 | 8.48 | 15.14 | 15.44 | 7.40 | 6.21 | 9.39 | 7.68 |
| Ts2, m:s | 0:40 | 0:40 | 0:38 | 0:38 | 0:44 | 0:50 | 0:43 | 0:47 |
| TC90, m:s | 2:51 | 2:47 | 2:59 | 3:03 | 2:43 | 2:55 | 2:50 | 2:47 |
| MH, lb-in | 23.86 | 23.15 | 31.95 | 32.61 | 18.63 | 15.93 | 24.59 | 17.73 |

Temperature swell date for swellable rubber compositions 1-4 is exhibited in Table 22. Testing of swellable rubber compositions 1-4 was performed at 40° F. in 5% brine. Swellable rubber composition 3 exhibited the best swell properties in comparison to the other swellable rubber compositions.

TABLE 22

Change in Swell Properties After 3 Weeks
Swell Testing at 200

| | 1 Initial | 1 After 3 Weeks | 2 Initial | 2 After 3 Weeks | 3 Initial | 3 After 3 Weeks | 4 Initial | 4 After 3 Weeks |
|---|---|---|---|---|---|---|---|---|
| Initial | 0.0% | 0.0% | 0.0% | 0.0% | 0.0% | 0.0% | 0.0% | 0.0% |
| 4 hours | 8.4% | 10.7% | 9.3% | 10.2% | 15.5% | 14.7% | 12.9 | 10.5 |
| 8 hours | 11.3% | 12.6% | 11.9% | 12.5% | 20.4% | 18.4% | 17.7 | 16.7 |
| 1 day | 20.1% | 22.6% | 21.7% | 23.2% | 37.4% | 35.5% | 32.9 | 37.1 |
| 2 days | 29.8% | 33.7% | 32.3% | 34.9% | 51.7% | 51.4% | 47.3 | 54.1 |
| 3 days | 34.5% | 38.9% | 36.8% | 40.6% | 58.3% | 58.2% | 55.2 | 63.1 |
| 4 days | 40.9% | 45.9% | 44.8% | 48.6% | 68.3% | 66.5% | 67.5 | 77.7 |
| 7 days | 53.8% | 59.1% | 60.2% | 63.4% | 96.4% | 95.3% | 96.7 | 102.7 |

Table 23 illustrates the high salinity swell date for swellable rubber compositions 1-4. Testing of swellable rubber compositions 1-4 was performed at 275° F. in 23% brine. Swellable rubber compositions with the standard SAP exhibited significantly improved swell results in comparison to swellable rubber compositions with a combination of CMC and tricalcium phosphate.

TABLE 23

High Salinity Swell Data

| 275° F. | | Contact (6 in) | Pressure (6.25) | Pressure (6.65) | Shore A | Days | Growth % |
|---|---|---|---|---|---|---|---|
| SC-I-54_1 | Water-23% | 14 | 63 | 277 | 38 | 6.93 | 31.5% |
| SC-I-54_2 | Water-23% | 14 | 53 | 199 | 38 | 6.93 | 30.0% |
| SC-I-54_3 | Water-23% | 2 | 5 | 12 | 9 | 6.93 | 82.5% |
| SC-I-54_4 | Water-23% | 2 | 4.5 | 11 | 13 | 6.93 | 86.1% |

Table 24 illustrates low temperature swell data for swellable rubber compositions 1-4. Testing of swellable rubber compositions 1-4 was performed at 40° F. in 5% brine. Swellable rubber composition 3 exhibits the highest growth % (i.e., swell) in comparison to swellable rubber compositions 1, 2, and 4.

TABLE 24

Low Temperature Swell Data

| 275° F. | | Contact (6 in) | Pressure (6.25) | Pressure (6.65) | Shore A | Days | Growth % |
|---|---|---|---|---|---|---|---|
| SC-I-54_1 | Water-5% | 45 | 133 | 360 | 26 | 15.18 | 22.5% |
| SC-I-54_2 | Water-5% | 80 | 228 | 646 | 36 | 15.18 | 16.9% |
| SC-I-54_3 | Water-5% | 16 | 45 | 114 | 9 | 15.18 | 37.0% |
| SC-I-54_4 | Water-5% | 25.5 | 62 | 143 | 16 | 15.18 | 29.6% |

Example 6

Specific Example Embodiments of a Swellable Rubber Composition

A swellable rubber composition may be configured to have one or more of the desired qualities disclosed in this application including, for example, swellability, density of crosslinks, tolerance of salinity, curing temperature, among others, by adjusting the composition of one or more components. Examples of swellable compositions are provided in Table 25.

TABLE 25

Swellable Rubber Compositions

| Formulation (wt. %) | A | B | C | D | E | F | G | H | I | J | K | L | M | N | O | P |
|---|---|---|---|---|---|---|---|---|---|---|---|---|---|---|---|---|
| Nitrile | 22.5 | 20 | 22 | 30 | 30 | 20 | 25 | 23 | 15 | 18 | 20 | 34 | 19 | 24 | 21 | 21 |
| HNBR | 3.0 | 4.0 | 3.5 | 2.0 | 4.0 | 4.0 | 3.0 | 5.0 | 2.0 | 1.5 | 2.7 | 1.0 | 3.5 | 3.3 | 3.1 | 7.4 |
| Tackifier | 0.7 | 0.8 | 0.6 | 0.2 | 1.0 | 0.9 | 0.7 | 0.5 | 0.8 | 0.9 | 1.0 | 1.1 | 0.8 | 0.6 | 0.2 | 0.3 |
| Zinc Oxide | 2.6 | 2.0 | 3.1 | 2.0 | 2.5 | 2.0 | 2.0 | 2.4 | 2.2 | 1.9 | 1.7 | 2.1 | 2.4 | 1.8 | 1.7 | 3.0 |
| Antidegradant | 0.4 | 0.5 | 0.75 | 0.5 | 0.6 | 0.7 | 0.5 | 0.3 | 0.5 | 0.8 | 0.2 | 0.4 | 0.7 | 1.1 | 0.6 | 0.3 |
| Silica | 5.8 | 5.0 | 5.0 | 5.5 | 5.9 | 10 | 6.0 | 6.4 | 6.0 | 15 | 4.2 | 6.5 | 8.2 | 9.1 | 5.7 | 5.2 |
| Antiozonant | 0.3 | 0.1 | 0.45 | 0.3 | 0.4 | 0.4 | 0.2 | 0.1 | 0.3 | 0.2 | 0.3 | 0.2 | 0.1 | 0.4 | 0.1 | 0.6 |
| A phthalate | 2.5 | 1.5 | 1.5 | 1.0 | 2.0 | 2.5 | 2.0 | 1.7 | 1.9 | 1.7 | 1.8 | 2.1 | 2.0 | 1.6 | 1.7 | 2.0 |
| Carbon black | 1.5 | 1.5 | 2.5 | 2.5 | 2.0 | 2.5 | 2.0 | 2.4 | 2.2 | 2.2 | 1.9 | 2.1 | 2.2 | 2.0 | 1.9 | 2.4 |
| Sodium polyacrylate cross linked with acrylamide | 57.2 | 59.3 | 56.3 | 52.3 | 45 | 50 | 54.3 | 53.5 | 64.6 | 54.7 | 45.8 | 47 | 56 | 51 | 58 | 50 |
| Polybutadiene | 1.0 | 3.5 | 2.5 | 2.0 | 3.5 | 4.5 | 3.0 | 3.3 | 2.2 | 1.9 | 1.5 | 2.0 | 3.2 | 3.3 | 3.5 | 4.5 |
| A disulfide | 0.4 | 0.2 | 0.2 | 0.1 | 0.3 | 0.3 | 0.1 | 0.2 | 0.3 | 0.2 | 0.1 | 0.2 | 0.3 | 0.4 | 0.5 | 1.0 |
| Sulfur | 0.4 | 0.2 | 0.3 | 0.2 | 0.3 | 0.4 | 0.1 | 0.1 | 0.4 | 0.5 | 0.3 | 0.2 | 0.6 | 0.4 | 0.2 | 0.3 |
| Stearic acid | 0.7 | 0.5 | 0.4 | 0.4 | 0.5 | 0.5 | 0.3 | 0.4 | 0.5 | 0.1 | 0.2 | 0.4 | 0.5 | 0.4 | 0.3 | 0.1 |
| Peroxide | 1.0 | 0.9 | 0.9 | 1.0 | 1.0 | 1.0 | 0.8 | 0.7 | 1.1 | 0.4 | 0.6 | 0.7 | 0.5 | 0.6 | 1.5 | 1.9 |

The invention claimed is:

1. A swellable rubber composition comprising:
   a nitrile elastomer;
   a butadiene rubber;
   a sulfur curing agent;
   a silica; and
   a powder super absorbent polymer,
   wherein the powder super absorbent polymer is a potassium polyacrylate polyacrylamide copolymer.

2. The swellable rubber composition of claim 1, wherein the powder super absorbent polymer is present in about 125 Phr to about 175 Phr.

3. The swellable rubber composition of claim 1, wherein the powder super absorbent polymer is present in about 170 Phr to about 210 Phr.

4. The swellable rubber composition of claim 1, wherein the powder super absorbent polymer is present in at least about 150 Phr, about 175 Phr, about 200 Phr or about 225 Phr.

5. The swellable rubber composition of claim 1, wherein the powder super absorbent polymer is present in the swellable rubber composition; and wherein the powder super absorbent polymer comprises at least about 50%, about 60%, about 70%, about 80%, about 90%, or about 95% by weight of a total super absorbent polymer incorporated into the swellable rubber composition.

6. The swellable rubber composition of claim 1, wherein a total super absorbent polymer is selected such that, after curing, a cured swellable rubber packer is capable of expanding in water and/or brine without compromising physical properties of the swellable rubber composition and/or without leaching and/or without perforating.

7. The swellable rubber composition of claim 1, wherein the powder super absorbent polymer has an average particle size of about 10 μm to about 120 μm or about 20 μm to about 100 μm.

8. The swellable rubber composition of claim 1, wherein the powder super absorbent polymer has an average particle size of less than or equal to about 20 μm, about 30 μm, about 40 μm, about 50 μm, about 60 μm, about 70 μm, about 80 μm, about 90 μm, about 100 μm, about 110 μm or about 120 μm.

9. The swellable rubber composition of claim 1, wherein the powder super absorbent polymer consists essentially of particle sizes of less than or equal to about 20 μm, about 30 μm, about 40 μm, about 50 μm, about 60 μm, about 70 μm, about 80 μm, about 90 μm, about 100 μm, about 110 μm, about 120 μm or about 130 μm.

10. The swellable rubber composition of claim 1, wherein the powder super absorbent polymer is present about 120 Phr to about 220 Phr.

11. The swellable rubber composition of claim 1, wherein the swellable rubber composition further comprises one or more of the following: poly-electrolytes, polyacyrlates, polyacrylamides, and/or acrylic acids.

12. The swellable rubber composition of claim 5, wherein the swellable rubber composition further comprises one or more of the following: poly-electrolytes, polyacyrlates, polyacrylamides and/or acrylic acids.

13. The swellable rubber composition of claim 1, wherein the powder super absorbent polymer has a mean particle size of about 35 μm, a median particle size of about 35 μm with a standard deviation of about 10 μm, and no particles over about 63 μm in the powder.

14. The swellable rubber composition of claim 1, wherein the swellable rubber composition, after curing, is configured to swell by at least about 10%, about 20%, about 30%, about 40%, about 50%, about 60%, about 70%, about 80%, about 90%, about 100%, about 110%, about 120%, about 130%, about 140%, about 150%, about 160%, about 170%, about 180%, about 190%, about 200%, about 210%, about 220%, about 230%, about 240% or about 250% by volume in an about 5% weight/volume brine solution without compromising physical properties of the cured swellable rubber composition and/or without leaching and/or without perforating.

15. The swellable rubber composition of claim 1, wherein the swellable rubber composition, after curing, is configured to swell by at least about 10%, about 20%, about 30%, about 40%, about 50%, about 60%, about 70%, about 80%, about 90%, about 100%, about 110%, about 120%, about 130%, about 140%, about 150%, about 160%, about 170%, about 180%, about 190%, about 200%, about 210%, about 220%, about 230%, about 240% or about 250% by volume in an about 16% weight/volume brine solution without compromising physical properties of the swellable rubber composition and/or without leaching and/or without perforating.

16. The swellable rubber composition of claim 1, wherein the swellable rubber composition, after curing, is configured to swell while being subjected to a temperature of about 200 degrees Fahrenheit.

17. The swellable rubber composition of claim 1, wherein the swellable rubber composition, after curing, is configured to swell while being subjected to a temperature of about 275 degrees Fahrenheit.

18. The swellable rubber composition of claim 1, wherein the swellable rubber composition, after curing, is configured to swell while being subjected to a pressure of at least about 3000 psi, about 4000 psi, about 5000 psi, about 6000 psi, about 7000 psi, or about 8000 psi.

19. The swellable rubber composition of claim 1, wherein the swellable rubber composition, after curing, is configured to swell within about 2 days, about 3 days, about 4 days or about 5 days.

20. The swellable rubber composition of claim 1, wherein the swellable rubber composition, after curing, has a Shore A hardness of at least about 20, about 25 or about 30.

21. The swellable rubber composition of claim 1, wherein the swellable rubber composition, after curing and swelling, has a Shore A hardness of at least about 20, about 25 or about 30.

22. A method of curing the swellable rubber composition of claim 1, the method comprising:
    combining the swellable rubber composition with a curing composition comprising at least one sulfur curing agent and at least one peroxide agent, to form a mixture; and
    exposing the mixture to conditions comprising a temperature, the temperature comprising at least about 275° F.

23. A method of sealing an annular region between a swellable packer-conduit assembly comprising the swellable rubber composition of claim 1 and a wellbore wall, the method comprising:
    contacting at least a portion of the swellable packer-conduit assembly with a sufficient amount of a water based fluid to permit the swellable rubber composition to swell.

24. A method of sealing a region between a swellable packer-conduit assembly comprising a conduit and the swellable rubber composition of claim 1 and a wellbore wall, wherein the conduit has an outer surface and the swellable rubber composition of claim 1 at least partially surrounds the outer surface of the conduit, the method comprising: locating the swellable packer-conduit assembly in a region of a wellbore in a manner so as to seal said region upon swelling of the swellable rubber composition, the swellable rubber composition being susceptible to being in contact with water, water based fluid and/or formation water present in the wellbore wall.

* * * * *